(12) United States Patent
Versleegers et al.

(10) Patent No.: US 11,347,005 B2
(45) Date of Patent: May 31, 2022

(54) DEVICE FOR ALIGNING OPTICAL FIBERS

(71) Applicant: COMMSCOPE CONNECTIVITY BELGIUM BVBA, Kessel-Lo (BE)

(72) Inventors: Jozef Christiaan Mathieu Versleegers, Bree (BE); Erwin Junius, Tremelo (BE); Marc Eugène Willem Bervoets, Hasselt (BE); Danny Willy August Verheyden, Gelrode (BE); Michael Aaron Kadar-Kallen, Harrisburg, PA (US); Dwight Andrew Bretz, Hummelstown, PA (US); Robert Charles Flaig, Lancaster, PA (US); Michael Ward Zitsch, Carlisle, PA (US); Randall Bobby Paul, Elizabethville, PA (US); Michael Lawrence Gurreri, York, PA (US)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 678 days.

(21) Appl. No.: 16/321,776

(22) PCT Filed: Jul. 28, 2017

(86) PCT No.: PCT/EP2017/069210
§ 371 (c)(1),
(2) Date: Jan. 29, 2019

(87) PCT Pub. No.: WO2018/020022
PCT Pub. Date: Feb. 1, 2018

(65) Prior Publication Data
US 2021/0318498 A1    Oct. 14, 2021

Related U.S. Application Data

(60) Provisional application No. 62/536,769, filed on Jul. 25, 2017, provisional application No. 62/454,439, (Continued)

(51) Int. Cl.
G02B 6/38          (2006.01)

(52) U.S. Cl.
CPC ......... *G02B 6/3809* (2013.01); *G02B 6/3806* (2013.01); *G02B 6/3858* (2013.01)

(58) Field of Classification Search
CPC ... G02B 6/3809; G02B 6/3806; G02B 6/3858
See application file for complete search history.

(56) References Cited

U.S. PATENT DOCUMENTS

| 4,208,095 A | 6/1980 | Malsot |
| 4,634,216 A | 1/1987 | Calevo et al. |
(Continued)

FOREIGN PATENT DOCUMENTS

| EP | 0 269 409 A2 | 6/1988 |
| JP | 2003-241022 A | 8/2003 |
(Continued)

OTHER PUBLICATIONS

International Search Report and Written Opinion of the International Searching Authority for International Patent Application No. PCT/EP2017/069210 dated Jan. 3, 2018, 20 pages.
(Continued)

*Primary Examiner* — John Bedtelyon
(74) *Attorney, Agent, or Firm* — Merchant & Gould P.C.

(57) ABSTRACT

The present disclosure relates to a fiber alignment device (20) including a guide feature (62*a*, *b*) defining a fiber alignment groove (48). The fiber alignment device (20) also includes a fiber engagement component (44) defining a reference surface arrangement and elastic cantilever arms (56*a*, *b*) for pressing optical fibers into the fiber alignment groove (48). First portions of the guide feature (62*a*, *b*) engage the reference surface arrangement. Second portions of the guide (62*a*, *b*) feature engage the cantilever arms (56*a*, *b*) to flex the cantilever arms to a staged position.

15 Claims, 38 Drawing Sheets

Related U.S. Application Data filed on Feb. 3, 2017, provisional application No. 62/430,346, filed on Dec. 5, 2016, provisional application No. 62/368,704, filed on Jul. 29, 2016.

(56) References Cited

U.S. PATENT DOCUMENTS

| | | |
|---|---|---|
| 4,923,274 A | 5/1990 | Dean |
| 5,220,630 A | 6/1993 | Deveau, Jr. et al. |
| 6,779,931 B2 | 8/2004 | Murata et al. |
| 7,641,397 B2 | 1/2010 | Koreeda et al. |
| 8,870,466 B2 | 10/2014 | Lu |
| 2013/0051735 A1 | 2/2013 | Shen et al. |
| 2015/0023634 A1 | 1/2015 | Huang |
| 2016/0216454 A1* | 7/2016 | Kadar-Kallen ...... G02B 6/3825 |

FOREIGN PATENT DOCUMENTS

| | | |
|---|---|---|
| JP | 3784446 B2 | 6/2006 |
| WO | 2012/112344 A1 | 8/2012 |
| WO | 2013/117598 A2 | 8/2013 |
| WO | 2014/197701 A1 | 12/2014 |
| WO | 2015/048198 A1 | 4/2015 |
| WO | 2016/043922 A1 | 3/2016 |
| WO | 2016/100304 A1 | 6/2016 |

OTHER PUBLICATIONS

"SF Connector Optical Interface for Parallel Optical Module", NTT Technology, 4 pages, http://www.ntt.co.jp/ntt-tec/e/high-tec/ct2-c002.html, (2010).

* cited by examiner

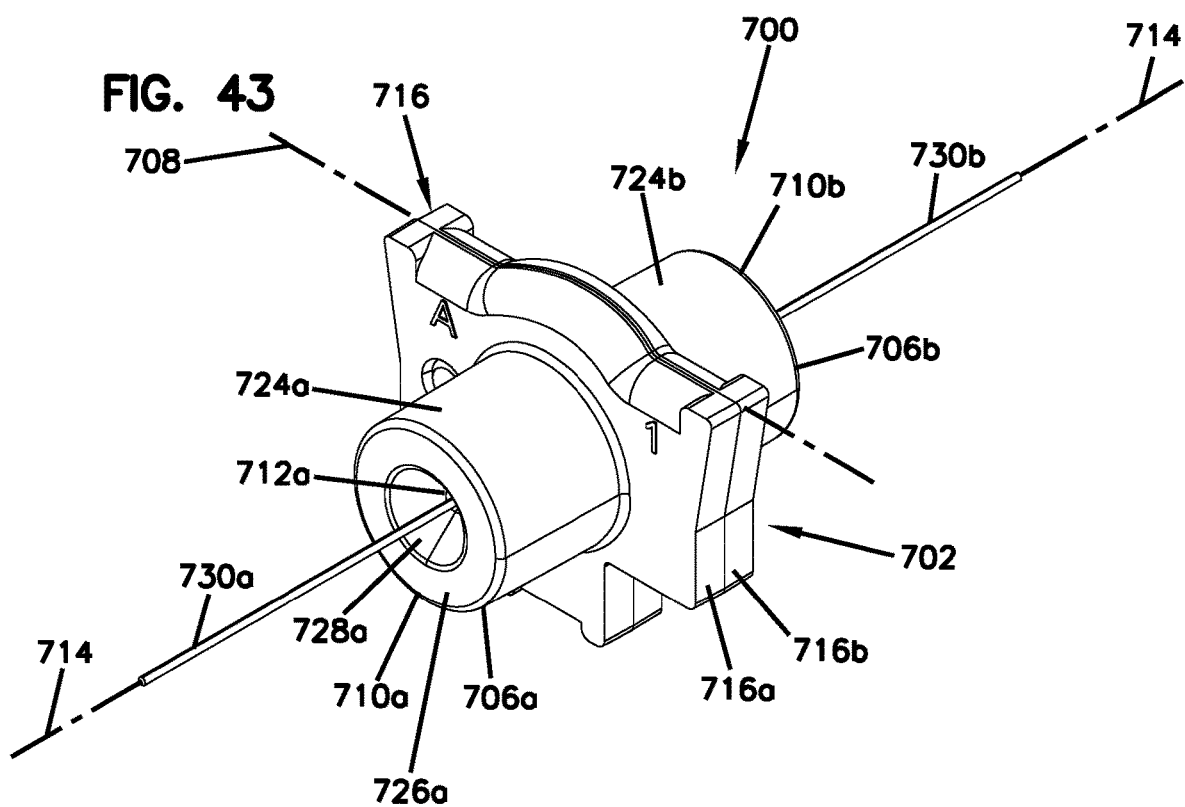
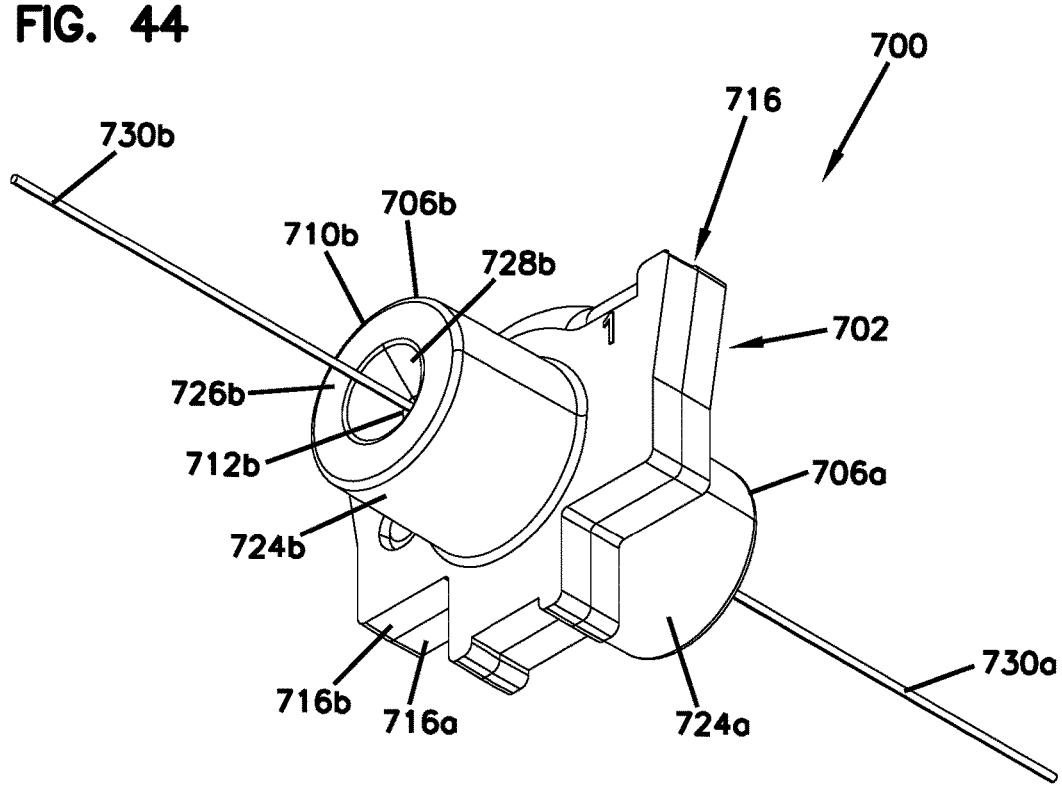

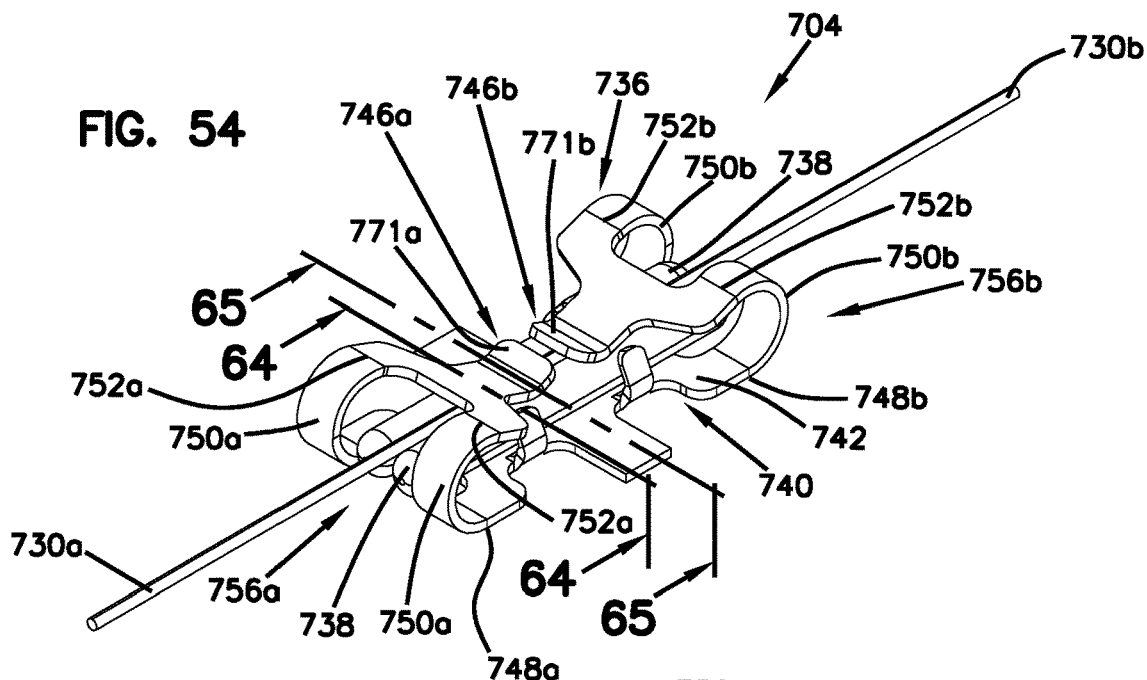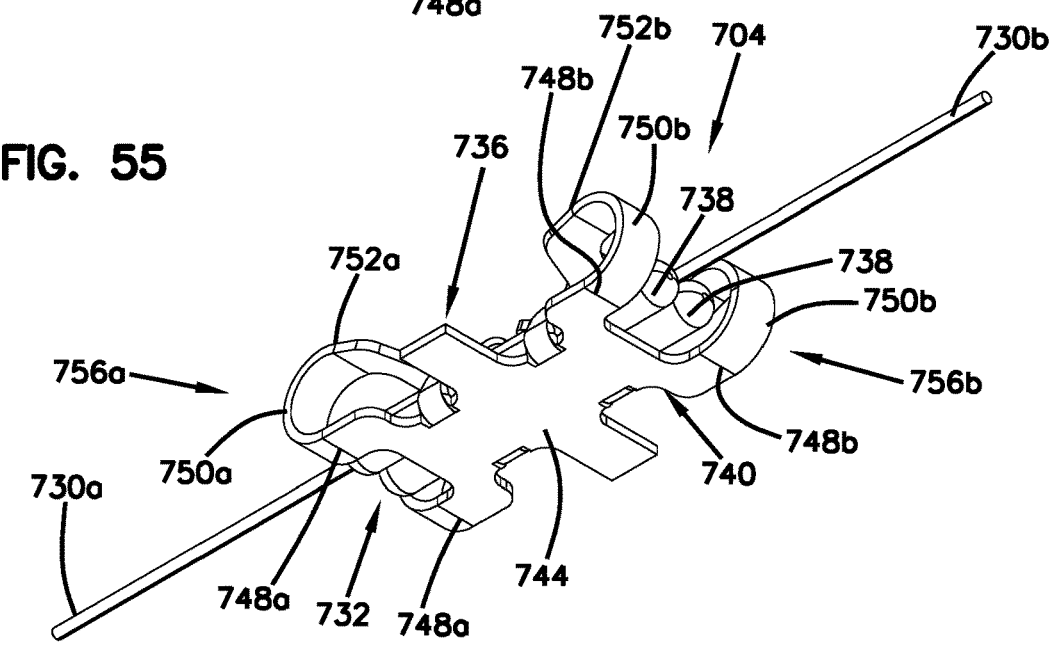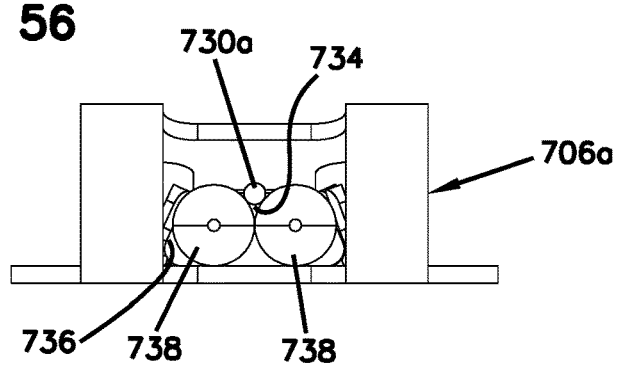

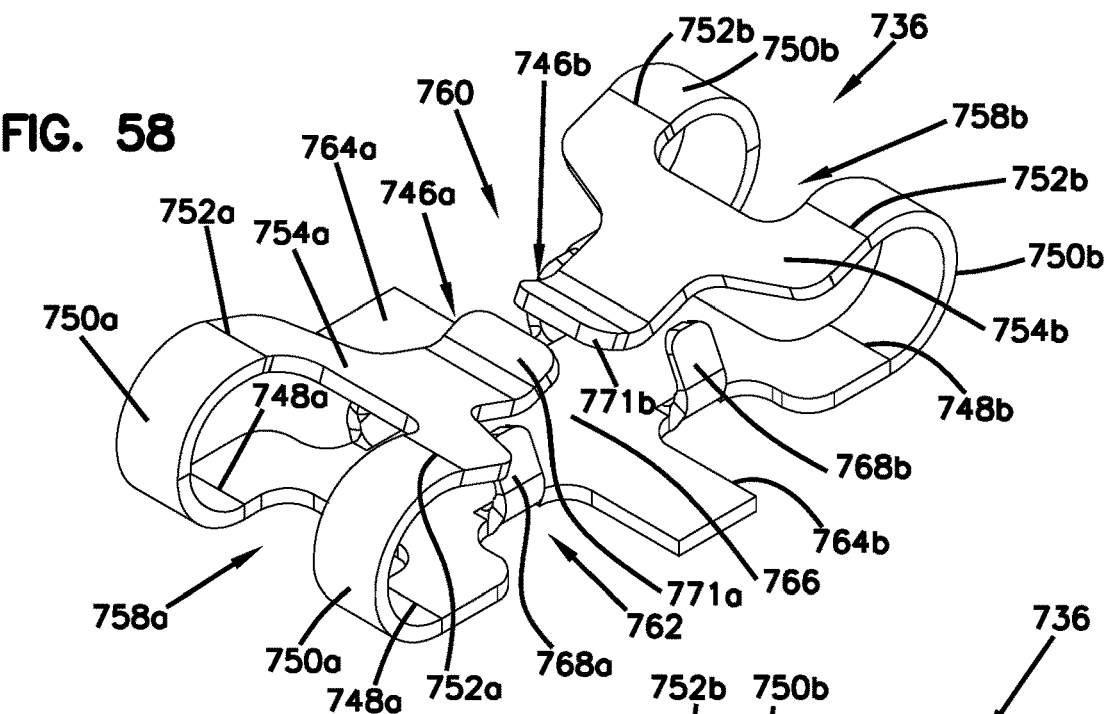
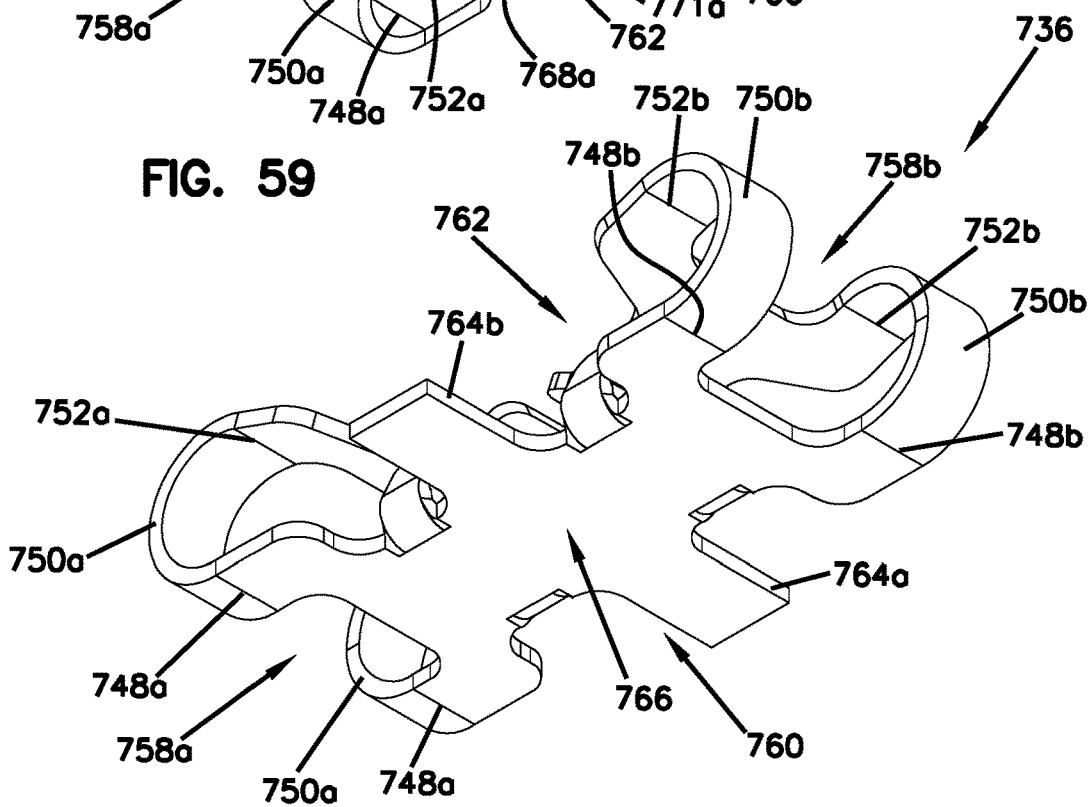
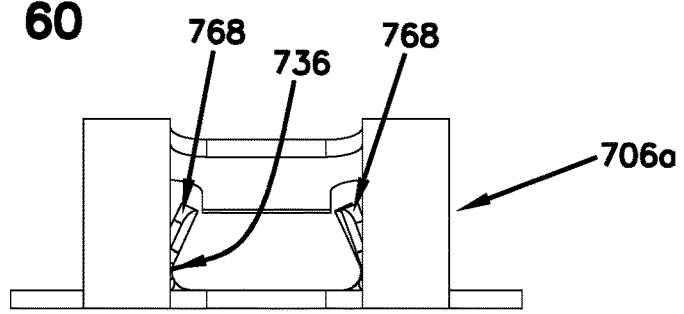

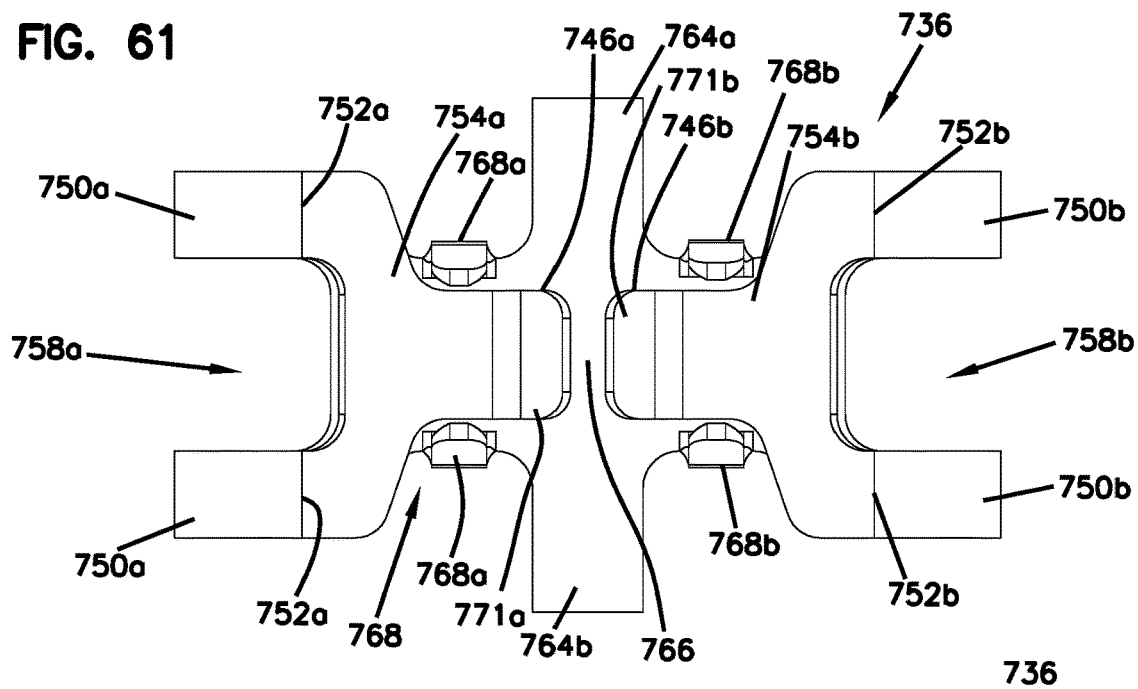
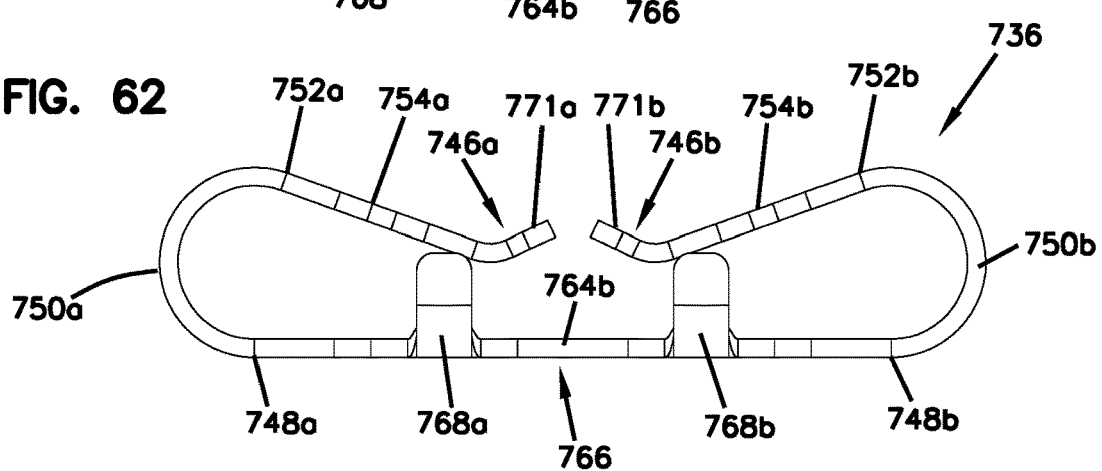
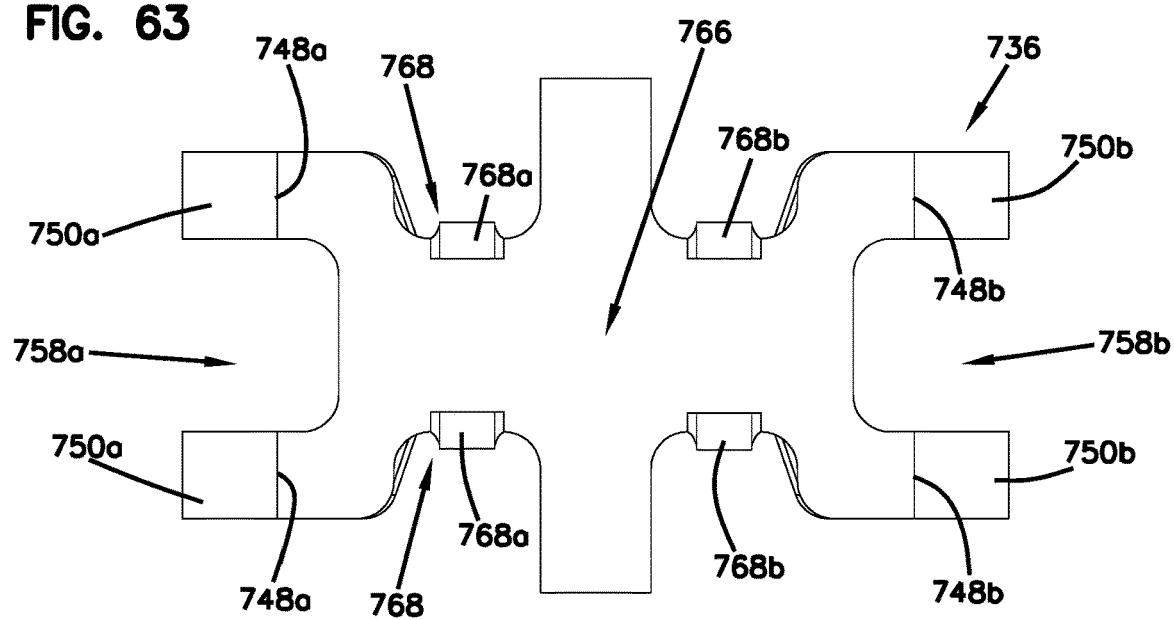

US 11,347,005 B2

DEVICE FOR ALIGNING OPTICAL FIBERS

CROSS-REFERENCE TO RELATED APPLICATIONS

This application is a National Stage Application of PCT/EP2017/069210, filed on Jul. 28, 2017, which claims the benefit of U.S. Patent Application Ser. No. 62/368,704, filed on Jul. 29, 2016, and claims the benefit of U.S. Patent Application Ser. No. 62/430,346, filed on Dec. 5, 2016, and claims the benefit of U.S. Patent Application Ser. No. 62/454,439, filed on Feb. 3, 2017, and claims the benefit of U.S. Patent Application Ser. No. 62/536,769, filed on Jul. 25, 2017, the disclosures of which are incorporated herein by reference in their entireties. To the extent appropriate, a claim of priority is made to each of the above disclosed applications.

TECHNICAL FIELD

The present disclosure relates generally to systems for optically aligning optical fibers.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles (LC, SC, MPO), alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Such fiber optic adapters can include specialized fiber alignment structures adapter to receive bare optical fibers. Example ferrule-less fiber optic connectors are disclosed by PCT Publication No. WO 2012/112344; PCT Publication No. WO 2013/117598 and U.S. Pat. No. 8,870,466.

SUMMARY

One aspect of the present disclosure relates to a fiber alignment device including a guide feature defining a fiber alignment groove. The fiber alignment device also includes a fiber engagement component defining a reference surface arrangement and elastic cantilever arms for pressing optical fibers into the fiber alignment groove. First portions of the guide feature engage the reference surface arrangement to establish a desired relative positioning between the fiber engagement component and the guide feature. Second portions of the guide feature engage the cantilever arms to flex the cantilever arms to a staged position. In certain examples, the guide feature can include a single structure (e.g., a plate) defining a fiber alignment groove such as a v-groove or multiple structures such as multiple rods that cooperate to define a fiber alignment groove. In certain examples, the fiber engagement component is a plastic component having a main body on which the reference surface arrangement is provided and also including the elastic cantilever arms unitarily formed with the main body. In certain examples, contact between the guide feature and the reference surface arrangement on the main body establishes a precise relative positioning between the main body and the guide feature, and contact between the guide feature and the elastic cantilever arms flexes the elastic cantilever arms relative to the main body to the staged position.

Another aspect of the present disclosure relates to a fiber alignment device including a polymeric fiber engagement component having a main body defining an elongate pocket having an outwardly facing open side. The fiber engagement component also includes elastic cantilever arms unitarily formed with the main body. The fiber alignment device further includes rods that fit within the pocket of the fiber engagement component. The rods cooperate to define an alignment groove generally aligned with the elastic cantilever arms. In a preferred example, the fiber alignment rods are pressed into the pocket and into engagement with the fiber engagement component by an additional structure such as an outer housing.

Still a further aspect of the present disclosure relates to a fiber alignment device including a fiber engagement component having a main body and also including elastic cantilever arms having base ends that are unitary with the main body. The elastic cantilever arms also include free ends including central portions for engaging optical fibers and wings that project from opposite sides of the central portions. In certain examples, the central portions can include tabs (i.e., projections). In certain examples, the wings can engage a cooperative alignment feature (e.g., rods defining a fiber alignment groove) to position the free ends of the elastic cantilever arms relative to the cooperative alignment feature.

A further aspect of the present disclosure relates to a fiber alignment device including a fiber alignment housing having opposite ends defining co-axially aligned fiber insertion openings that are aligned along a fiber insertion axis. The fiber alignment device also includes a guide feature positioned within the fiber alignment housing. The guide feature can define a fiber alignment groove that extends along the fiber insertion axis. In one preferred example, the guide feature can include parallel rods that cooperate to define the fiber alignment groove. In certain examples, the fiber alignment housing can include a tee-beam for pressing the guide feature into position relative to the fiber insertion axis. In certain examples, the tee-beam can include a web and a flange. In certain examples, the flange can include first and second flange portions that project transversely from the web. In certain examples, the first flange portion can engage a first rod of the guide feature and the second flange portion can engage a second rod of the guide feature. In certain examples, the flange of the tee-beam can include a guide feature contact surface that faces toward the fiber insertion axis. In certain examples, guide feature contact surface can form a platform parallel to the fiber insertion axis and the flange can include a non-contact surface (e.g., a surface that does not contact the rods) that faces toward the fiber insertion axis and that angles away from the fiber insertion axis as the non-contact surface extends from the guide feature contact surface toward a mid-region of the alignment housing.

A further aspect of the present disclosure relates to a fiber alignment device including a fiber alignment housing having opposite ends defining co-axially aligned fiber insertion openings that are aligned along a fiber insertion axis. The fiber alignment device also includes a fiber alignment subassembly that mounts within the fiber alignment housing. The fiber alignment subassembly includes first and second parallel rods that cooperate to define a fiber alignment groove. The fiber alignment assembly also includes a fiber engagement component including a top side and a bottom side. The bottom side of the fiber engagement component defines an elongate pocket in which the first and second parallel rods are received. The fiber engagement component also includes cantilever arms positioned above the first and second parallel rods for pressing optical fibers into the fiber alignment groove defined by the first and second parallel rods. The fiber alignment housing includes upper and lower subassembly positioning surfaces. The fiber engagement component is compressed between the upper subassembly positioning surfaces and the first and second rods. The first and second rods are compressed between the lower subassembly positioning surface and the fiber engagement component. The fiber engagement component and the first and second rods are compressed together between the upper and lower subassembly positioning surfaces. In one example, the upper subassembly positioning surfaces can be defined by rails. In one example, the lower subassembly positioning surfaces can be defined by one or more tee-beams. The fiber alignment housing can also include side rails for laterally aligning the fiber alignment subassembly within the fiber alignment housing.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 43 is a front, top, left side perspective view of another fiber alignment device in accordance with the principles of the present disclosure;

FIG. 44 is a rear, bottom, right side view of the fiber alignment device of FIG. 43;

FIG. 54 is a front, top, left side perspective view of the optical fiber alignment assembly of FIG. 51;

FIG. 55 is a rear, bottom, right side perspective view of the optical fiber alignment assembly of FIG. 51;

FIG. 56 is an end view of the optical fiber alignment assembly of FIG. 51 shown partially within a housing piece of the fiber alignment device of FIG. 47;

FIG. 58 is a top, front, left side perspective view of a biasing member of the optical fiber alignment assembly of FIG. 57;

FIG. 59 is a bottom, rear, right side perspective view of the biasing member of FIG. 58;

FIG. 60 is an end view of the biasing member of FIG. 58 shown partially within the housing piece of the fiber alignment device of FIG. 47;

FIG. 61 is a top view of the biasing member of FIG. 58;

FIG. 62 is a side view of the biasing member of FIG. 58;

FIG. 63 is a bottom view of the biasing member of FIG. 58;

DETAILED DESCRIPTION

Figure 1:
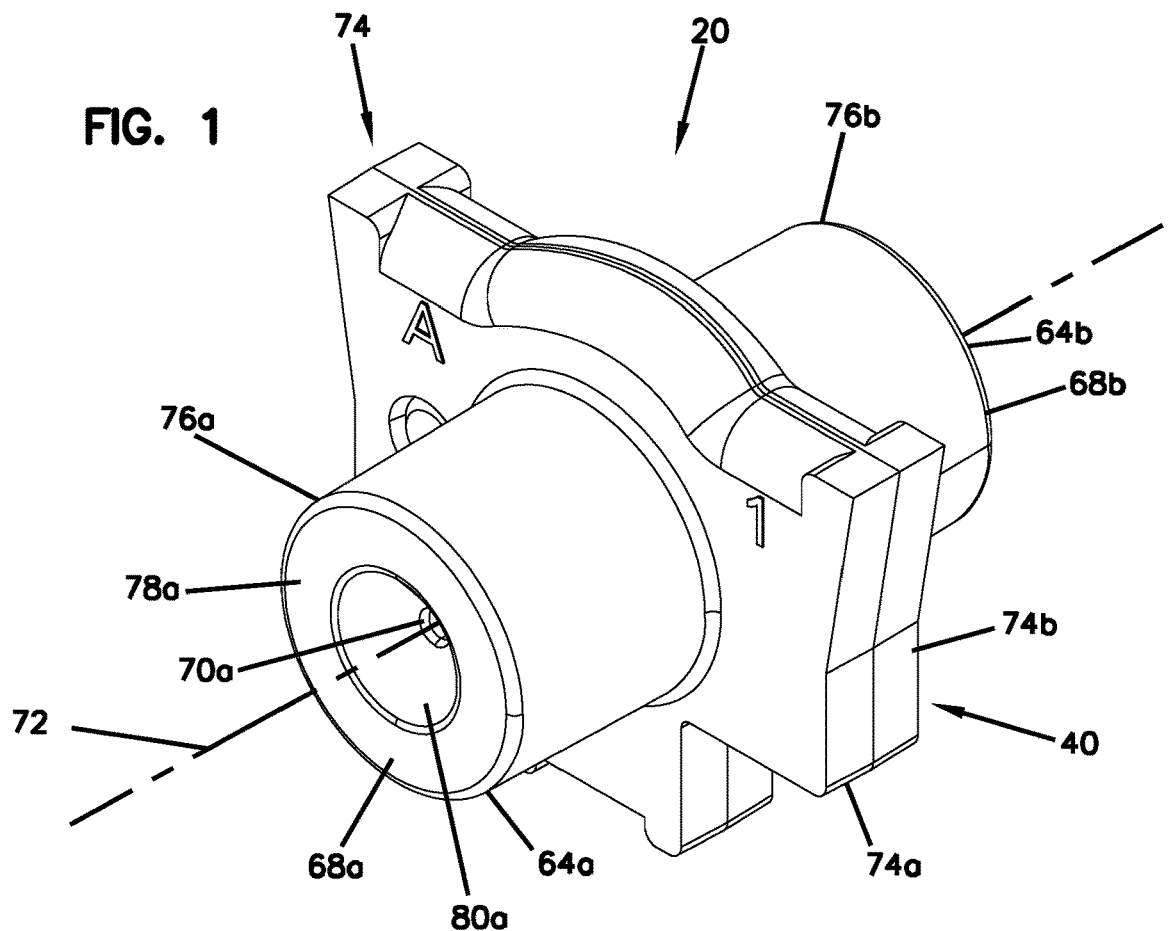
FIG. 1 is a front, top, left side perspective view of a fiber alignment device in accordance with the principles of the present disclosure.
Figure 2:
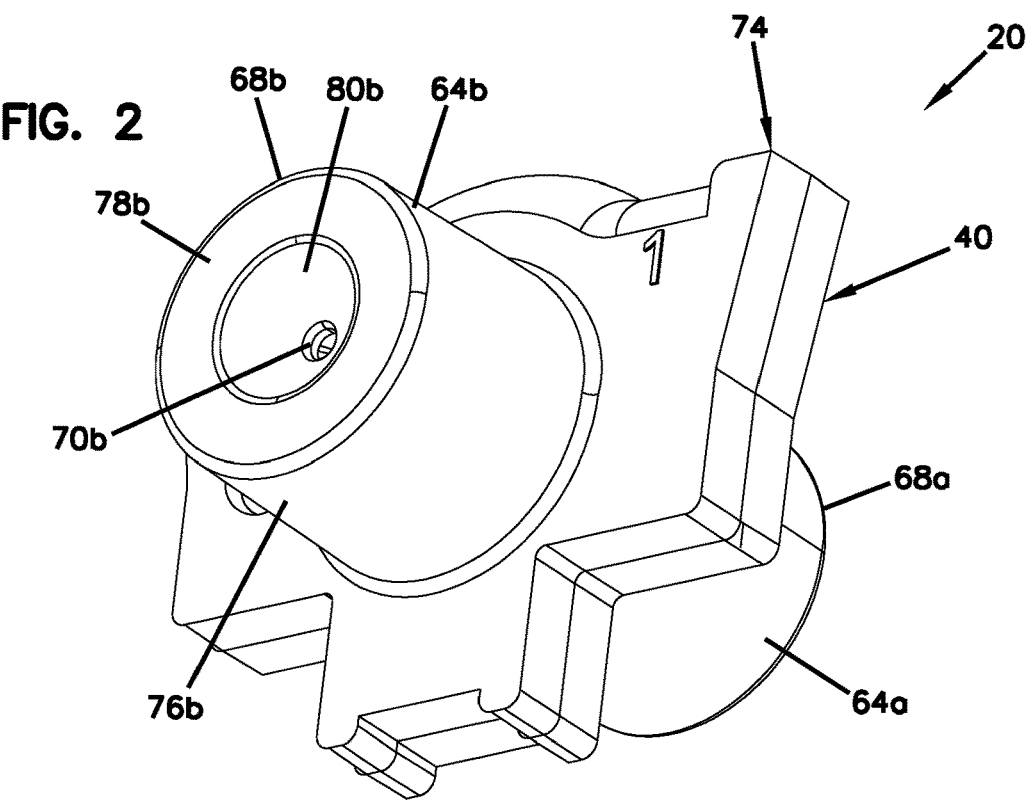
FIG. 2 is a rear, bottom, right side view of the fiber alignment device of FIG. 1.
Figure 3:
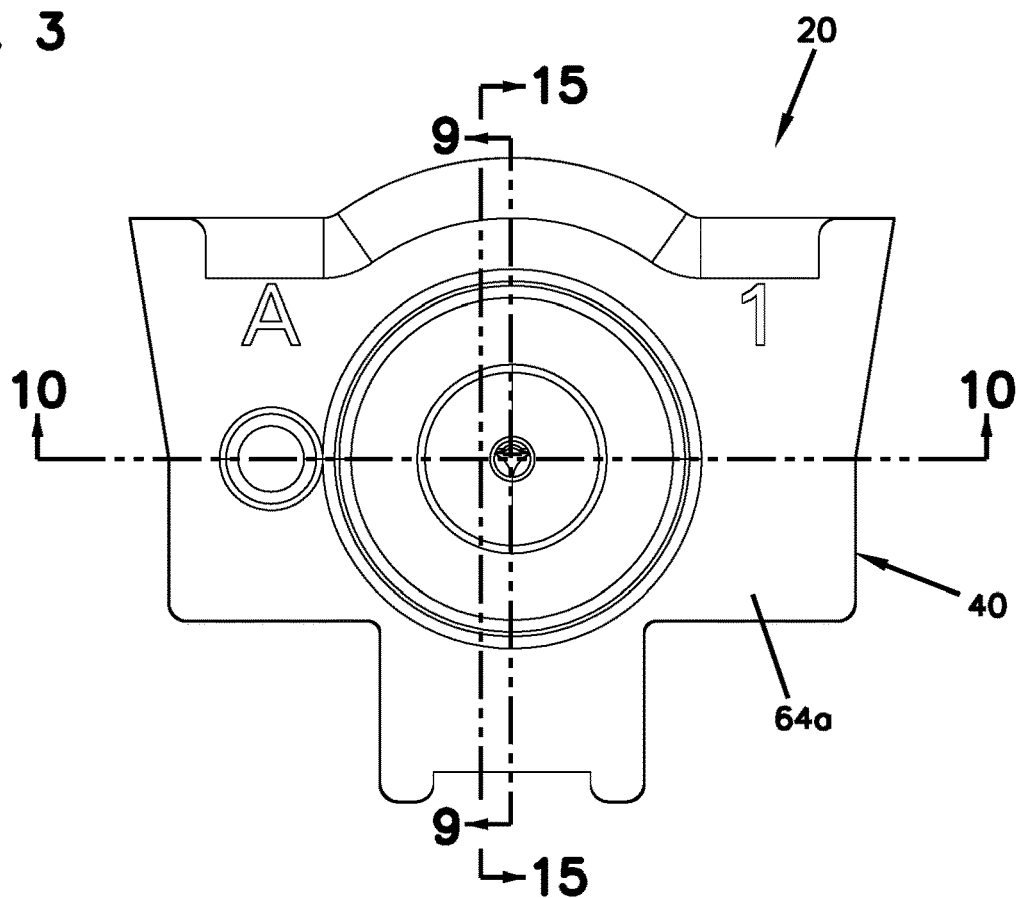
FIG. 3 is a front view of the fiber alignment device of FIG. 1.
Figure 4:
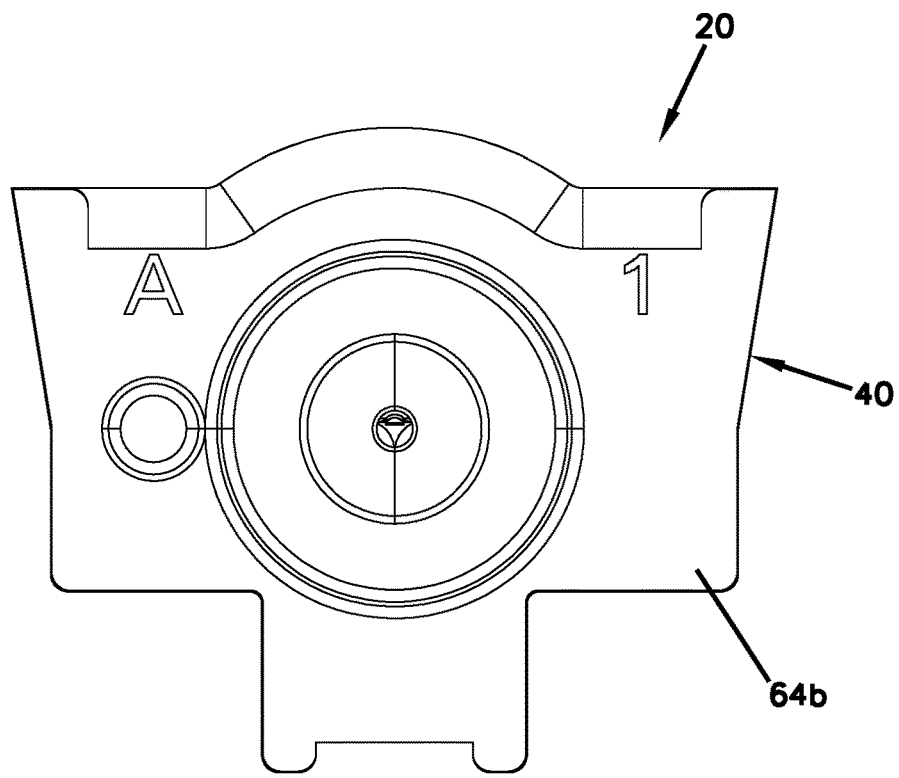
FIG. 4 is a rear view of the fiber alignment device of FIG. 1.
Figure 5:
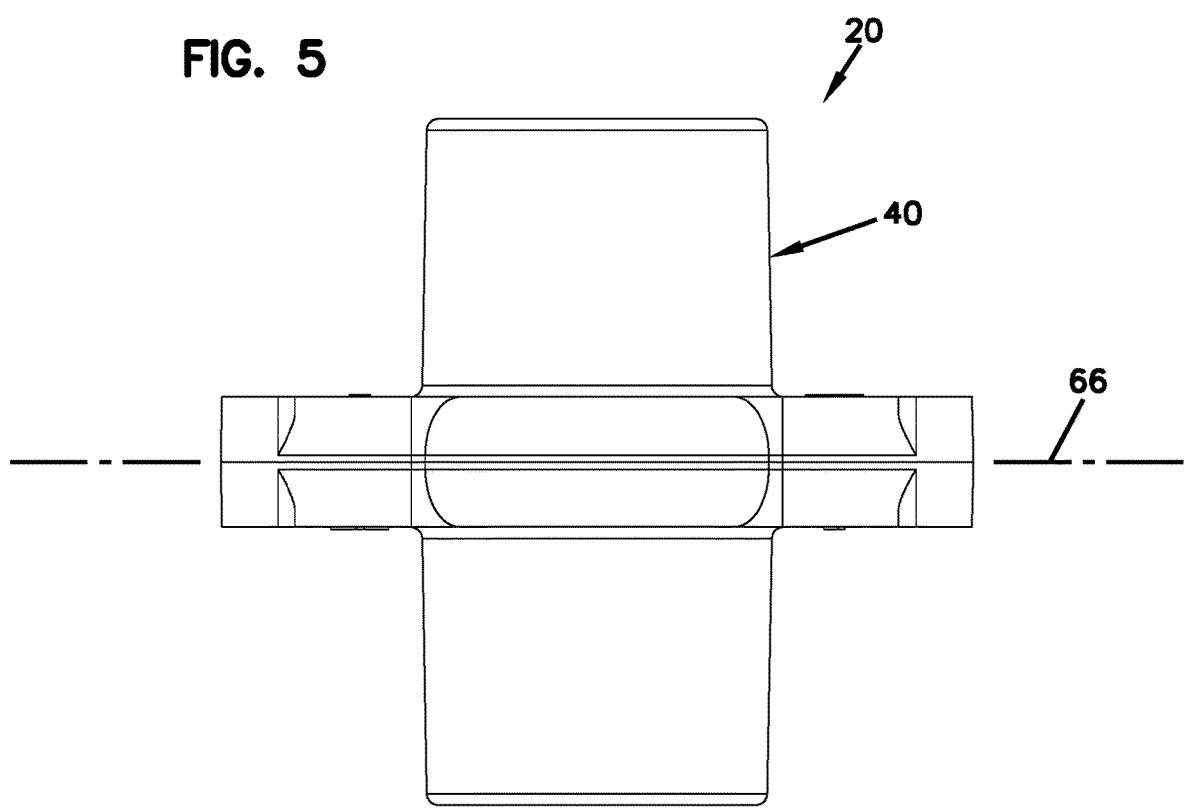
FIG. 5 is a top view of the fiber alignment device of FIG. 1.
Figure 6:
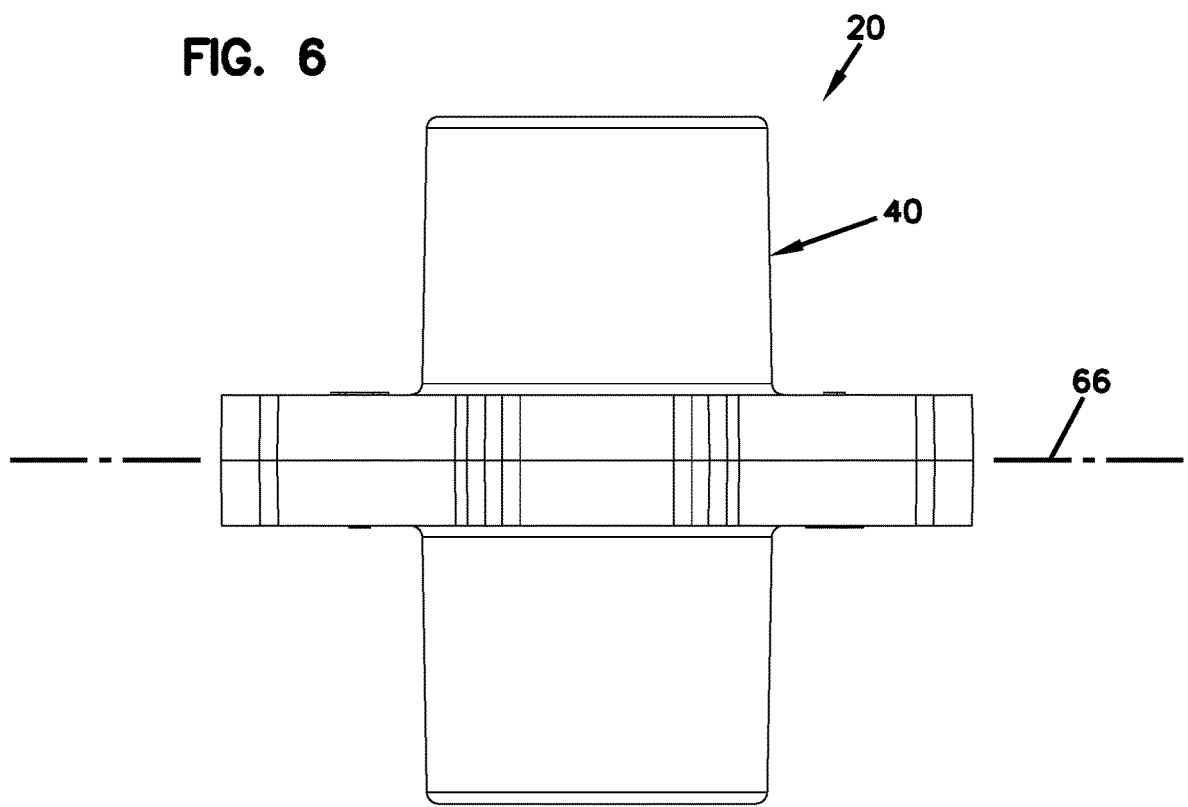
FIG. 6 is a bottom view of the fiber alignment device of FIG. 1.
Figure 7:
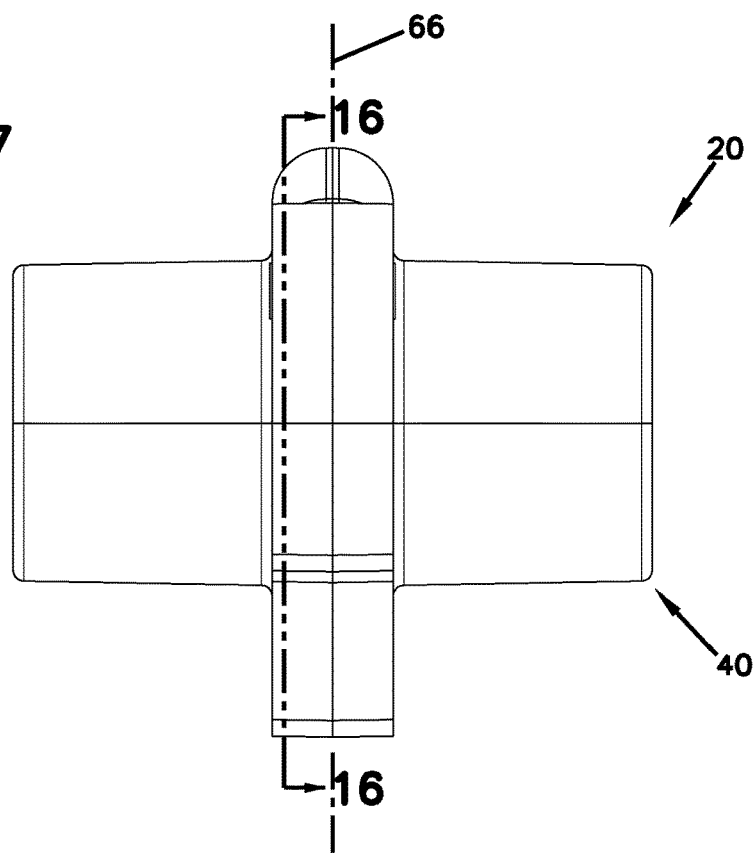
FIG. 7 is a left side view of the fiber alignment device of FIG. 1.
Figure 8:
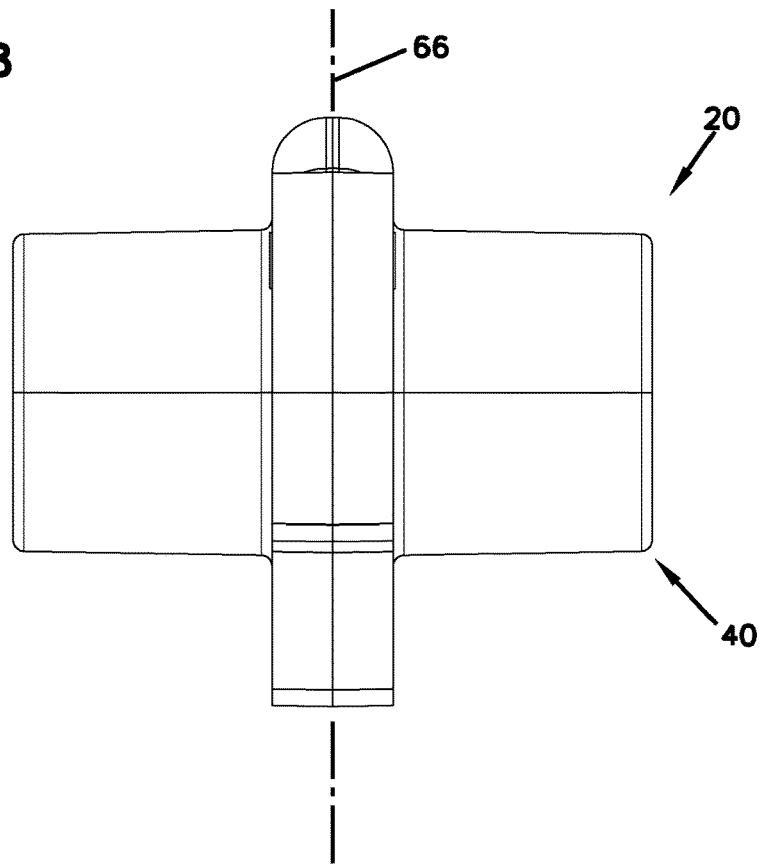
FIG. 8 is a right side view of the fiber alignment device of FIG. 1.

Various examples will be described in detail with reference to the drawings, wherein like reference numerals represent like parts and assemblies throughout the several views. Any examples set forth in this disclosure are not intended to be limiting and merely set forth some of the many possible ways for implementing the broad inventive aspects disclosed herein. In this description, words such as "upper", "top", "lower", and "bottom" have been used for ease of description to describe the positional relationships of the various features, parts and components. It will be appreciated that such terms are not intended to be construed as limiting. For example, such terms are not intended to mean that a fiber alignment device in accordance with the principles of the present disclosure is required to be used in a particular orientation. For example, in actual use, a feature identified herein as being a top feature can be installed in a bottom orientation and a feature described herein as being a bottom feature could be installed in a top orientation.

FIGS. 1-16 illustrate a fiber alignment device 20 in accordance with the principles of the present disclosure. The fiber alignment device 20 is adapted for co-axially aligning optical fibers such that the optical fibers are optically coupled so that light can be transferred from one fiber to the other. While the embodiment disclosed herein is configured to align two optical fibers, it will be appreciated that the various parts and components could be duplicated so as to be applicable to alignment devices for aligning multiple sets of optical fibers. Additionally, it will be appreciated that fiber alignment devices in accordance with the principles of the present disclosure can be used for aligning optical fibers in a variety of applications. For example, alignment devices in accordance with the principles of the present disclosure can be incorporated within fiber optic adapters that are configured for receiving ferrule-less fiber optic connectors. In such a use, the ferrule alignment devices are configured for aligning ferrule-less optical fibers corresponding to the fiber optic connectors when the fiber optic connectors are inserted within ports of the fiber optic adapters. In other examples, fiber alignment devices in accordance with the principles of the present disclosure can be incorporated within connectors such as field-installable connectors to provide optical couplings within the connectors. Moreover, fiber alignment devices in accordance with the principles of the present disclosure can be used at splice trays, or other locations where it is desired to provide mechanical splicing between optical fibers.

Figure 21:
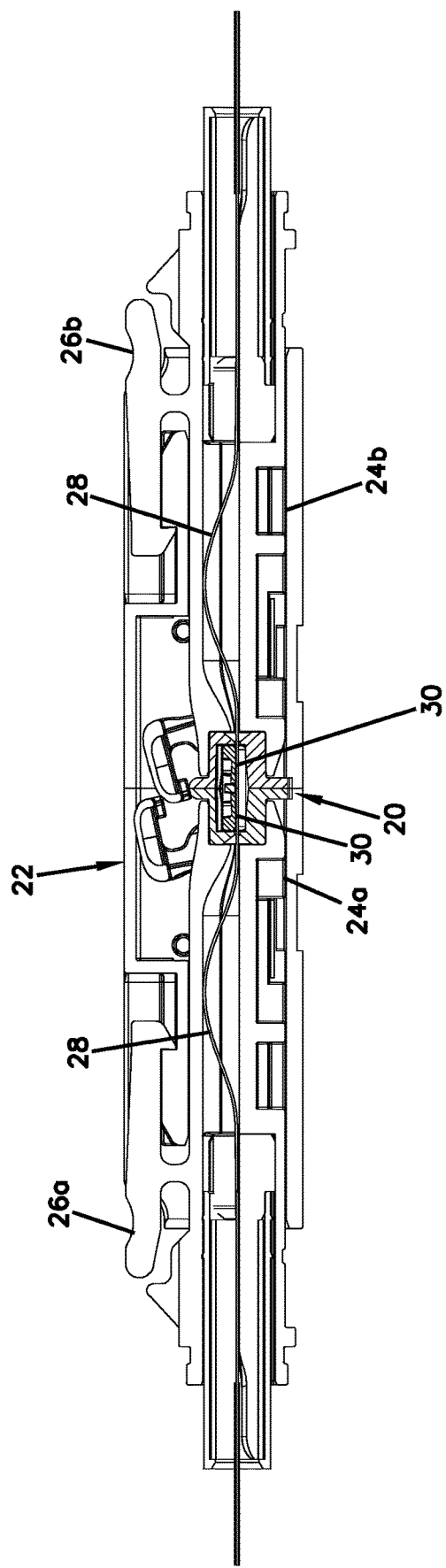
FIG. 21 is a longitudinal, cross-sectional view of a fiber optic adapter incorporating the fiber alignment device of FIG. 1; the fiber optic adapter is shown receiving and optically coupling together two ferrule-less fiber optic connectors.

FIG. 21 shows the fiber alignment device 20 incorporated within a fiber optic adapter 22. The fiber optic adapter 22 includes adapter ports 24a, 24b for receiving fiber optic connectors such as ferrule-less fiber optic connectors 26a, 26b. The ferrule-less fiber optic connectors 26a, 26b include optical fibers 28 having free-end portions 30 that are not supported by structures such as ferrules (i.e., relatively hard structures which typically support the ends of optical fibers in traditional ferruled connectors such as SC-connectors, LC-connectors, MPO connectors and other types of connectors). In certain examples, the free-end portions 30 are bare fibers which typically include a core surrounded by only a cladding layer. In other examples, the free-end portions 30 may include one or more coatings. As shown at FIG. 21, the ferrule-less fiber optic connectors 26a, 26b are respectively received in the adapter ports 24a, 24b and the free-end portions 30 of their corresponding optical fibers 28 are received within the fiber alignment device 20. The fiber alignment device 20 is centrally located within the fiber optic adapter 22 and receives and coaxially aligns the free-end portions 30 of the ferrule-less fiber optic connectors 26a, 26b when the ferrule-less fiber optic connectors 26a, 26b are inserted within their corresponding adapter ports 24a, 24b.

Figure 17:
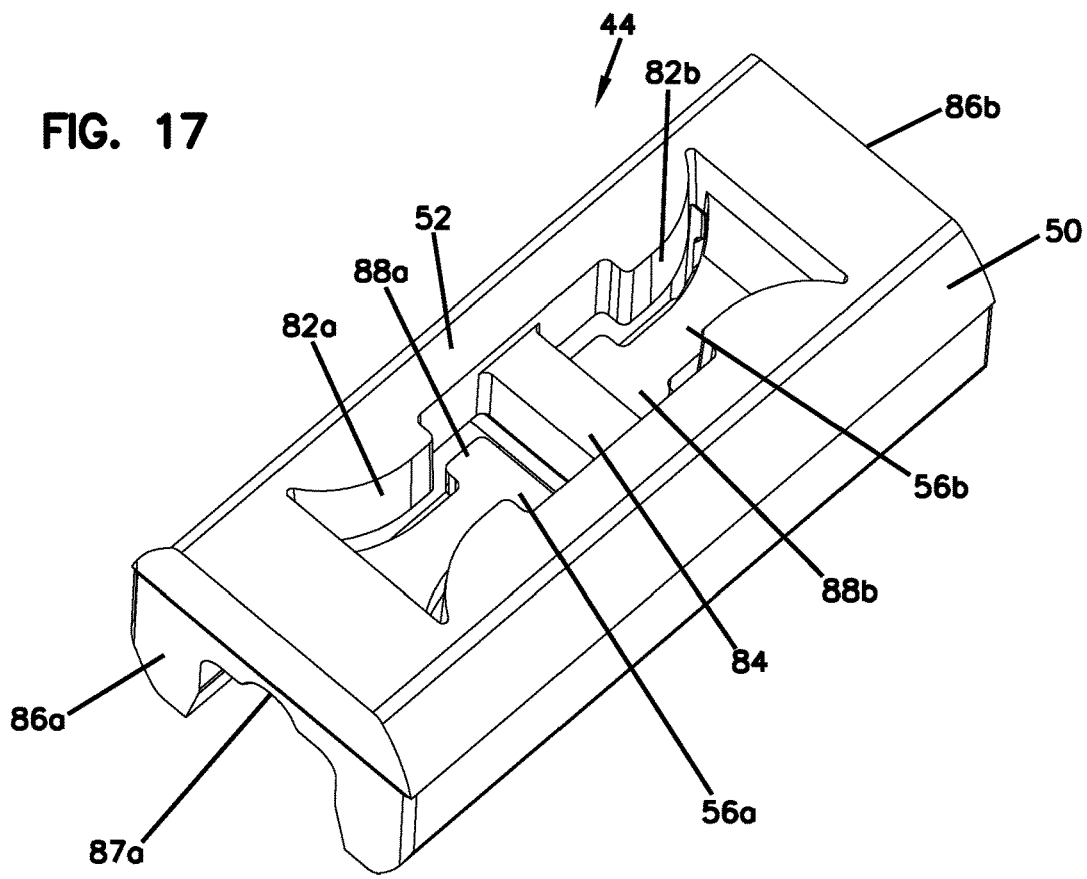
FIG. 17 is a front, top, left side perspective view of a fiber engagement component of the fiber alignment device of FIG. 1.
Figure 18:
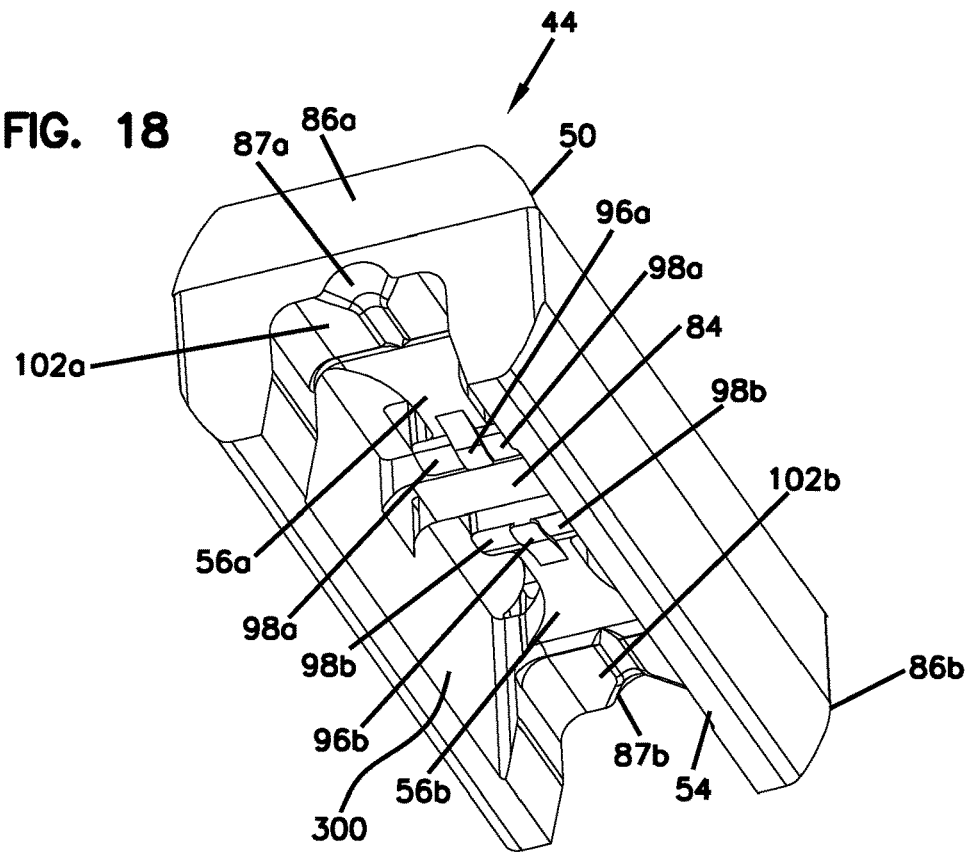
FIG. 18 is a front, bottom, left side view of the fiber alignment component of FIG. 17.
Figure 19:
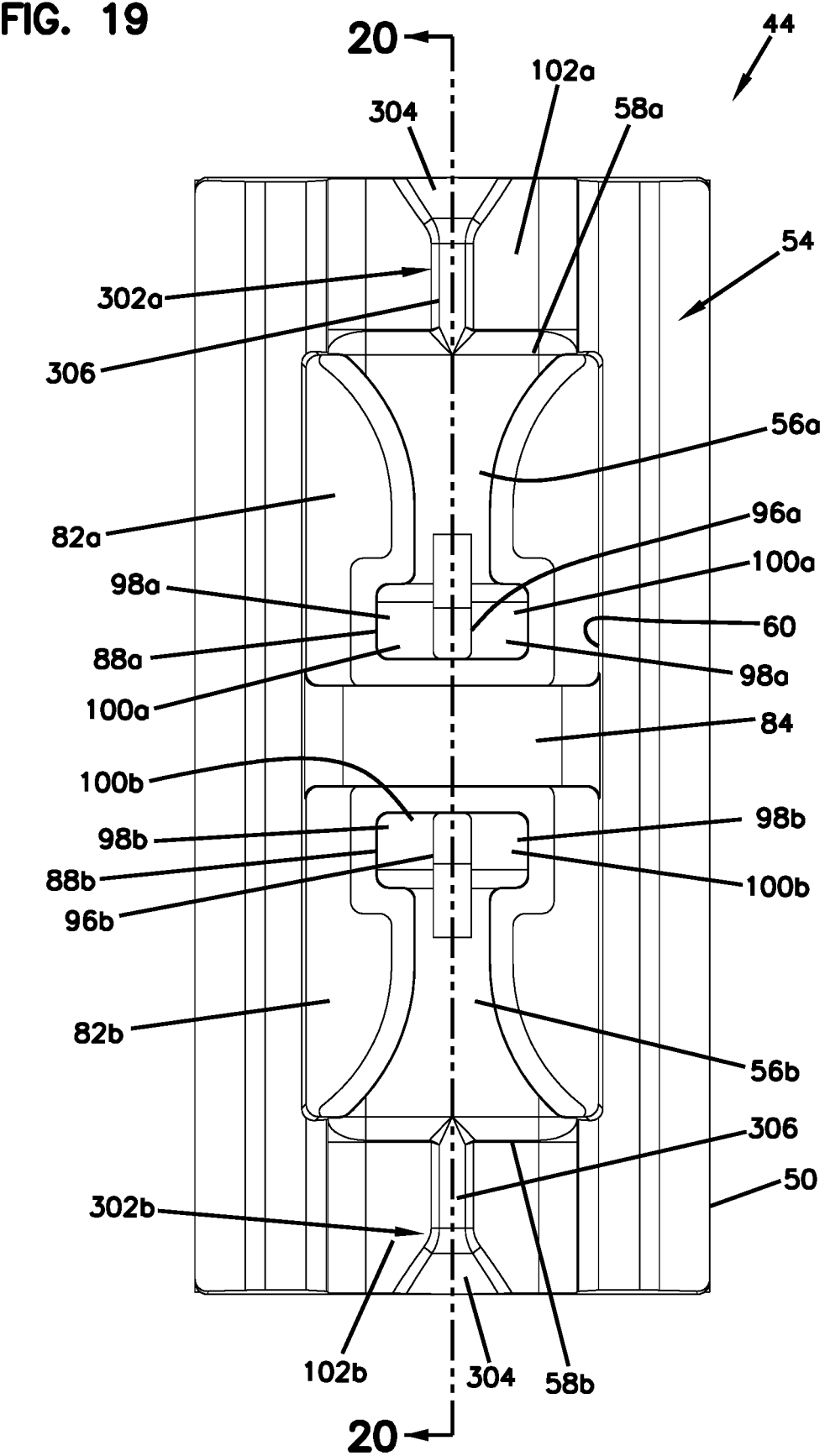
FIG. 19 is a bottom view of the fiber alignment component of FIG. 17.
Figure 20:
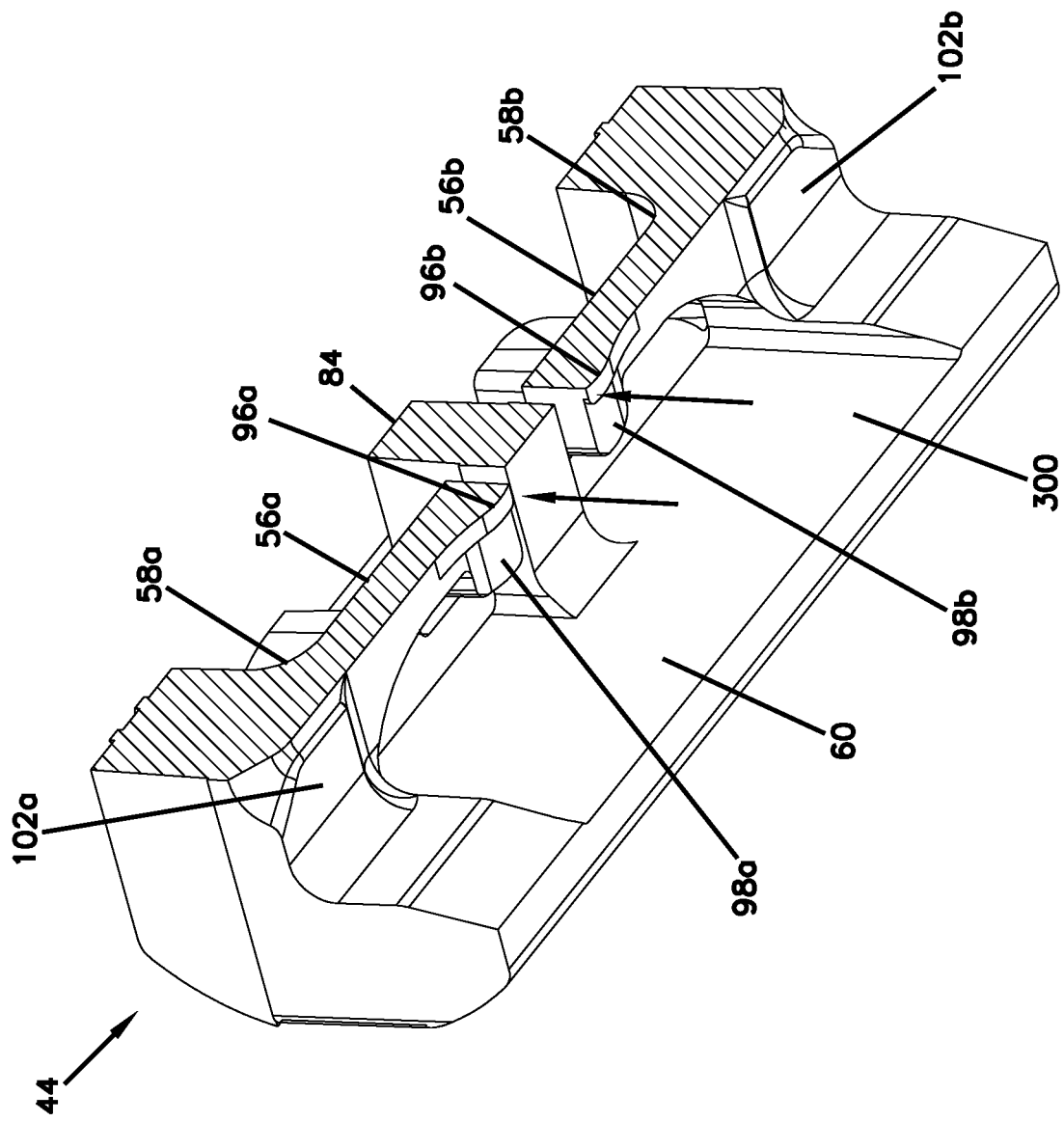
FIG. 20 is a cross-sectional view taken along section line 20-20 of FIG. 19.

Referring to FIGS. 11-14, the fiber alignment device 20 includes an outer fiber alignment housing 40 configured to contain a fiber alignment subassembly 42. The fiber alignment subassembly 42 includes a fiber engagement component 44 and a guide feature 46 defining a fiber alignment groove 48 (see FIGS. 10 and 16). The fiber engagement component 44 can include a plastic or polymeric structure (e.g., a molded plastic part) which can include a main body 50 defining a top side 52 (see FIG. 17) and a bottom side 54 (see FIG. 18). The fiber engagement component 44 can also include elastic cantilever arms 56a, 56b. In one example, the elastic cantilever arms 56a, 56b are unitarily formed as one piece with the main body 50 of the fiber engagement component 44. For example, the elastic cantilever arms 56a, 56b can include base ends 58a, 58b that are monolithically connected with the main body 50. The bottom side 54 of the main body 50 can define an elongate pocket 60 that is open in a downwardly facing direction. The guide feature 46 can include parallel rods 62a, 62b that fit within the elongate pocket 60 and that cooperate to define the fiber alignment groove 48. When the fiber alignment subassembly 42 is installed within the fiber alignment housing 40, the fiber alignment housing 40 includes structure that forces, compresses or otherwise retains/holds the rods 62a, 62b in the elongate pocket 60 such that the fiber alignment housing 40 assists in positioning and retaining the rods 62a, 62b within the open sided elongate pocket 60.

Figure 9:
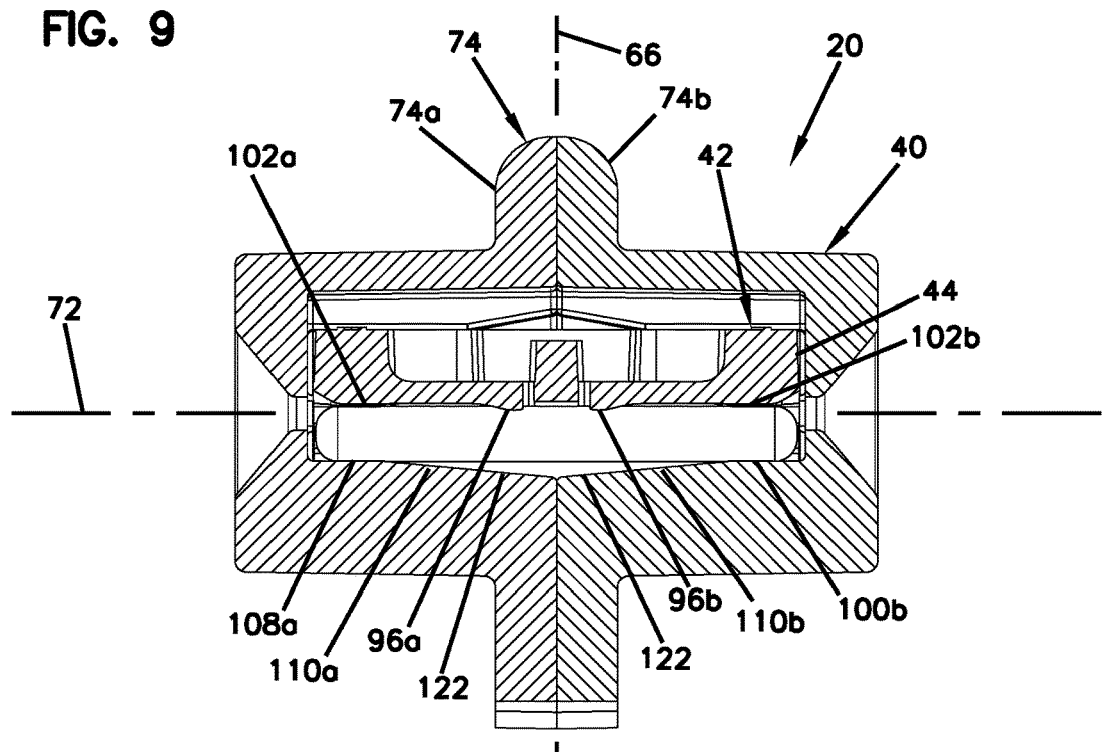
FIG. 9 is a cross-sectional view taken along section line 9-9 of FIG. 3.
Figure 10:
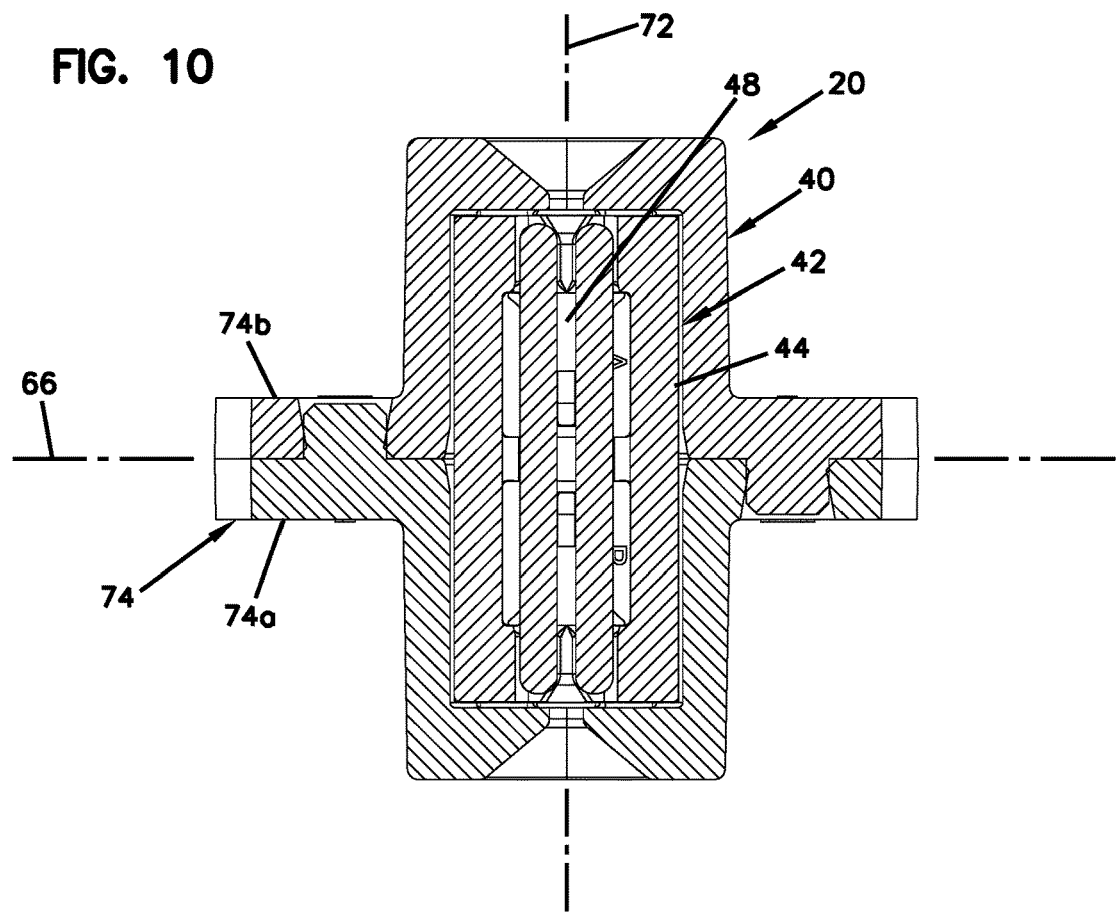
FIG. 10 is a cross-sectional view taken along section line 10-10 of FIG. 3.
Figure 11:
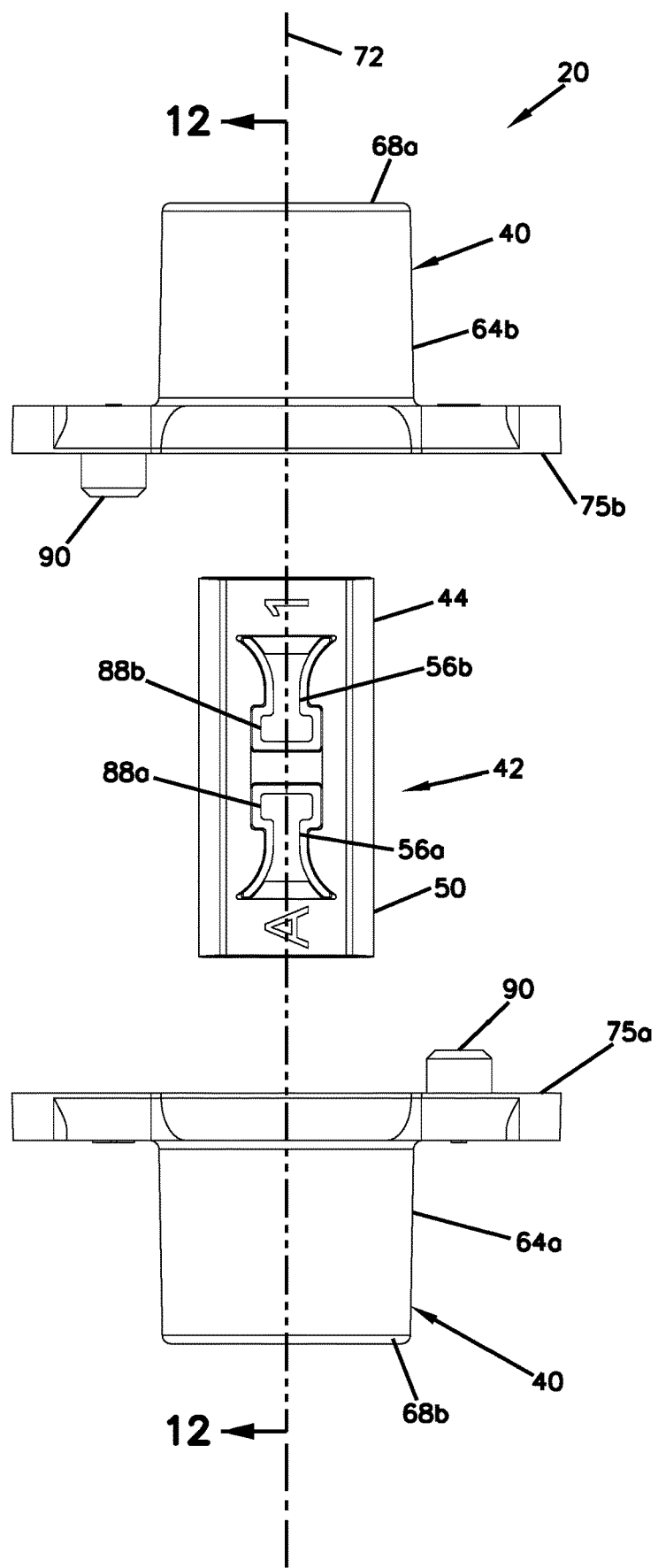
FIG. 11 is an exploded, top view of the fiber alignment device of FIG. 1.
Figure 12:
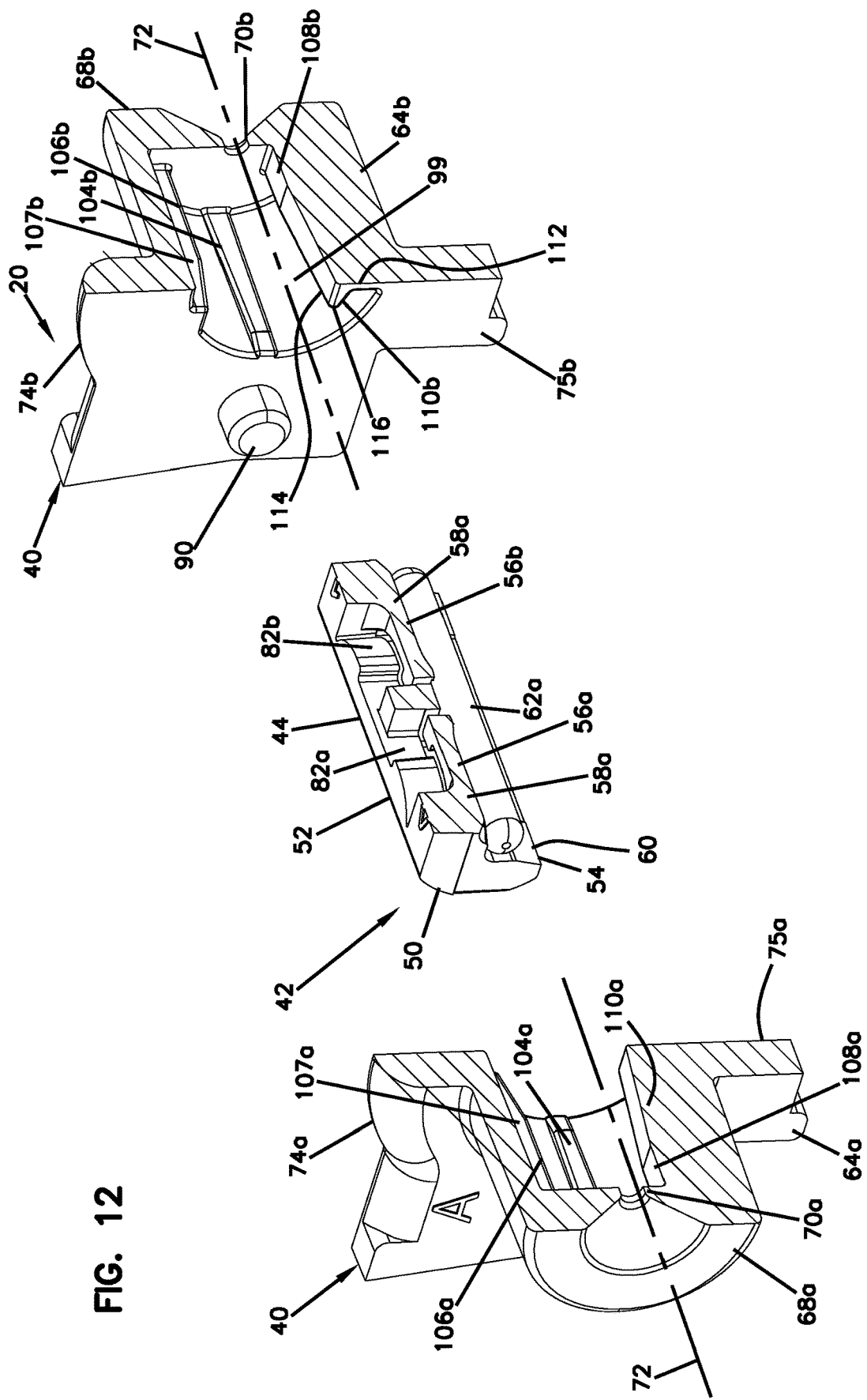
FIG. 12 is a cross-sectional view taken along section line 12-12 of FIG. 11.
Figure 13:
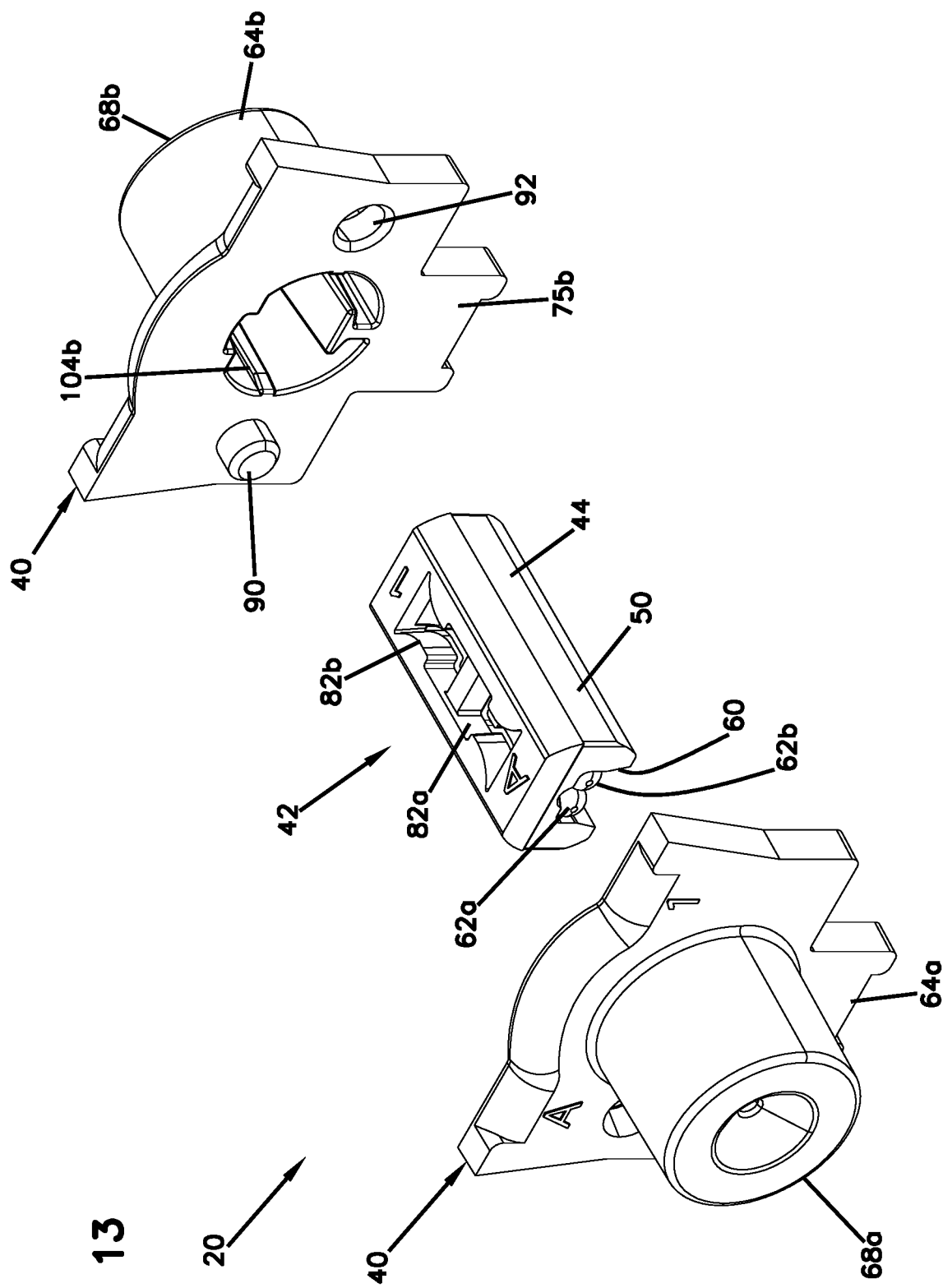
FIG. 13 is a perspective, exploded view of the fiber alignment device of FIG. 1.
Figure 14:
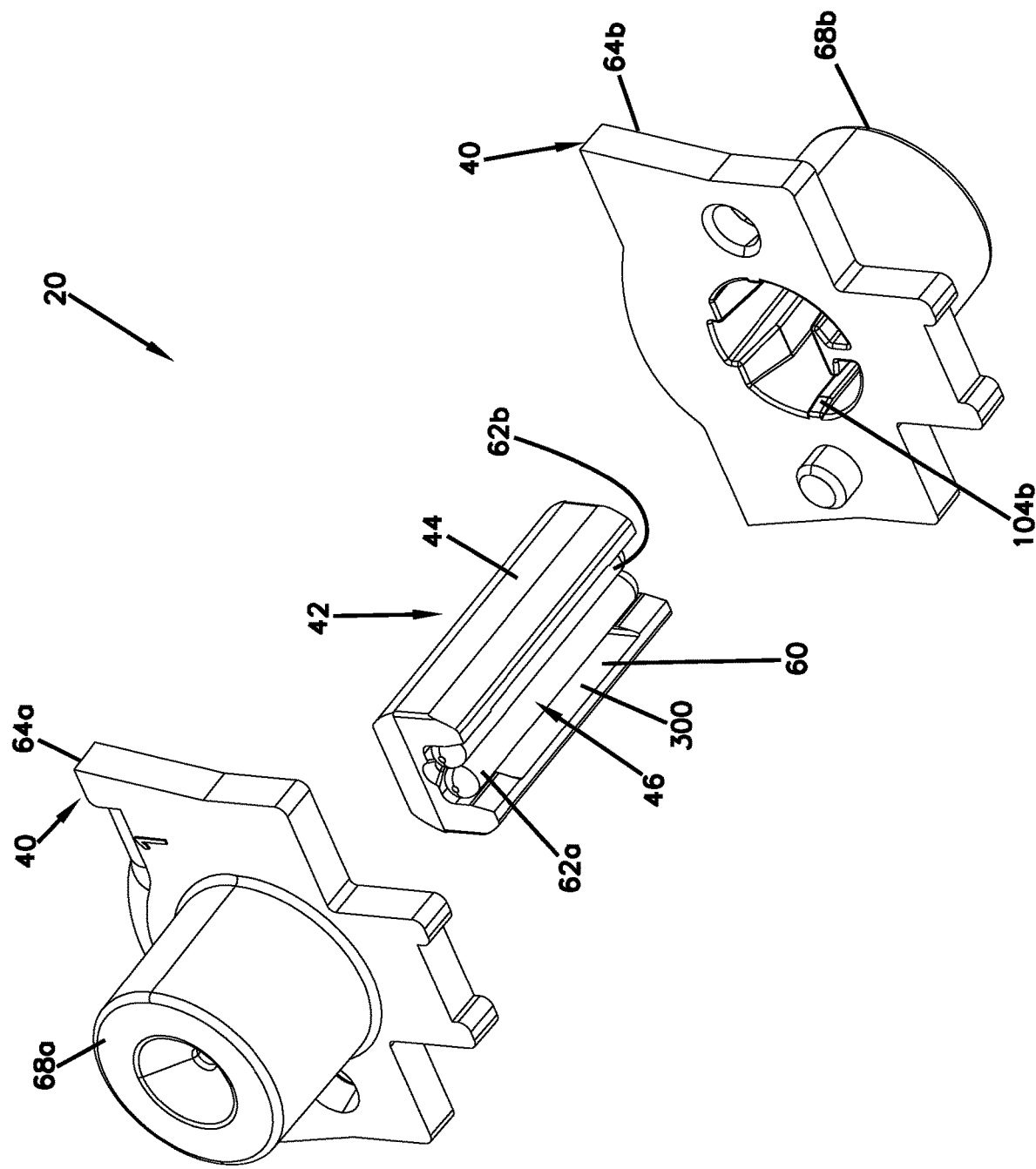
FIG. 14 is another perspective, exploded view of the fiber alignment device of FIG. 1.
Figure 15:
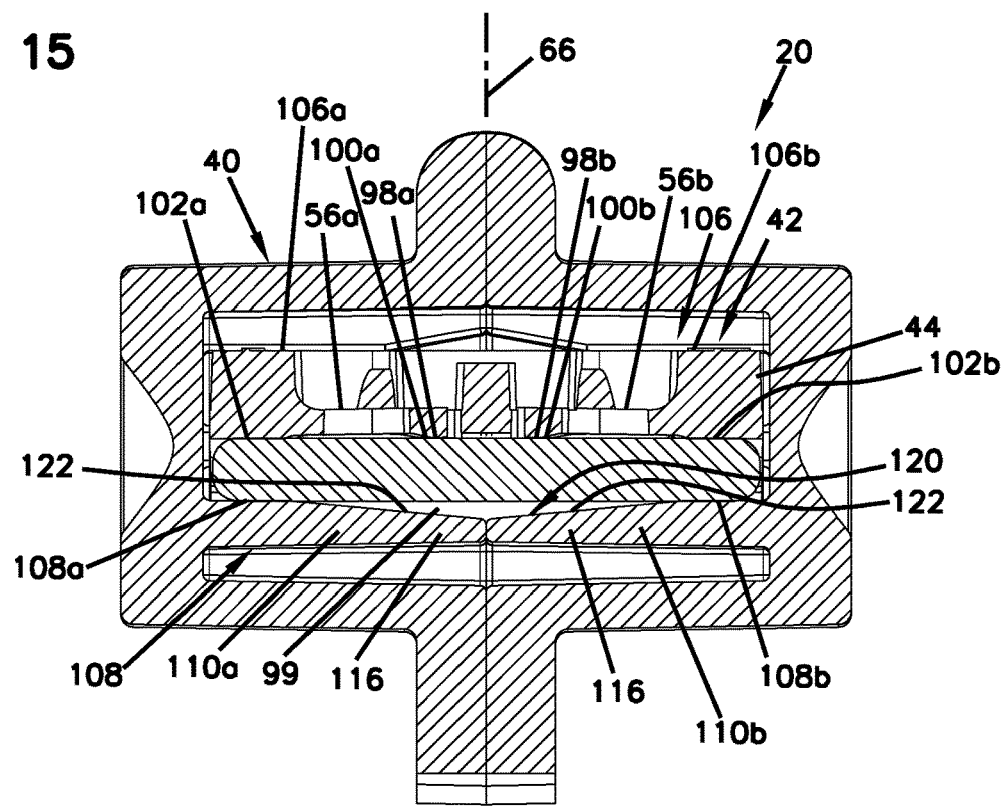
FIG. 15 is a cross-sectional view taken along section line 15-15 of FIG. 3.
Figure 16:
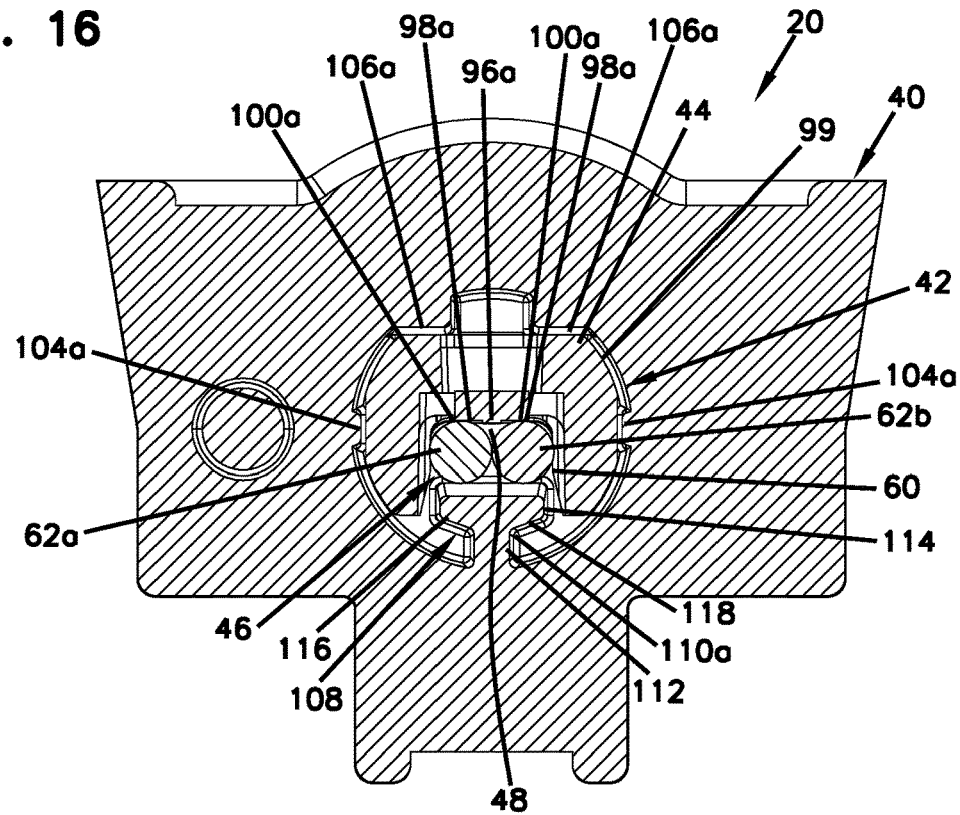
FIG. 16 is a cross-sectional view taken along section line 16-16 of FIG. 7.

Referring back to FIGS. 1-8, the fiber alignment housing 40 includes first and second housing pieces 64a, 64b that meet at a central interface plane 66 (see FIGS. 5-10). In certain examples, the first and second housing pieces 64a, 64b can be half-pieces. The first and second housing pieces 64a, 64b respectively define opposite first and second ends 68a, 68b of the fiber alignment housing 40. The opposite first and second ends 68a, 68b define co-axially aligned first and second fiber insertion openings 70a, 70b that are aligned along a fiber insertion axis 72 (see FIGS. 9, 10 and 12) that is oriented generally perpendicular relative to the central interface plane 66. The first and second housing pieces 64a, 64b include flange portions 74a, 74b that cooperate to define a central flange 74 of the fiber alignment housing 40. Opposing axial end faces 75a, 75b of the flange portions 74a, 74b mate at the central interface plane 66. The axial end faces of the flange portions 74a, 74b can include male projections 90 that fit within corresponding female receptacles 92.

The first and second housing pieces 64a, 64b also include barrel-portions 76a, 76b that project axially outwardly from the flange portions 74a, 74b along the fiber insertion axis 72. The barrel-portions 76a, 76b include axial end faces 78a, 78b. The fiber insertion openings 70a, 70b are defined through the axial end faces 78a, 78b. The axial end faces 78a, 78b also include transition portions 80a, 80b that surround the fiber insertion openings 70a, 70b. Transition portions 80a, 80b can be configured for guiding or directing optical fibers into the fiber insertion openings 70a, 70b. In certain examples, the transition portions 80a, 80b can be tapered or angled relative to the fiber insertion axis 72. In certain examples, the transition portions 80a, 80b can be funnel-shaped When the fiber alignment device 20 is assembled, the fiber alignment groove 48 preferably generally aligns with the fiber insertion axis 72 in a coaxial orientation. Additionally, the elastic cantilever arms 56a, 56b of the fiber engagement component 44 having lengths that extend along (e.g., parallel to and above) the fiber alignment groove 48 as well as the fiber insertion axis 72. The elastic cantilever arms 56a, 56b are provided within recesses 82a, 82b defined through the top side 52 of the main body 50 of the fiber engagement component 44. The recesses 82a, 82b as well as the elastic cantilever arms 56a, 56b are separated by an intermediate cross-rib 84 that provides transverse reinforcement to the fiber engagement component 44. The cross-rib 84 is centrally located between opposite ends 86a, 86b of the main body 50 of the fiber engagement component 44. The cantilever arms 56a, 56b include free ends 88a, 88b adjacent the cross-rib 84 and base ends 58a, 58b generally adjacent to the corresponding opposite ends 86a, 86b of the main body 50. Tapered fiber insertion transitions 87a, 87b are provided at the ends 86a, 86b for guiding fibers into the fiber alignment groove 48.

In certain examples, the parallel rods 62a, 62b can be cylindrical. In certain examples, the parallel rods 62a, 62b can have rounded ends. In certain examples, rounded ends can be dome or semi-spherically shaped. In certain examples, the rounded ends can be configured to guide or direct optical fibers into the fiber alignment groove 48.

The fiber alignment subassembly 42 can include features that ensure precise relative positioning between the fiber engagement component 44 and the guide feature 46. In certain examples, the fiber alignment subassembly 42 can have structures that precisely position the rods 62a, 62b relative to the main body 50 of the fiber engagement component 44, and can also include structures that ensure that the free ends 88a, 88b of the elastic cantilever arms 56a, 56b are positioned at a predetermined spacing from the fiber alignment groove 48. The predetermined spacing can be configured such that fibers can be readily received within the fiber alignment groove 48 without experiencing undue resistance from the elastic cantilever arms 56. Simultaneously, the cantilever arms 56 are positioned close enough to the fiber alignment groove 48 to apply sufficient pressure to the optical fibers received within the fiber alignment groove 48 such that the optical fibers are held and retained within the fiber alignment groove 48 in coaxial alignment with one another.

In certain examples, the free ends 88a, 88b of the cantilever arms 56a, 56b can have a preferred configuration that provides the dual function of contacting optical fibers inserted within the fiber alignment groove 48, and contacting the rods 62a, 62b for causing the cantilever arms 56 to flex relative to the main body 50 to a staged position in which a desired spacing is provided between fiber contact regions of the elastic cantilever arms 56 and the fiber alignment groove 48. In certain examples, the free ends 88a, 88b can include central, downwardly projecting contact portions 96a, 96b that align with the fiber alignment groove 48. In certain examples, the contact portions 96a, 96b are positioned directly above the fiber alignment groove 48. In certain examples, the contact portions 96a, 96b project from main bodies of the elastic cantilever arms 56a, 56b so as to project closer to the fiber alignment groove 48 such that a predefined fiber contact spacing is defined by the contact portions 96a, 96b. In certain examples, the contact portions 96a, 96b are the only portions of the cantilever arms 56a, 56b that contact the optical fibers when the optical fibers are within the fiber alignment grooves 48.

The free ends 88a, 88b also include wing portions 98a, 98b that project laterally outwardly from opposite sides of the contact portions 96a, 96b. The wing portions 98a, 98b are elevated or otherwise offset from the contact portions 96a, 96b so that the wing portions 98a, 98b are not adapted to contact the optical fibers within the fiber alignment groove 48. Instead, the wing portions 98a, 98b include reference surfaces 100a, 100b that contact top sides of the rods 62a, 62b (see FIGS. 15 and 16) to cause the elastic cantilever arms 56 to flex relative to the main body 50 of the fiber engagement component 44 to a position where the contact portions 96a, 96b are spaced a predetermined and precisely controlled amount from the fiber alignment groove 48 when the rods 62a, 62b are pressed in the pocket of the main body 50.

The free ends 88a, 88b can be described as having a hammerhead configuration. The wing portions 98a, 98b can rest on the rods 62a, 62b (e.g., the tops of the rods) prior to insertion of the optical fibers along the fiber insertion axis 72. The rods can be sized such that the optical fibers are level or almost exactly level with the tops of the rods (horizontal tangent to the tops of the fibers are tangent with the tops of the rods). The size (e.g., projection depth) of the contact portions 76a, 76b control the amount of friction/interference generated as the fibers are inserted along the alignment groove. By varying the size of the rods and/or the depth the tabs portions 76a, 76b project, the amount of interference during insertion of the optical fibers into the alignment device and thus the required insertion force can be varied/controlled.

The fiber alignment subassembly 42 also includes structure for ensuring that the guide feature 46 such as the rod 62a, 62b are positioned at a precise location relative to the main body 50 of the fiber engagement component 44. In one example, the main body 50 of the fiber engagement component 44 can include a reference surface arrangement within the elongate pocket including reference surfaces 102a, 102b (see FIG. 15) against which the rods 62a, 62b are pressed when the fiber alignment subassembly 42 is loaded within the fiber alignment housing 40. In certain examples, the reference surfaces 102a, 102b are located generally adjacent the base ends 58a, 58b of the elastic cantilever arms 56a, 56b. In certain examples, the reference surfaces 102a, 102b engage top portions of the rods 62a, 62b when the rods are pressed into the pocket by the housing 40. In certain examples, the reference surfaces 102a, 102b engage first portions of the top sides of the parallel rods 62a, 62b and the reference surfaces 100a, 100b of the wing portions 98a, 98b engage second portions of the top sides of the parallel rods 62a, 62b. In certain examples, reference surfaces 100a, 100b and the reference surfaces 102a, 102b engage the same sides of the rods 62a, 62b (e.g., the reference surfaces all engage the top sides of the rods 62a, 62b). In this way, the reference surfaces 100a, 100b, and the reference surfaces 102a, 102b cooperate to ensure that the contact portions 96a, 96b of the cantilever arms 56a, 56b are positioned at a desired spacing relative to the fiber alignment groove 48. The reference surfaces 102a, 102b establish precise positioning between the main body 50 of the fiber engagement component 44 and the parallel rods 62a, 62b; and the reference surfaces 100a, 100b establish precise positioning between the contact portions 96a, 96b of the cantilever arms 56a, 56b and the rods 62a, 62b.

The reference surfaces 102a, 102b are part of the main body 50 of the fiber engagement component 44 and are preferably mechanically decoupled (mechanically isolated) from the cantilever arms 56a, 56b. Thus, contact and loading between the rods 62a, 62b and the reference surfaces 102a, 102b does not cause the cantilever arms 56a, 56b to deflect. In one example, the reference surfaces 102a, 102b can be raised (e.g., stepped-up, upwardly offset, elevated, etc.) relative to tops sides of the cantilever arms 56a, 56b.

It will be appreciated that the fiber alignment housing 40 defines an internal chamber 99 or cavity for receiving the fiber alignment subassembly 42. Additionally, the fiber alignment housing 40 includes internal features adapted to engage the fiber alignment subassembly 42 to effectively position or center the fiber alignment subassembly 42 within the fiber alignment housing 40. Preferably, the fiber alignment subassembly 42 is centered within the fiber alignment housing 40 such that the fiber alignment groove 48 coaxially aligns with the fiber insertion axis 72. In certain examples, the fiber alignment housing 40 includes side rails 104 that engage opposite sides of the fiber engagement component 44 to laterally center the fiber alignment subassembly 42. In certain examples, the side rails 104 include a pair of opposing side rails 104a defined by the first housing piece 64a and a pair of opposing side rails 104b defined by the second housing piece 64b.

The fiber alignment housing 40 can also include internal structure for vertically centering the fiber alignment subassembly 42 within the fiber alignment housing 40. The internal structure can include an upper subassembly positioning surface arrangement 106 and a lower subassembly positioning surface arrangement 108 between which the fiber alignment subassembly 42 is vertically compressed. In certain examples, the upper subassembly positioning surface arrangement 106 can engage the top side 52 of the main body 50 of the fiber engagement component 44 and the lower subassembly positioning surface arrangement 108 can engage the bottom sides of the rods 62a, 62b. In this way, the rods 62a, 62b can be compressed by the lower subassembly positioning surface arrangement 108 into the elongate pocket 60. In certain examples, the lower subassembly positioning surface arrangement 108 includes surfaces 108a, 108b positioned adjacent opposite ends of the rods 62a, 62b. In certain examples, surfaces 108a can be defined by the first housing piece 64a and surfaces 108b can be defined by the second housing piece 64b. The rods 62a, 62b can extend through a majority of the axial length of the fiber alignment housing 40. In certain examples, the lower subassembly positioning surfaces 108a, 108b can generally align with and oppose the reference surfaces 102a, 102b. In certain examples, the lower subassembly positioning surfaces 108a, 108b can be positioned adjacent to the fiber insertion openings 70a, 70b, respectively. In certain examples, the upper subassembly positioning surface arrangement 106 can include surfaces 106a, 106b defined by corresponding rails 107a, 107b.

In certain examples, the lower subassembly positioning surfaces 108a, 108b can be defined by corresponding tee-beams 110a, 110b. The tee-beam 110a corresponds to the first housing piece 64a and the tee-beam 110b corresponds to the second housing piece 64b. The tee-beams 110 have tee-shaped cross-sections defined by webs 112 and flanges 114. The flanges 114 are transversely oriented relative to the webs 112 and include flange portions 116, 118 that project outwardly from the webs 112. The flanges 114 include end faces 120 that oppose the bottom sides of the rods 62a, 62b. Portions of the end faces 120 define the lower subassembly positioning surfaces 108a, 108b. Flange portions 116 are adapted to engage the rod 62a and flange portions 118 are adapted to engage the rod 62b. Space beneath the flange portions 116, 118 allow the flange portions 116, 118 to flex slightly upon contact with the rods 62a, 62b when the rods 62a, 62b are compressed against the reference surfaces 102a, 102b of the main body 50 of the fiber engagement component 44. The end faces 120 also include angled non-contact sections 122 that angle away from the rods 62a, 62b as the angled portions extend away from their corresponding fiber insertion openings 70a, 70b and toward the central interface plane 66. Thus, contact between the positioning surfaces 108a, 108b of the alignment housing 40 and the bottom sides of the rods 62a, 62b is eliminated at the middle portion (e.g., at the central interface plane 66) of the alignment housing 40. This can prevent bulging at the middle portion. Additionally, within the pocket of the main body 50 at the middle portion, the side walls of the pocket are notched (e.g., recessed) at recessed regions 300 to prevent lateral contact between the rods 62a, 62b and the main body 50 to inhibit bulging of the main body at the middle portion.

When the fiber alignment device 20 is assembled, the fiber engagement component 44 is compressed between the upper subassembly positioning surfaces 106a, 106b and the first and second rods 62a, 62b. Also, the first and second rods 62a, 62b are compressed between the lower subassembly positioning surfaces 108a, 108b and the reference surfaces 102a, 102b of the fiber engagement component 44. The fiber engagement component 44 and the first and second rods 62a, 62b are compressed together between the upper and lower subassembly positioning surfaces 106, 108.

In certain examples, the main body 50 includes fiber insertion lead-in structures 302a, 302b at opposite ends of the main body 50. The lead-in structures 302a, 302b can extend through the reference surfaces 102a, 102b. The lead-in structures 302a, 302b can be axially aligned with the fiber insertion axis 72, the fiber alignment groove 48, the transition portions 80a, 80b of the alignment housing 40 and the contact portions 96a, 96b of the cantilever arms 56a, 56b. Each of the lead-in structures 302a, 302b includes a tapered section 304 (e.g., a partial funnel, partial cone, etc.) that leads into a non-tapered groove section 306.

Figure 22:
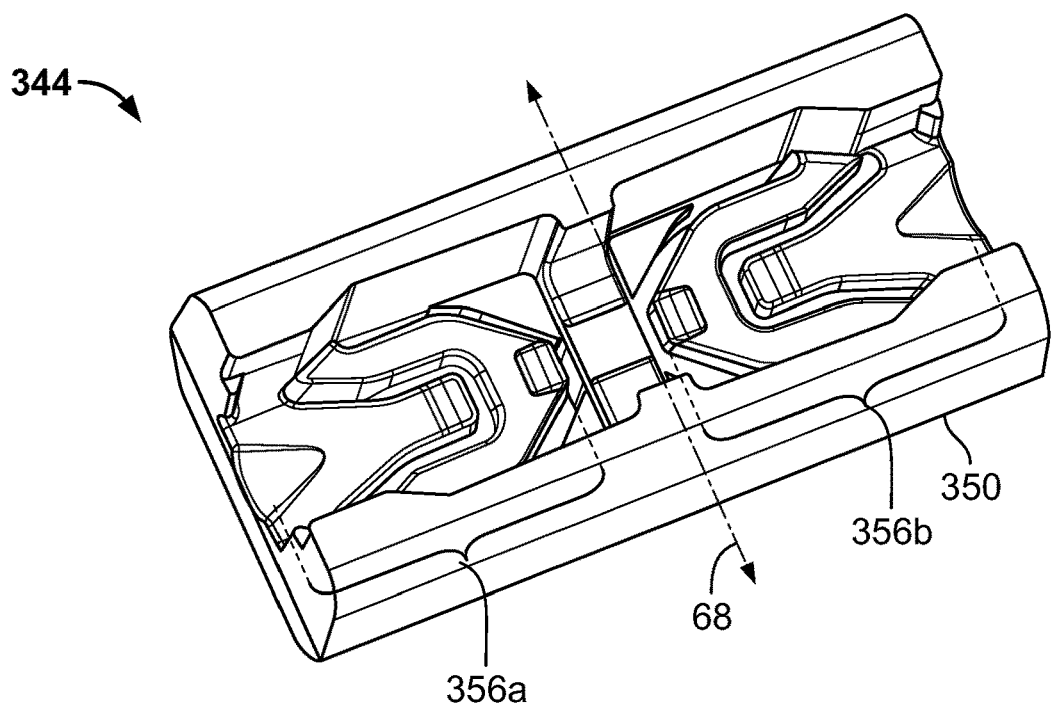
FIG. 22 depicts an alternative fiber engagement component in accordance with the principles of the present disclosure that can be incorporated as part of a fiber alignment subassembly in accordance with the principles of the present disclosure, the fiber engagement component includes sets of flexible cantilevers for pressing optical fibers into corresponding a fiber groove of the fiber alignment subassembly, each set of flexible cantilevers includes at least two flexible cantilevers, the sets of cantilevers are positioned on opposite sides of a central interface plane that bisects the fiber alignment subassembly and is perpendicular relative to a fiber insertion axis that is parallel to the fiber alignment groove.

FIG. 22 shows another configuration for a fiber engagement component 344 that can replace the fiber engagement component 44 in the fiber alignment subassembly 42 of the fiber alignment device 20. The fiber engagement component 344 includes a main body 350 and two sets of cantilevers 356a, 356b for pressing two separate optical fibers desired to be optically coupled together into the fiber alignment groove 48 of the guide feature 46 or into a groove of an alternative guide feature. Each of the sets 356a, 356b of cantilevers includes at least two cantilevers aligned along the fiber insertion axis 72. The sets of cantilevers 356a, 356b are each located on opposite sides of the central interface plane 68. The first set of cantilevers 356a is adapted for pressing a first optical fiber into the fiber alignment groove and the second set of cantilevers 356b is adapted for pressing a second optical fiber into the fiber alignment groove such that the first and second fibers co-axially align with each other with end faces opposing one another adjacent the central interface plane 68 such that the optical fibers are optically coupled together.

Figure 23:
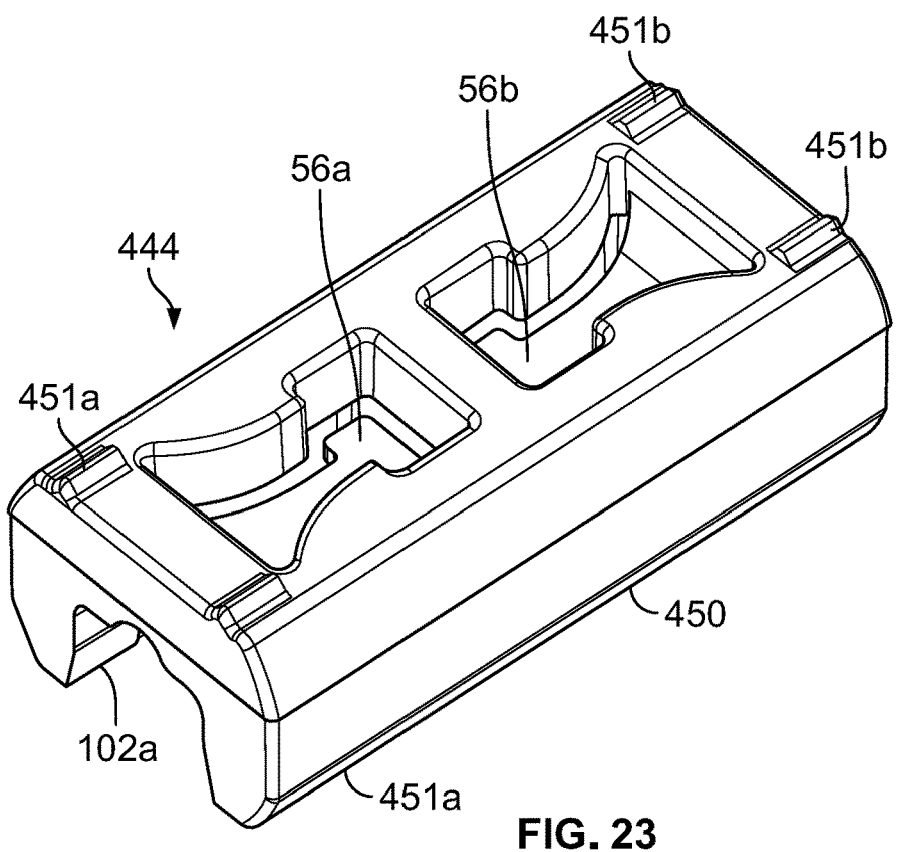
FIG. 23 depicts an alternative fiber engagement component in accordance with the principles of the present disclosure that can be incorporated as part of a fiber alignment subassembly in accordance with the principles of the present disclosure, the fiber engagement component includes sets of crush ribs that crush when the fiber alignment subassembly is assembled within a corresponding outer fiber alignment housing.
Figure 24:
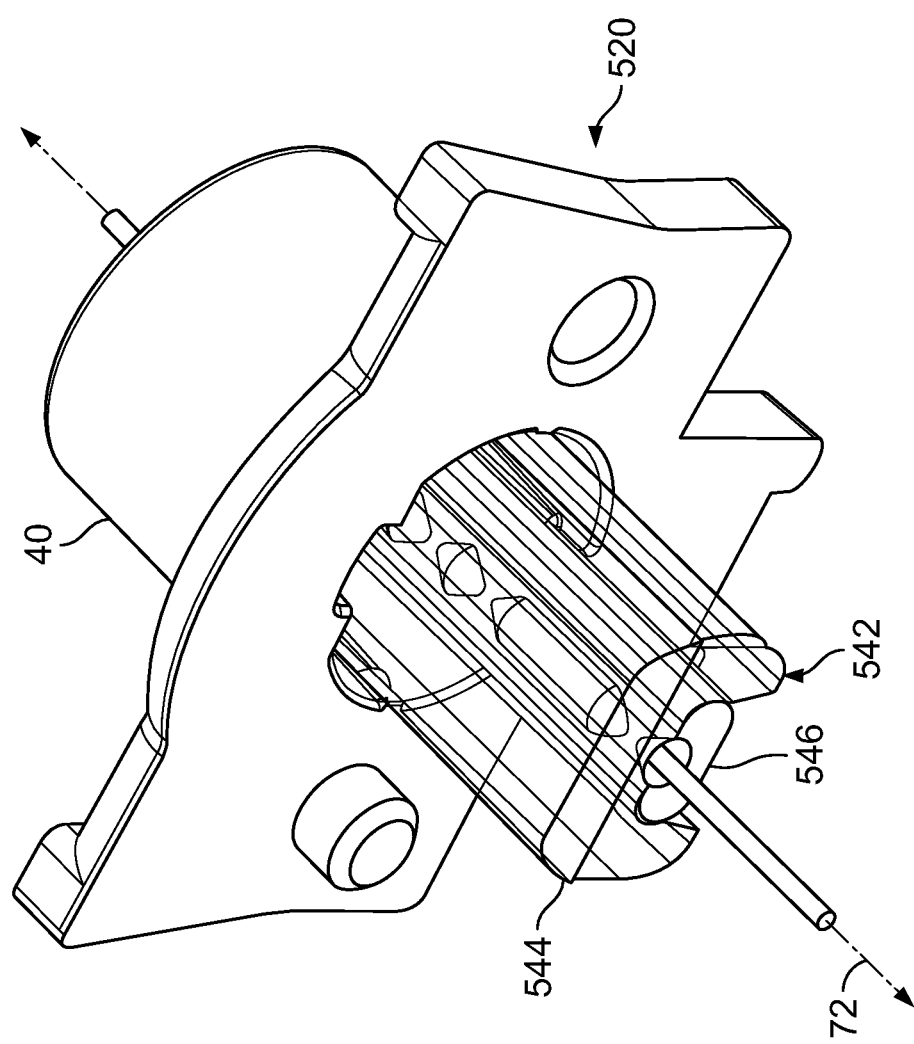
FIG. 24 depicts another fiber alignment device in accordance with the principles of the present disclosure with a half of the outer fiber alignment housing removed to depict the interior fiber alignment subassembly.
Figure 25:
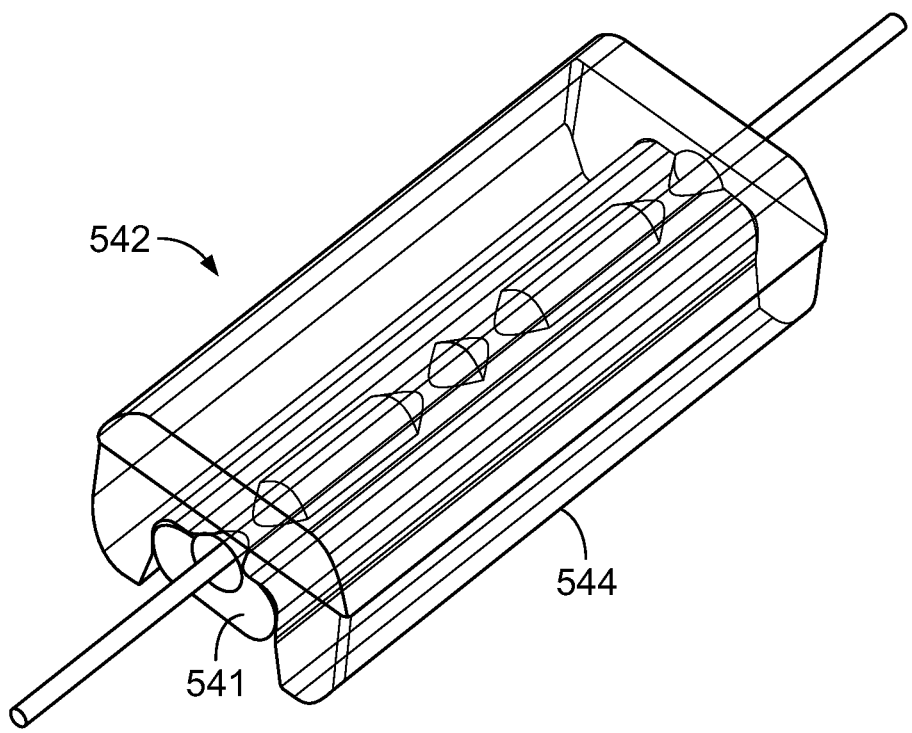
FIG. 25 depicts the fiber alignment subassembly of the fiber alignment device of FIG. 24.
Figure 26:
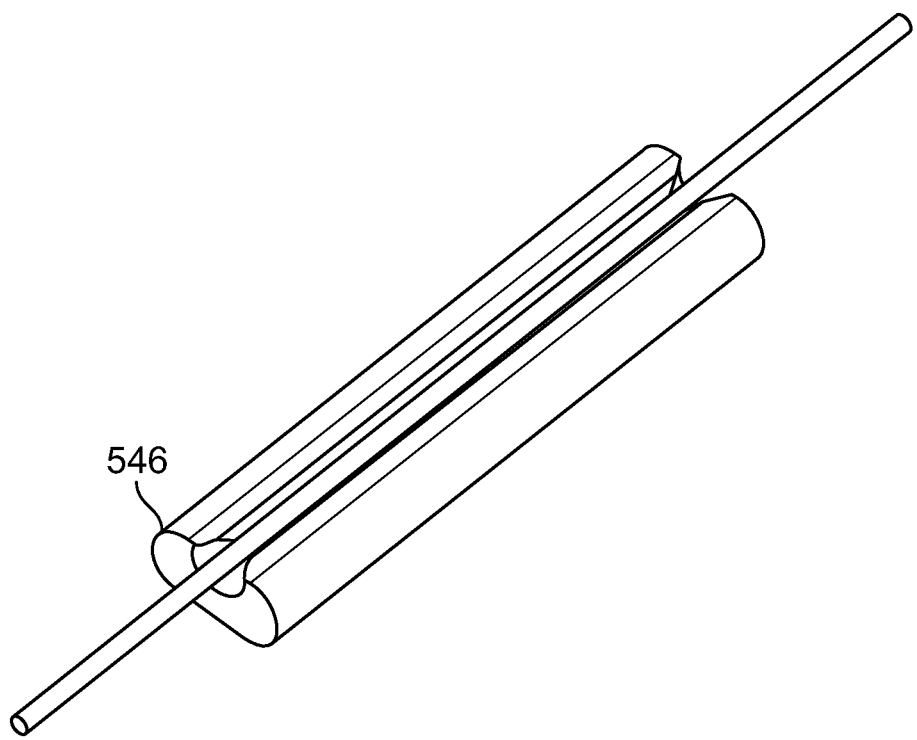
FIG. 26 depicts a guide feature of the fiber alignment subassembly if FIG. 25.
Figure 27:
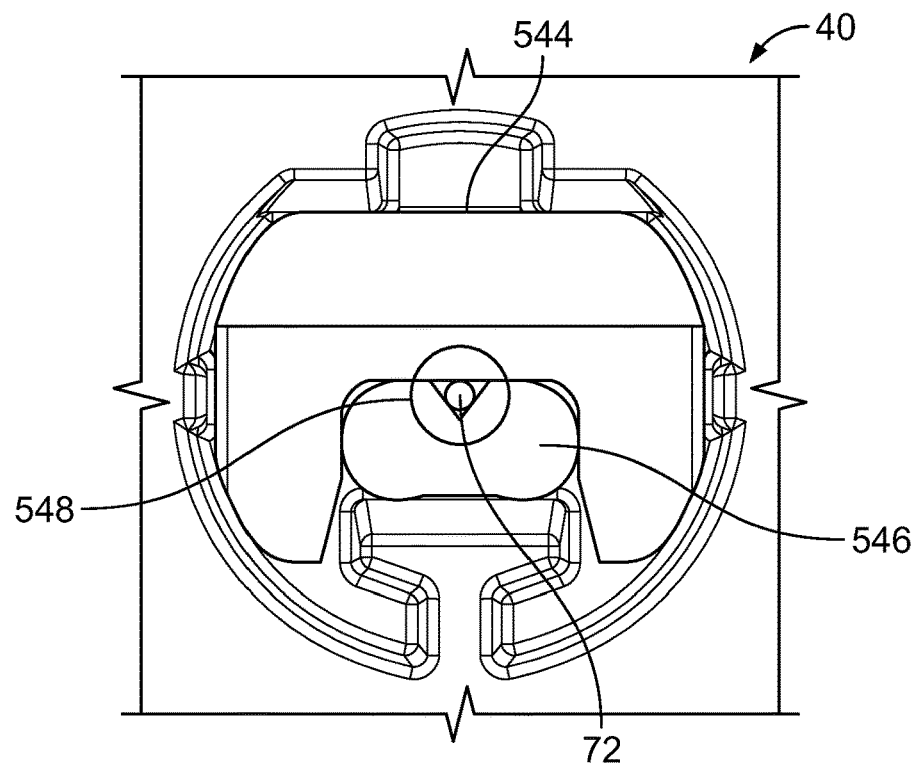
FIG. 27 is a cross-sectional view of the fiber alignment device of FIG. 24.
Figure 28:
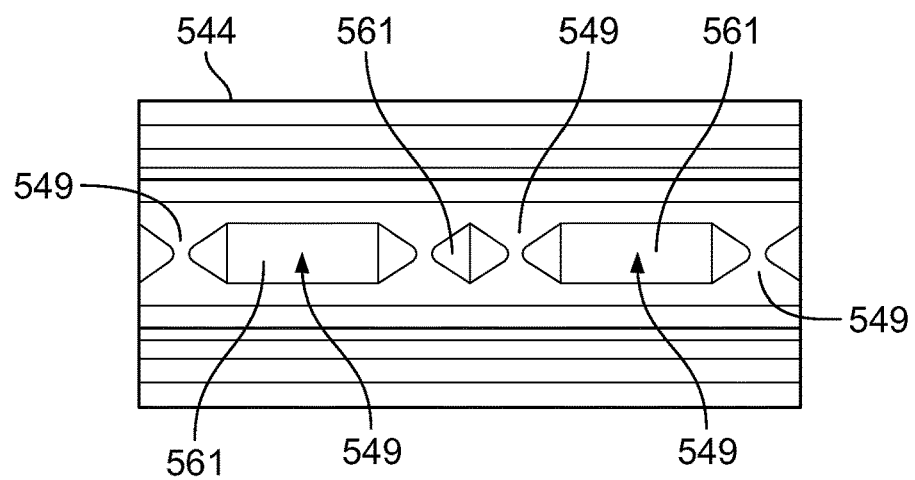
FIG. 28 is a bottom plan view of a fiber engagement component of the fiber alignment subassembly FIG. 25.
Figure 29:
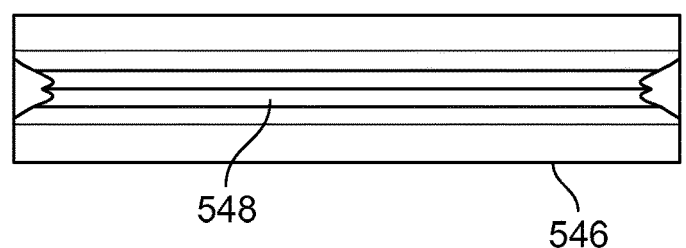
FIG. 29 is a top plan view of the guide feature of FIG. 26.
Figure 30:
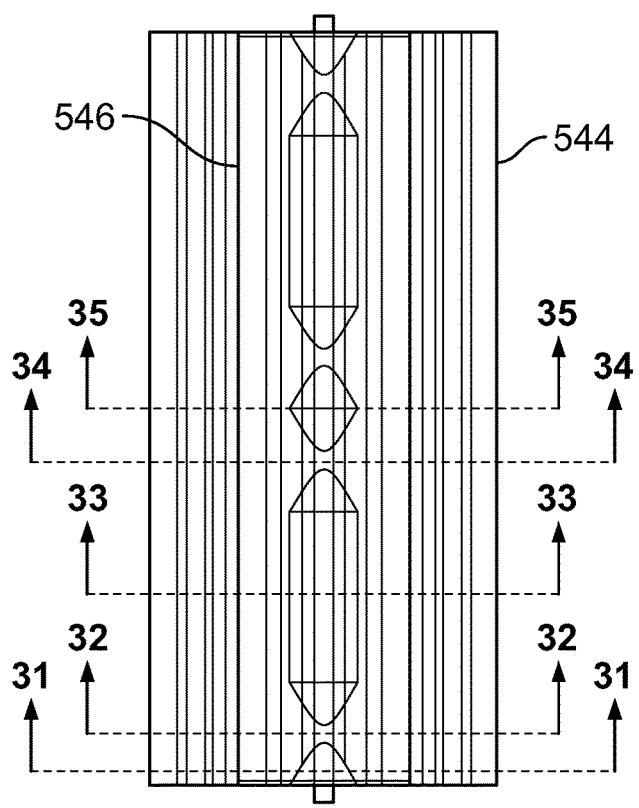
FIG. 30 is a top view of the fiber alignment subassembly of FIG. 25.
Figure 31:
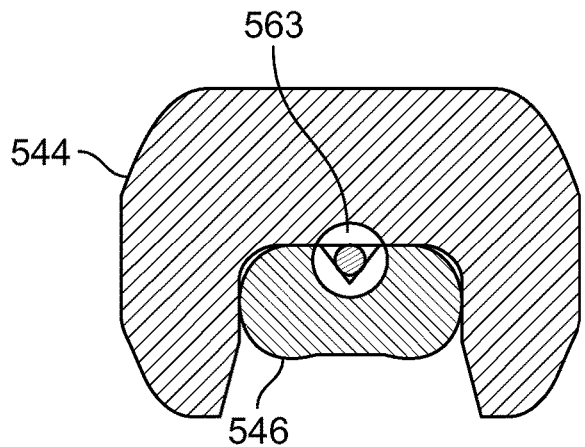
FIG. 31 is a cross-sectional view take along section line 31-31 of FIG. 30.
Figure 32:
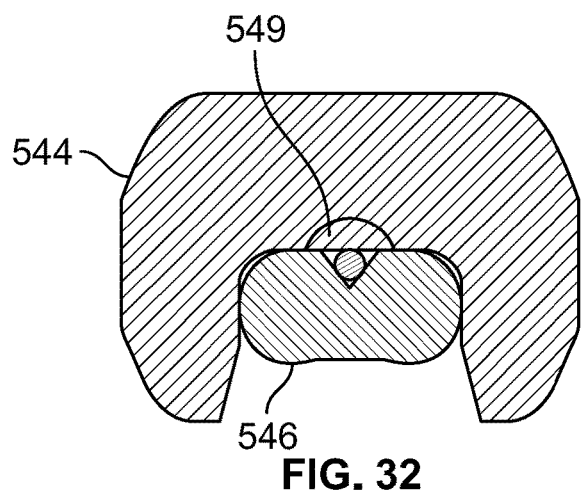
FIG. 32 is a cross-sectional view take along section line 32-32 of FIG. 30.
Figure 33:
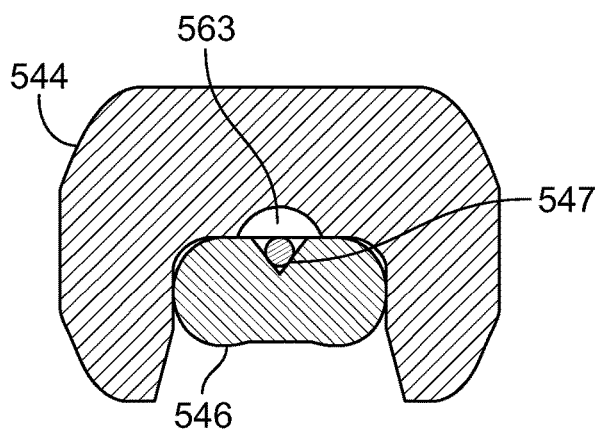
FIG. 33 is a cross-sectional view take along section line 33-33 of FIG. 30.
Figure 34:
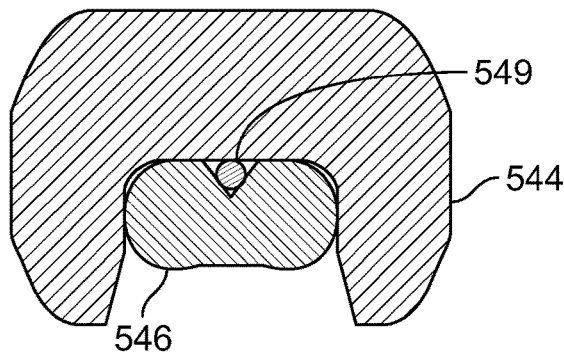
FIG. 34 is a cross-sectional view take along section line 34-34 of FIG. 30.
Figure 35:
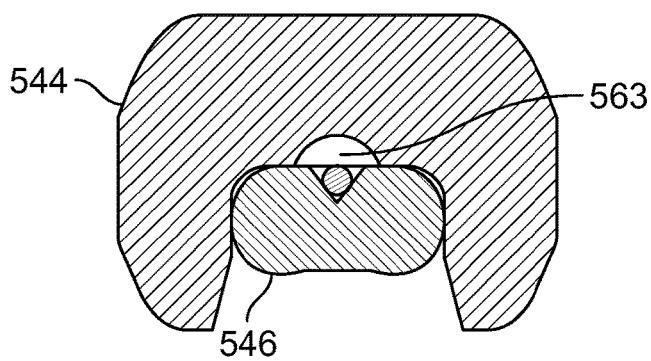
FIG. 35 is a cross-sectional view take along section line 35-35 of FIG. 30.

FIG. 23 shows another configuration for a fiber engagement component 444 that can replace the fiber engagement component 44 in the fiber alignment subassembly 42 of the fiber alignment device 20. The fiber engagement component 444 includes a main body 450 and unitary cantilever arms 56a, 56b of the type previously described. The main body 450 can have a similar or the same construction as the main body 50, except the main body 450 includes sets of crush ribs 451a, 451b at opposite ends of the main body at the top side of the main body 450. The crush ribs 451a, 451b are positioned above the respective reference surfaces 102a, 102b so that crushing of the ribs 451a, 451b does not cause flexing of the arms 56a, 56b (e.g., the ribs are decoupled from the arms 56a, 56b). In one example, the ribs 451a, 451b and the corresponding reference surfaces 102a, 102b are oriented such that they are intersected by a vertical reference plane that is perpendicular to the insertion axis 72. The crush ribs 451a, 451b and configured to deform when the fiber engagement component 444 and the guide feature 46 are assembled into the alignment housing to reduce the level of manufacturing precision needed for the assembly.

FIGS. 24-35 depict another fiber alignment device 520 in accordance with the principles of the present disclosure. The fiber alignment device includes an alternative fiber alignment subassembly 542 configured to mount in a fiber alignment housing such as the alignment housing 40. The fiber alignment subassembly 542 includes a groove opposing component 544 and a guide feature 546 that are separate pieces. In one example, the groove opposing component 544 and the guide feature 546 are separately molded polymeric (e.g., plastic) pieces. In one example, the groove opposing component 544 and the guide feature 546 are separately injection molded polymeric (e.g., plastic) pieces. The guide feature can define a fiber alignment groove 548 (e.g., a v-groove, a semi-circular groove, a semi-elliptical groove, etc.). The fiber alignment subassembly 542 mounts within the alignment housing 40 with the groove opposing component 544 and the guide feature 546 cooperating to define a fiber alignment passage 547 aligned along the fiber insertion axis 72. The fiber alignment passage 547 can have a fixed transverse cross-section shape that does not change or deform when optical fibers are inserted therein. In certain examples, the groove opposing component 544 does not include any cantilevers or any other structures that deflect or elastically deform when an optical fiber is inserted in the fiber alignment passage. The groove opposing component 544 can include one or more groove opposing surfaces 549 that oppose and block an open side of the groove 548 when the guide feature 546 and the groove opposing component 544 are assembled together in the alignment housing. The groove opposing component 544 and the guide feature 546 can be compressed or held together in the alignment housing in the same manner described herein with respect to earlier described examples. The groove opposing surfaces 549 can be planar in some examples. The groove opposing component can also include slots 561 (e.g., grooves, open regions, reliefs, recesses, etc.) that align with the insertion axis 72 and the groove 548 and that extends axially between the groove opposing surfaces 549. The slots 561 provide axially spaced-apart spaces 563 (see FIGS. 31, 33 and 35) for receiving a flowable material such as gel and reduce the amount of contact that occurs between the optical fibers and the groove opposing component 544 during fiber insertion along the insertion axis 72. This reduces friction and can reduce fiber insertion forces. The groove opposing surfaces 549 can be axially separated by the spaces 563.

Figure 36:
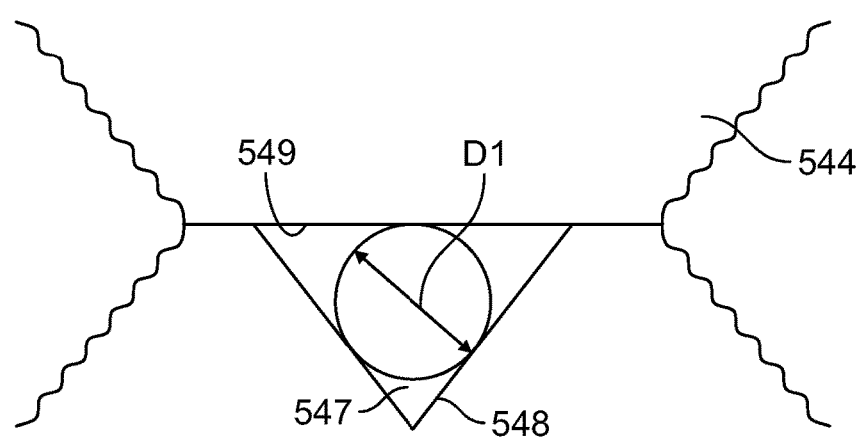
FIG. 36 is a diagrammatic view of a transverse cross-sectional shape of a fiber alignment passage of the fiber alignment device of FIG. 24.
Figure 37:
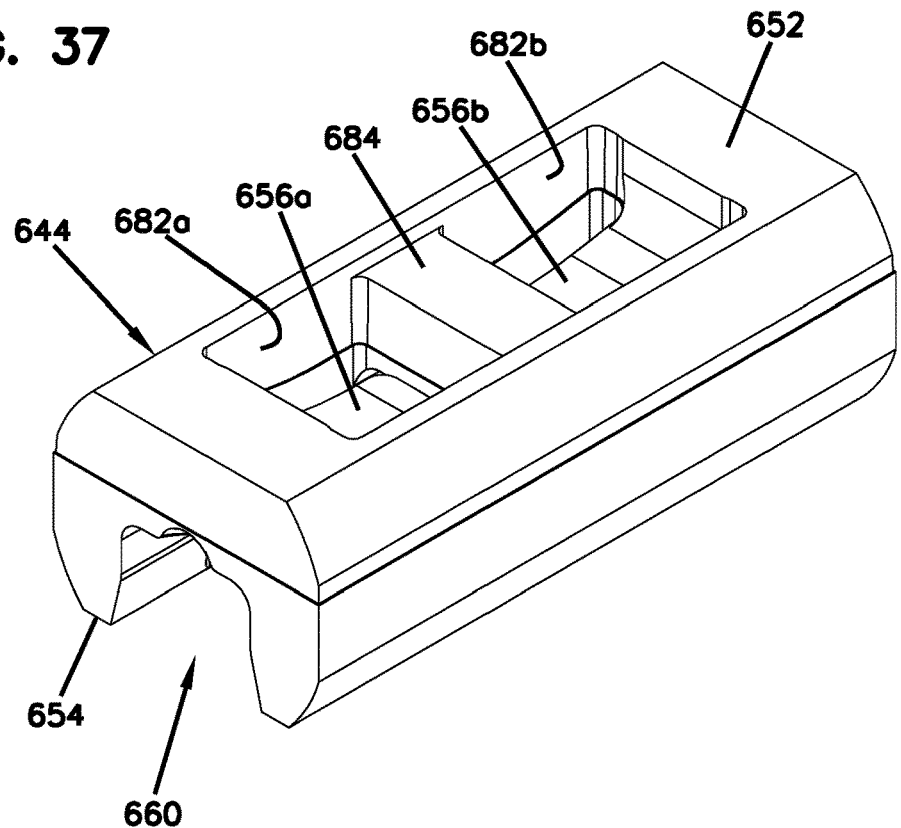
FIG. 37 is depicts an alternative fiber engagement component in accordance with the principles of the present disclosure that can be incorporated as part of a fiber alignment subassembly in accordance with the principles of the present disclosure, the fiber engagement component includes cantilever arms having a generally uniform width.
Figure 38:
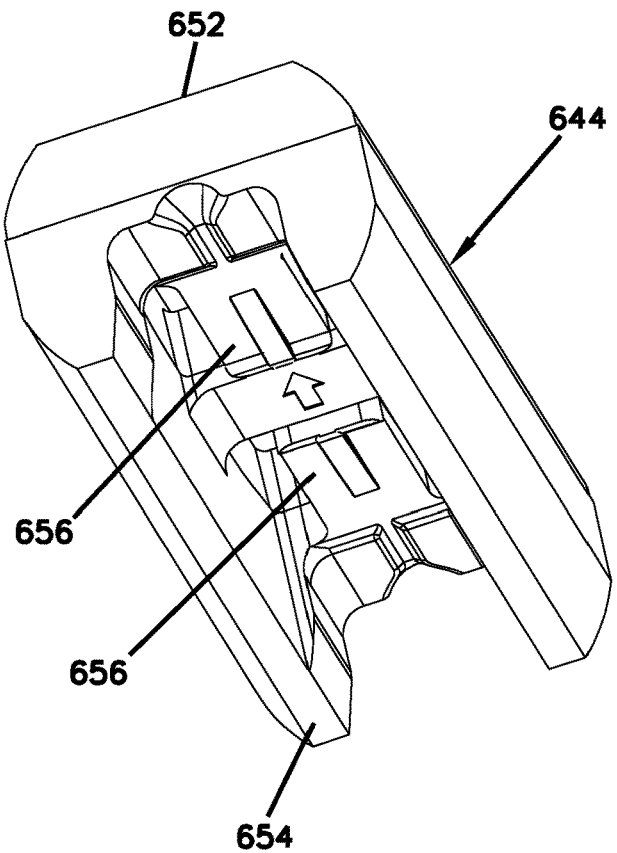
FIG. 38 is a bottom perspective view of the fiber engagement component of FIG. 37.

The fiber alignment passage 547 can include a fixed transverse cross-sectional shape that is only slightly larger than the outer diameter of the optical fibers desired to be inserted in the passage 547. In one example, the fixed transverse cross-sectional shape has a cross-dimension that is no more than 1.5 microns larger than the outer diameter of the optical fibers desired to be aligned and optically coupled by the fiber alignment device 520. In one example, the fixed transverse cross-sectional shape has a cross-dimension that is no more than 1.0 microns larger than the outer diameter of the optical fibers desired to be aligned and optically coupled by the fiber alignment device 520. In one example, the fixed transverse cross-sectional shape has a cross-dimension that is no more than 0.5 microns larger than the outer diameter of the optical fibers desired to be aligned and optically coupled by the fiber alignment device 520. The cross-dimension is the diameter D1 of the largest circle defined within the transverse cross-sectional shape (see FIG. 36). I one example, the cross-dimension D1 is in the range of 125.5-126.5 microns and is adapted for aligning bare optical fibers having an outer cladding diameter of 125 microns.

FIGS. 37-42 depict another example fiber engagement component 644 suitable for use with a guide feature 46, 546 to form a fiber alignment subassembly in accordance with the principles of the present disclosure. The fiber alignment subassembly is configured to mount in a fiber alignment housing, such as the alignment housing 40. In one example, the fiber engagement component 644 and the guide feature are separately molded polymeric (e.g., plastic) pieces. In one example, the fiber engagement component 644 and the guide feature are separately injection molded polymeric (e.g., plastic) pieces.

The fiber engagement component 644 and a guide feature define a fiber alignment groove. The fiber engagement component 644 can include a plastic or polymeric structure (e.g., a molded plastic part) which can include a main body 650 defining a top side 652 (see FIG. 37) and a bottom side 654 (see FIG. 38). The fiber engagement component 644 can also include elastic cantilever arms 656a, 656b. In one example, the elastic cantilever arms 656a, 656b are unitarily formed as one piece with the main body 650 of the fiber engagement component 644. For example, the elastic cantilever arms 656a, 656b can include base ends 658 that are monolithically connected with the main body 650.

When the fiber alignment device is assembled, the fiber alignment groove preferably generally aligns with the fiber insertion axis 672 in a coaxial orientation. Additionally, the elastic cantilever arms 656a, 656b of the fiber engagement component 644 have lengths that extend along (e.g., parallel to and above) the fiber alignment groove as well as the fiber insertion axis 672. The elastic cantilever arms 656a, 656b are provided within recesses 682a, 682b defined through the top side 652 of the main body 650 of the fiber engagement component 644.

The recesses 682a, 682b as well as the elastic cantilever arms 656a, 656b are separated by an intermediate cross-rib 684 that provides transverse reinforcement to the fiber engagement component 644. The cross-rib 684 is centrally located between opposite ends of the main body 650 of the fiber engagement component 644. Free ends 688 of the cantilever arms 56a, 56b are disposed adjacent the cross-rib 684. In the example shown in FIG. 37, the cross-rib 684 is recessed relative to the top 652 of the main body 650 of the fiber engagement component 644.

In certain implementations, a length $L_B$ of the cross-rib 684 (FIG. 41) is at least one-third of a length L (FIG. 39) of one of the cantilever arms 656. In certain implementations, a length $L_B$ of the cross-rib 684 (FIG. 41) is at least half of a length L (FIG. 39) of one of the cantilever arms 656.

The bottom side 654 of the main body 650 can define an elongate pocket 660 that is open in a downwardly facing direction. The guide feature can include parallel rods, such as rods 62a, 62b, that fit within the elongate pocket 660 and that cooperate to define the fiber alignment groove. When the fiber alignment subassembly is installed within the fiber alignment housing, the fiber alignment housing includes structure that forces, compresses or otherwise retains/holds the rods in the elongate pocket 660 such that the fiber alignment housing assists in positioning and retaining the rods within the open sided elongate pocket 660.

The fiber alignment subassembly includes structures that ensure that the free ends 688a, 688b of the elastic cantilever arms 656a, 656b are positioned at a predetermined spacing from the fiber alignment groove. The predetermined spacing can be configured such that fibers can be readily received within the fiber alignment groove without experiencing undue resistance from the elastic cantilever arms 656. Simultaneously, the cantilever arms 656 are positioned close enough to the fiber alignment groove to apply sufficient pressure to the optical fibers received within the fiber alignment groove such that the optical fibers are held and retained within the fiber alignment groove in coaxial alignment with one another.

Figure 39:
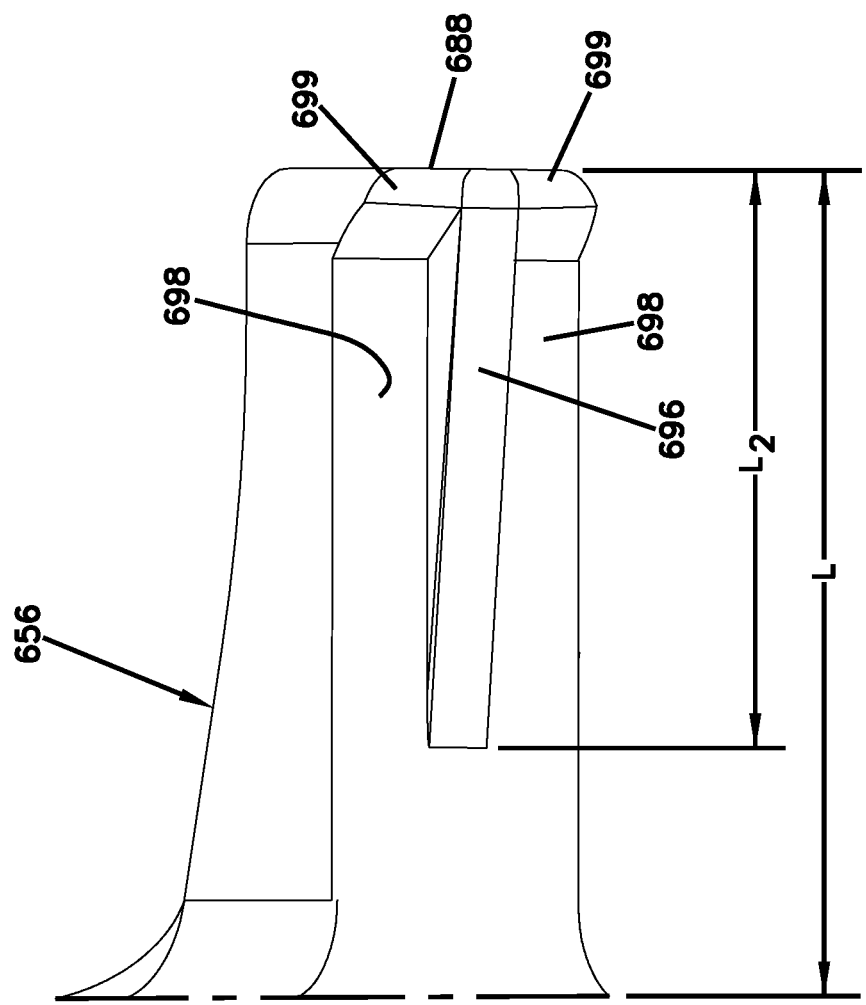
FIG. 39 is a perspective view of one of the cantilever arms of the fiber engagement component of FIG. 37.
Figure 40:
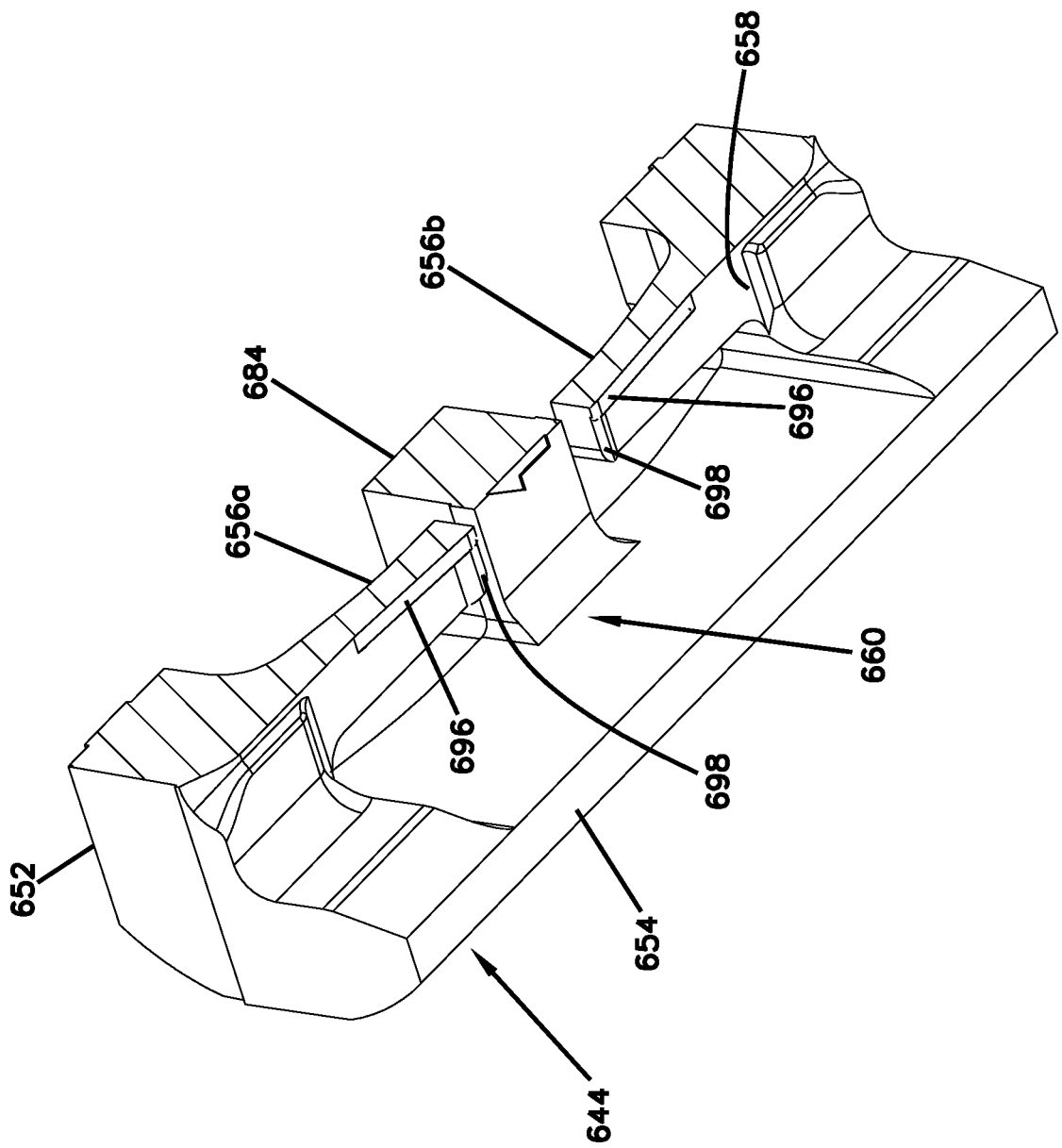
FIG. 40 is a bottom perspective, cross-sectional view of the fiber engagement component of FIG. 37.

As shown in FIG. 39, the free end 688 of each cantilever arm 656 can have a preferred configuration that provides the dual function of contacting optical fibers inserted within the fiber alignment groove, such as fiber alignment groove 48, and contacting the rods, such as rods 62a, 62b, for causing the cantilever arms 656 to flex relative to the main body 650 to a staged position in which a desired spacing is provided between fiber contact regions of the elastic cantilever arms 656 and the fiber alignment groove. In certain examples, the free end 688 can include a central, downwardly projecting tab portion 696 that aligns with the fiber alignment groove. In certain examples, the tab portion 696 is positioned directly above the fiber alignment groove. In certain examples, the tab portion 696 projects from main body of the elastic cantilever arms 656 so as to project closer to the fiber alignment groove such that a predefined fiber contact spacing is defined by the tab portion 696. In certain examples, the tab portion 696 is the only portion of the cantilever arm 656 that contact the optical fiber when the optical fiber is within the fiber alignment groove.

The free end 688 of the cantilever arm 656 also includes wing portions 698 that project laterally outwardly from opposite sides of the tab portion 696. The wing portions 698 are elevated or otherwise offset from the contact portions 696 so that the wing portions 698 are not adapted to contact the optical fibers within the fiber alignment groove. Instead, the wing portions 698 include reference surfaces 699 that contact top sides of the rods to cause the elastic cantilever arm 656 to flex relative to the main body 650 of the fiber engagement component 644 to a position where the contact portions 696 are spaced a predetermined and precisely controlled amount from the fiber alignment groove when the rods are pressed in the pocket of the main body 650.

In certain implementations, the respective wing portions 698 extend between the tip 688 and the base 658 of each cantilever arm 656. In certain examples, each cantilever arm 656 has a relatively constant width W along a length L of the cantilever arm 656.

In certain implementations, the tab portion 696 has a length L2 that is less than the length L of the cantilever arm 656. In certain examples, the length L2 of the tab portion 696 is greater than half the length L of the cantilever arm 656.

In certain examples, the tab portion 696 defines a ramp that tapers outwardly from the main body of the cantilever arm 656 as the ramp extends towards the free end 688 of the cantilever arm 656. In an example, the fiber contact surface of the ramp is straight and planar. In an example, the fiber contact surface has a constant slope.

The wing portions 698 can rest on the rods (e.g., the tops of the rods) prior to insertion of the optical fibers along the fiber insertion axis 672. The rods can be sized such that the optical fibers are level or almost exactly level with the tops of the rods (horizontal tangent to the tops of the fibers are tangent with the tops of the rods). The size (e.g., projection depth) of the tab portion 696 controls the amount of friction/interference generated as the fiber is inserted along the alignment groove. In certain examples, the reference surfaces 699 of the wing portions 698 are flat. In certain examples, the reference surfaces 699 of the wing portions 698 extend parallel to the top-most surface of the rods.

The cantilever arm 656 applies a clamping force which holds the fibers in coaxial alignment in the alignment groove. Due to friction between the fiber and the components that the fiber touches (i.e., the cantilever arm 656 and the rods) the amount of force required to insert the fiber into the alignment housing is proportional to the clamping force. As the fiber is inserted under the tab portion 696, the clamping force, and therefore the insertion force, changes in a way that is determined by the geometry of the tab portion 696 and the dimensions of the cantilever arm 656 (e.g. the length L in FIG. 39; the thickness T1, T2 in FIG. 41; the width W in FIG. 42). Once the fiber has been inserted past the end 688 of the cantilever arm 656, the clamping force and insertion force are approximately constant.

The fiber is held fixed at one end within the plug connector body, and protrudes from the plug connector a distance. When the fiber is inserted into the alignment housing, the distal end of the fiber is held in place by the cantilever arm 656. Accordingly, the fiber is a column of material that is fixed at one end and approximately fixed at the other end. This column will buckle if the insertion force exceeds the buckling force for this column. The buckling force is inversely proportional to the square of the distance over which the fiber protrudes from the plug connector. The buckling force also is proportional to the second moment of area of the fiber. So, for example, if the fiber is coated, the second moment of area will be larger, and the buckling force will be higher.

In certain implementations, the tab portion 696 of each cantilever arm 656 is shaped to minimize the maximum insertion force. In most applications, it is preferable that the maximum insertion force is less than the buckling force. In some applications, the maximum insertion force is less than half of the buckling force. In other applications, the maximum insertion force is less than one quarter of the buckling force.

In certain examples, the tab portion 696 applies between about 1 N and about 0.2 N of force to the fiber. In certain examples, the tab portion 696 is shaped and dimensioned to apply about 0.22 N of force to the fiber as the fiber is inserted along the alignment groove. In certain examples, the tab portion 696 is shaped and dimensioned to apply about 0.39 N of force to the fiber as the fiber is inserted along the alignment groove. In certain examples, the tab portion 696 is shaped and dimensioned to apply about 0.88 N of force to the fiber as the fiber is inserted along the alignment groove.

In certain examples, the tab portion 696 is configured with a clamping force that requires no more than about 0.2 N of force to be applied to the fiber as the fiber is inserted along the alignment groove. In certain examples, the tab portion 696 is configured with a clamping force that requires no more than about 0.14 N of force to be applied to the fiber as the fiber is inserted along the alignment groove. In certain examples, the tab portion 696 is configured with a clamping force that requires no more than about 0.08 N of force to be applied to the fiber as the fiber is inserted along the alignment groove. In certain examples, the tab portion 696 is configured with a clamping force that requires no more than about 0.06 N of force to be applied to the fiber as the fiber is inserted along the alignment groove. In certain examples, the tab portion 696 is configured with a clamping force that requires no more than about 0.04 N of force to be applied to the fiber as the fiber is inserted along the alignment groove.

Figure 41:
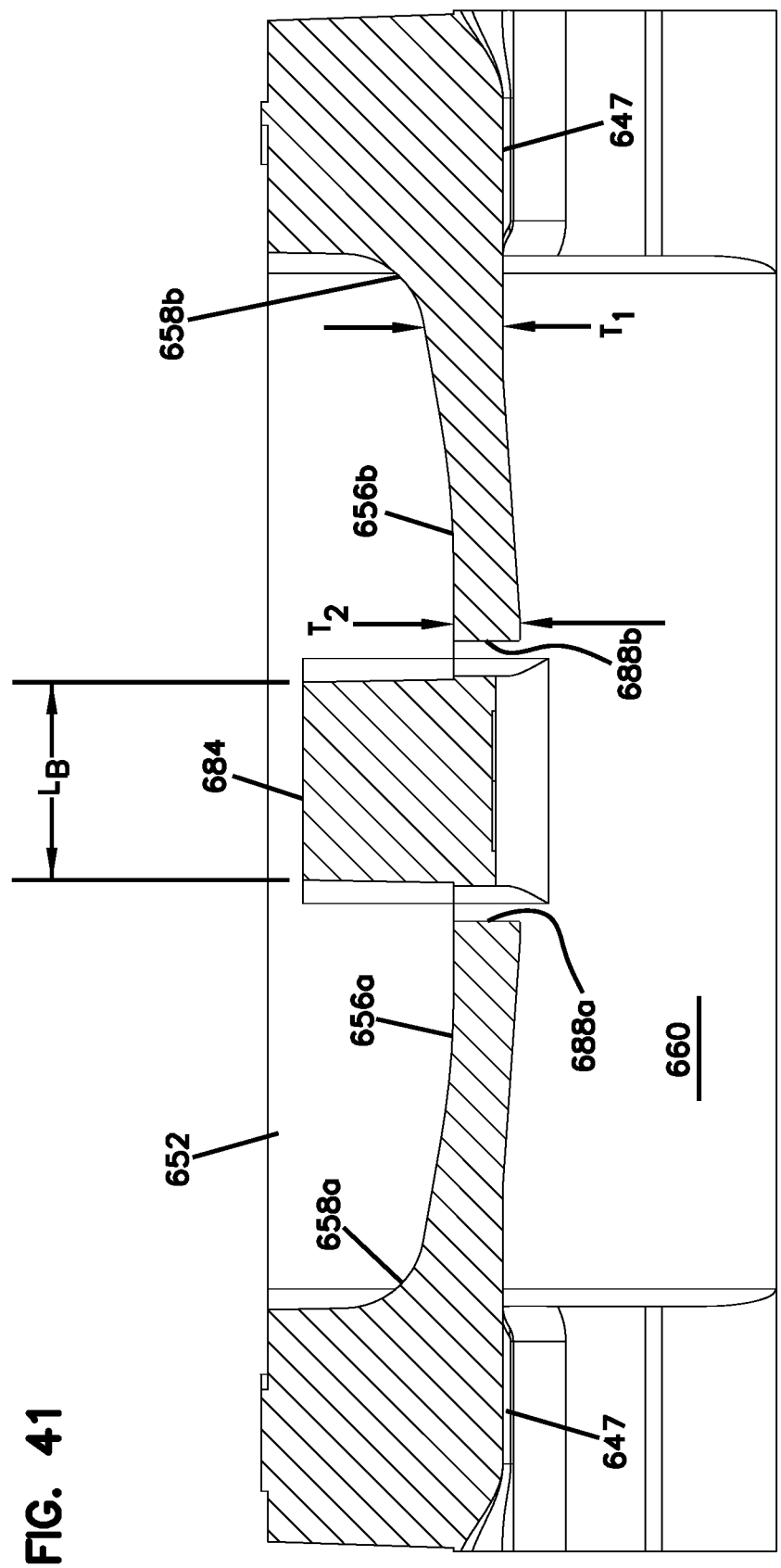
FIG. 41 is a cross-sectional view of the fiber engagement component of FIG. 37 taken along the 41-41 line of FIG. 42.
Figure 42:
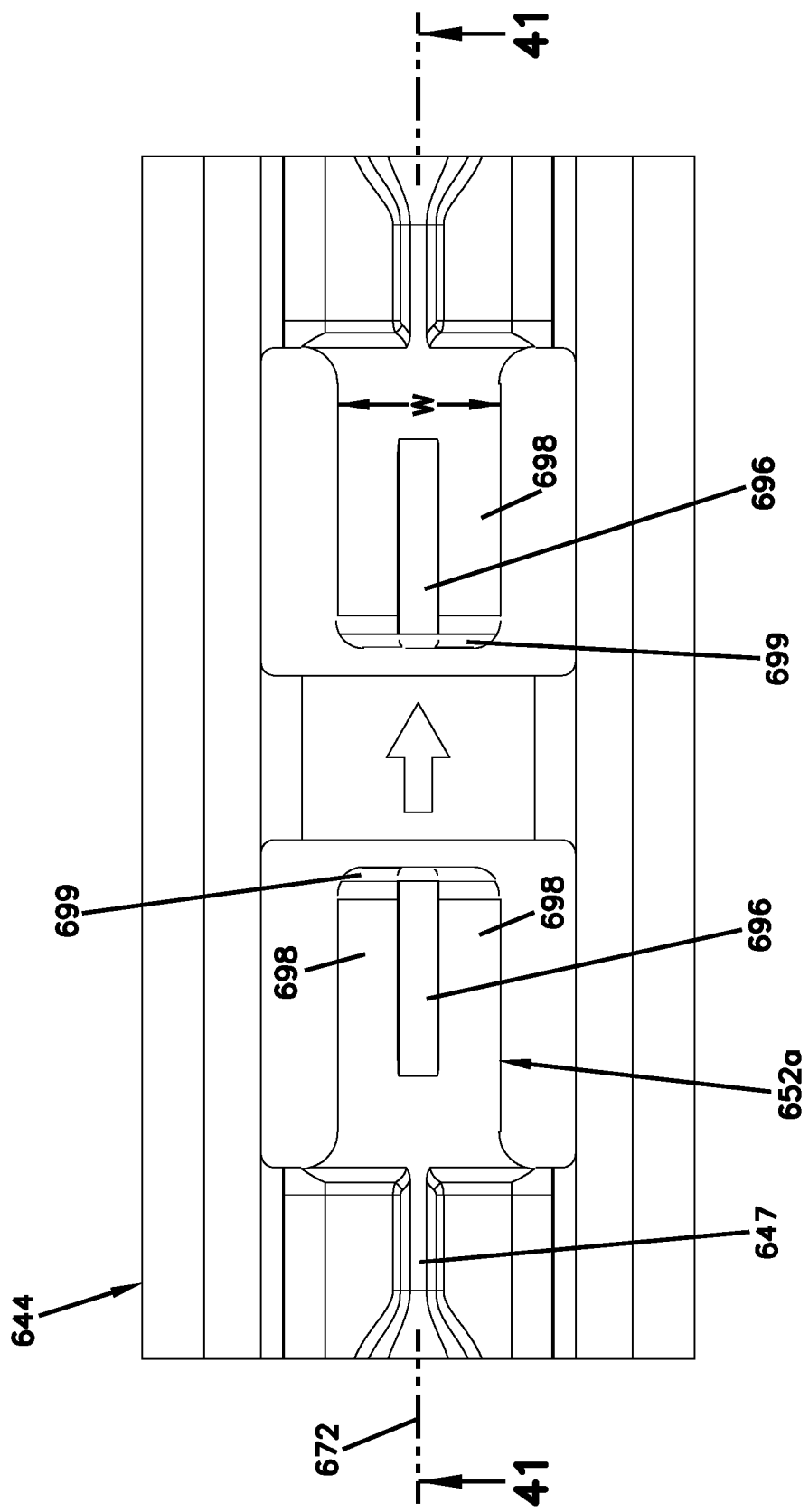
FIG. 42 is a bottom plan view of the fiber engagement component of FIG. 37.
Figure 45:
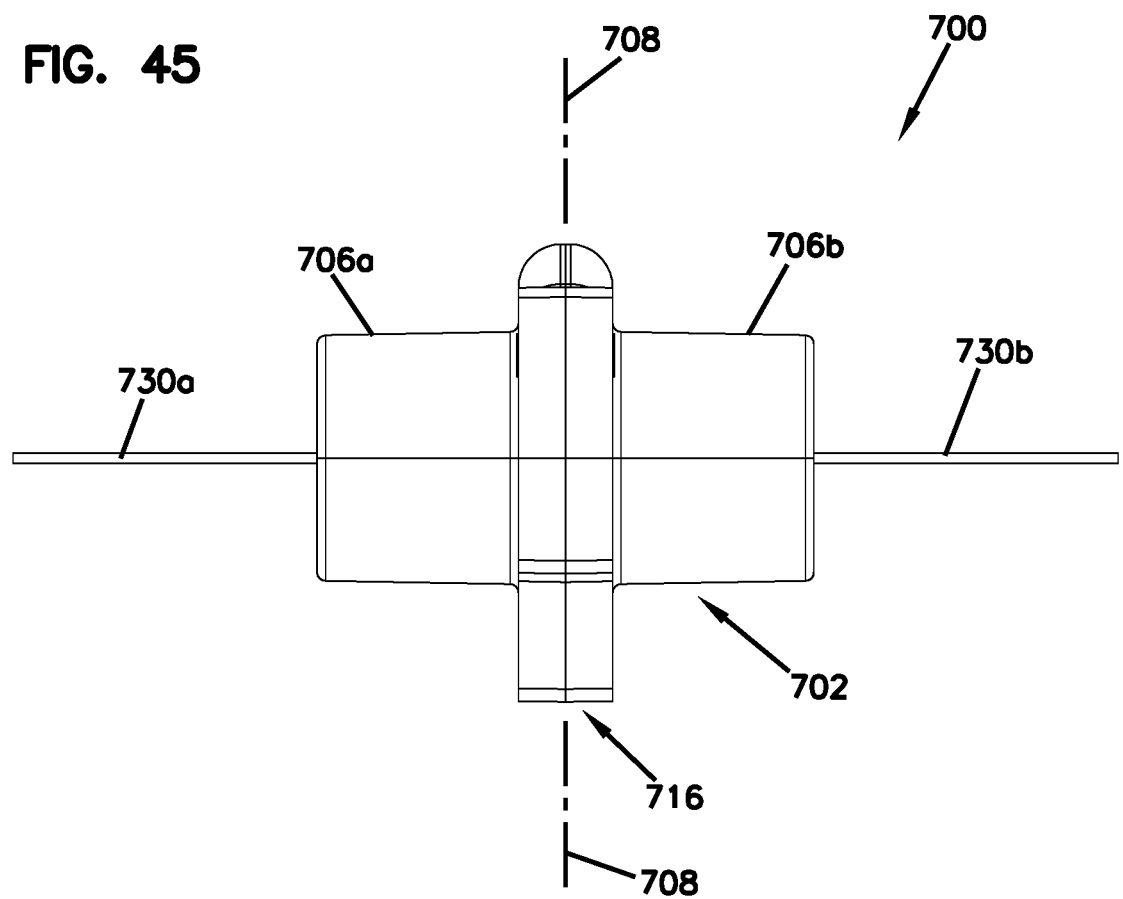
FIG. 45 is a left side view of the fiber alignment device of FIG. 43.
Figure 46:
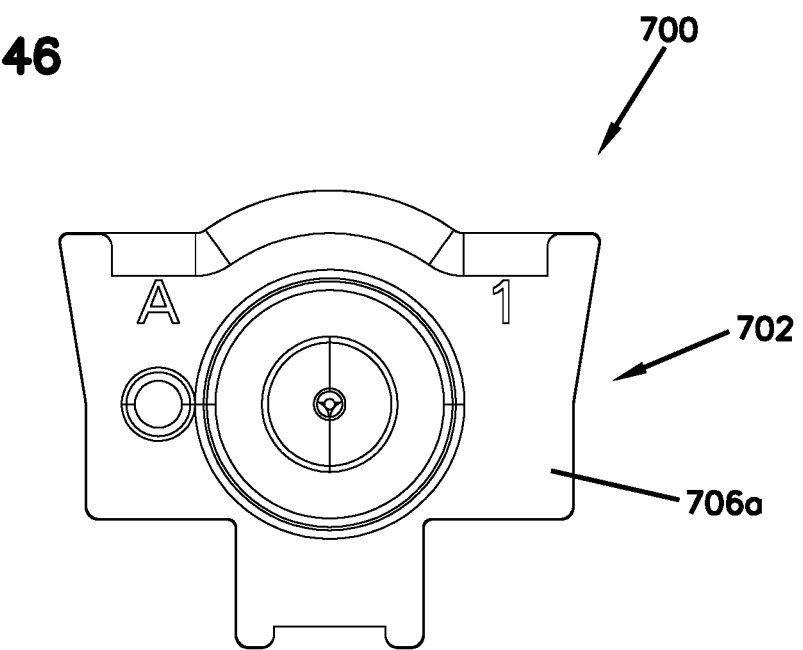
FIG. 46 is a front view of the fiber alignment device of FIG. 43.
Figure 47:
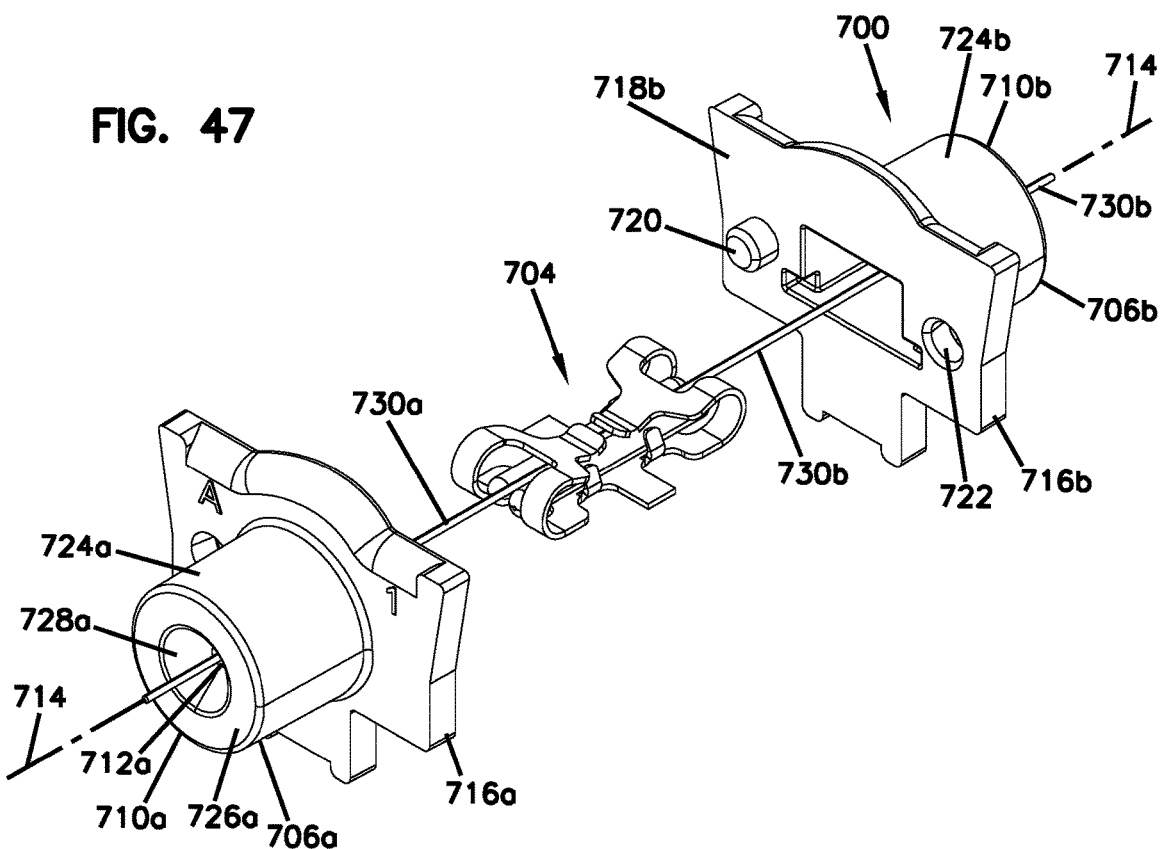
FIG. 47 is a perspective, exploded view of the fiber alignment device of FIG. 43.
Figure 48:
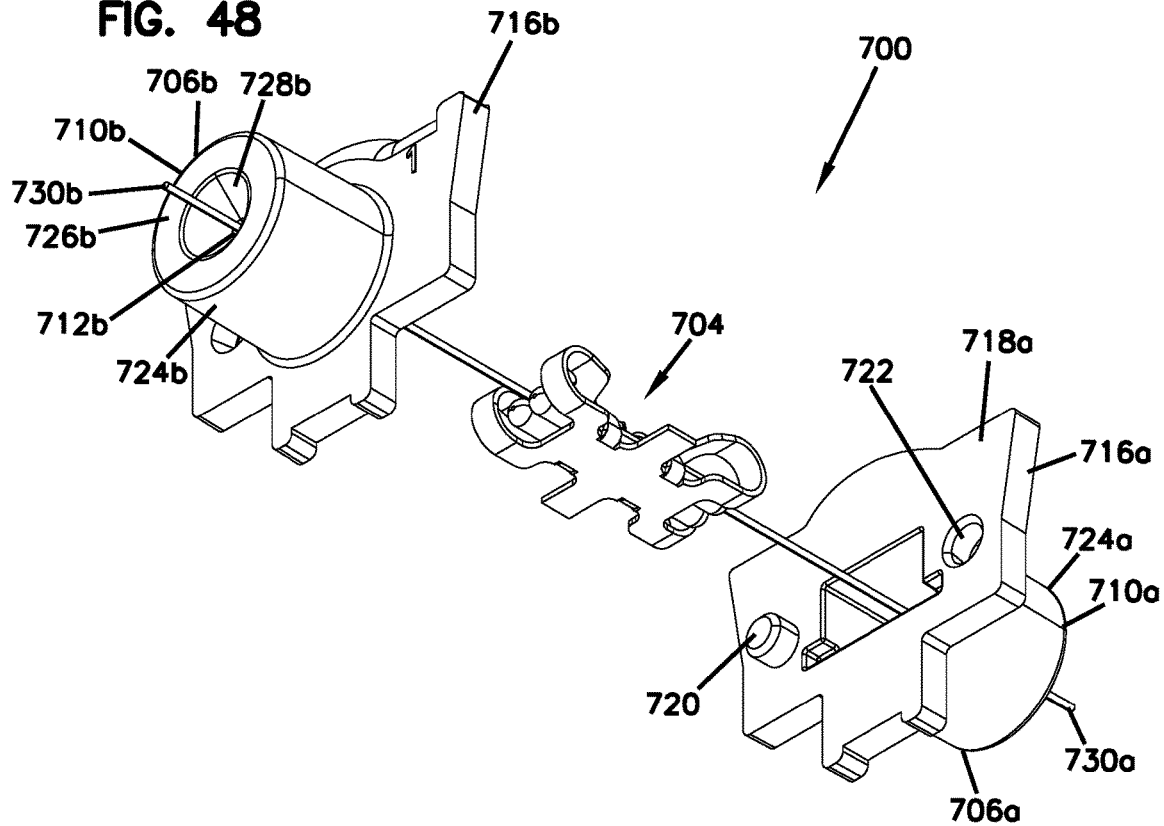
FIG. 48 is another perspective, exploded view of the fiber alignment device of FIG. 43.
Figure 49:
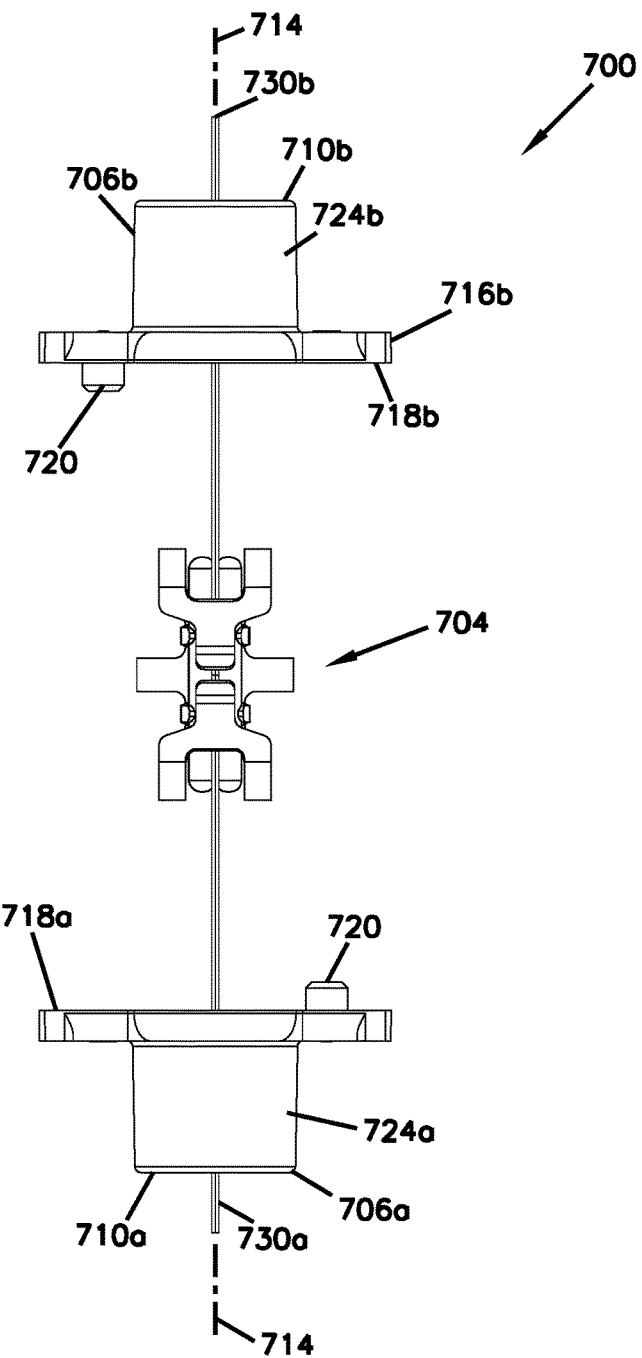
FIG. 49 is an exploded, top view of the fiber alignment device of FIG. 43.
Figure 50:
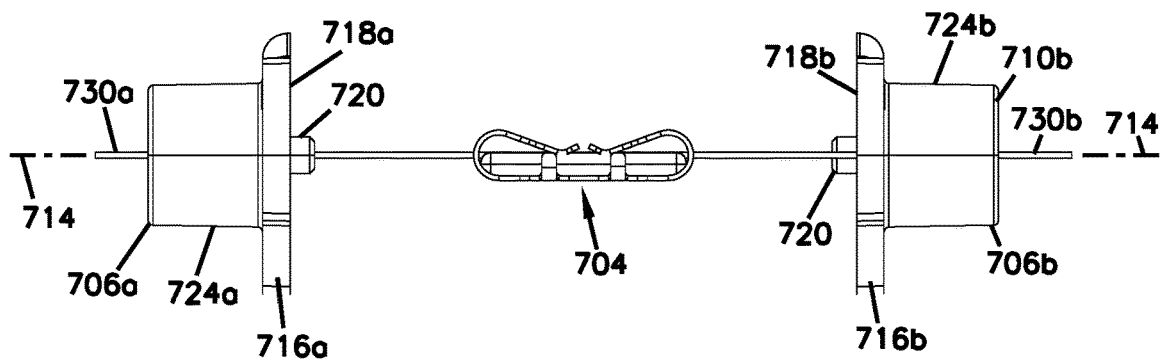
FIG. 50 is an exploded, side view of the fiber alignment device of FIG. 43.
Figure 51:
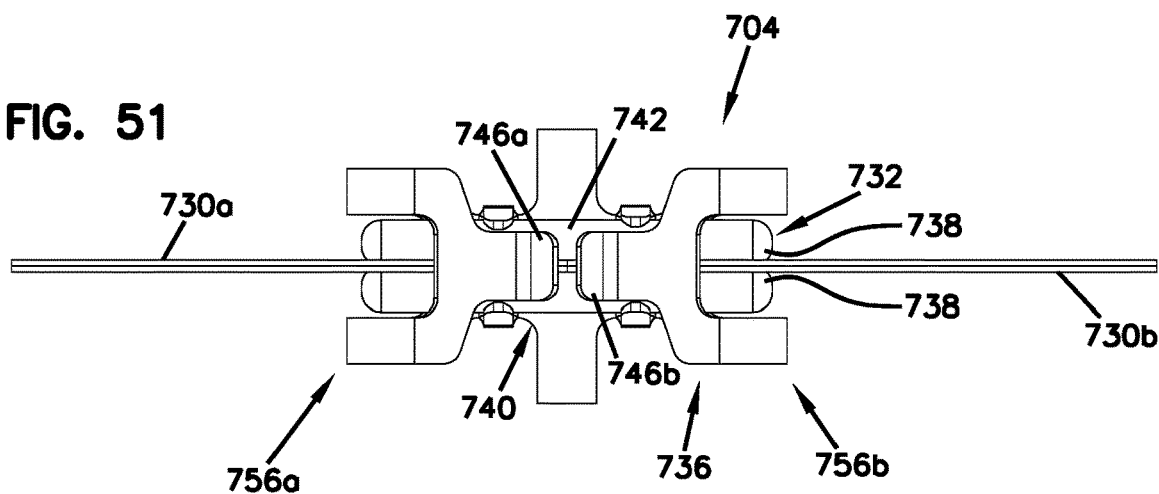
FIG. 51 is a top view of an optical fiber alignment assembly of the fiber alignment device of FIG. 47.
Figure 52:
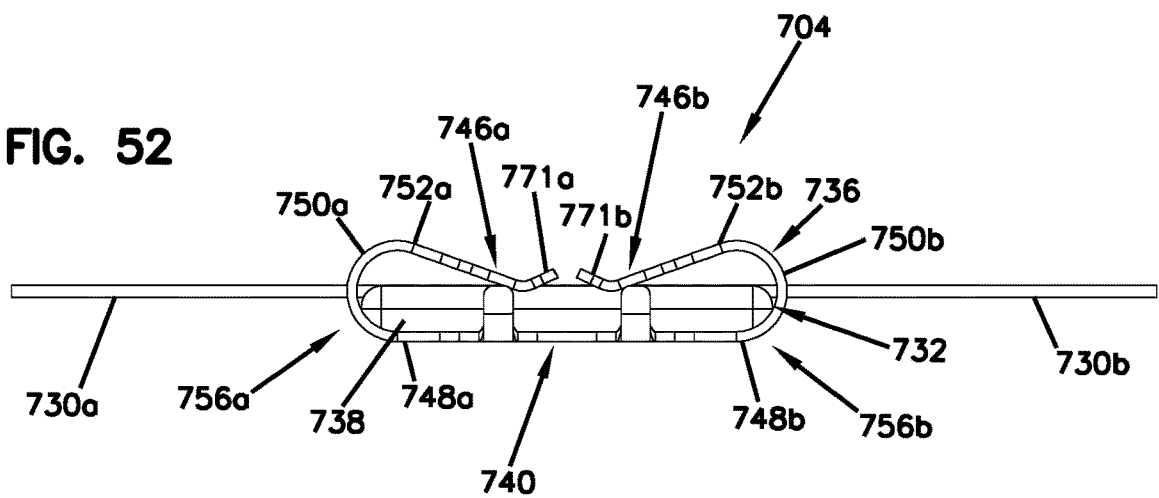
FIG. 52 is a side view of the optical fiber alignment assembly of FIG. 51.
Figure 53:
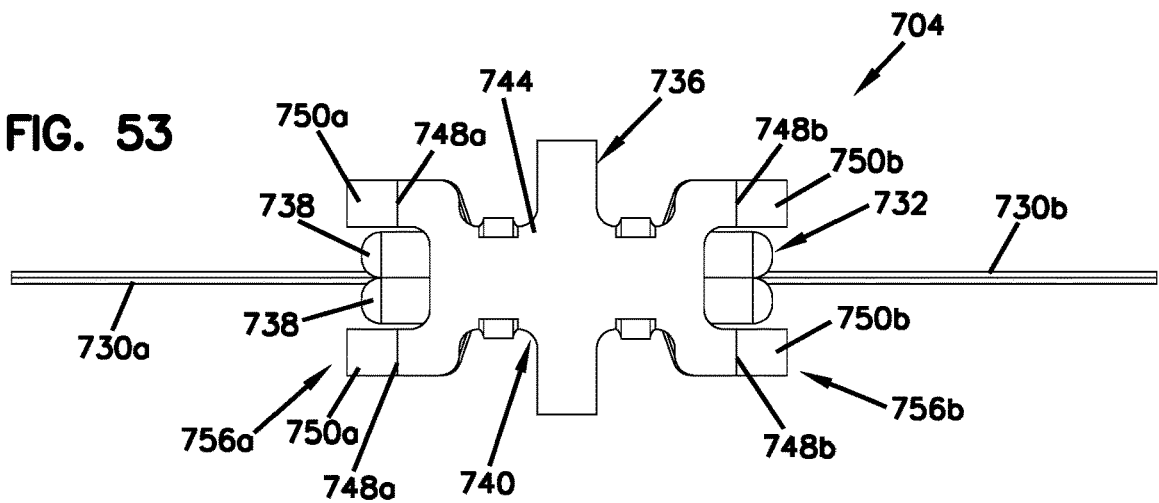
FIG. 53 is a bottom view of the optical fiber alignment assembly of FIG. 51.

In certain implementations, each cantilever arm 656 tapers along a thickness dimension as the cantilever arm 656 extends from the base 658 to the tip 688. For example, as shown in FIG. 41, the cantilever arm 656*b* has a first thickness T1 at the base 658*b* and a second thickness T2 at the tip 688*b*. The second thickness T2 is less than the first thickness T1. Tapering the thickness of the cantilever arms 656 may increase flexibility of the cantilever arms 656. Tapering the thickness also may distribute the stresses and reduce stress relaxation.

In some implementations, the fiber engagement component 44, 544, 644 is formed from polyetheretherketone (PEEK). In other implementations, the fiber engagement component 44, 544, 644 can be formed from polyetherimide (PEI), polyphenylsulfone (PPSU), liquid-crystal polymer (LCP), or polyaryletherketone (PAEK). Other materials also may work.

In certain implementations, the fiber engagement component 644 can include direction indicia. In some implementations, the fiber engagement component 44 bears indicia (e.g., "A," "B," directional arrows, etc.) on the top surface 52 of the main body 50 (see FIG. 11). In other implementations, the fiber engagement component 544 includes tabs bearing the direction indicia. The tabs are disposed between the cross-rib and the cantilever arms 356*a*, 356*b* (see FIG.

22). In other implementations, directional indicia (e.g., an arrow) can be disposed on the cross-rib 684 (see FIG. 42).

FIGS. 43-50 depict another example fiber alignment device 700 in accordance with the principles of the present disclosure. The fiber alignment device 700 includes an outer fiber alignment housing 702 configured to contain an optical fiber alignment assembly 704 (see FIG. 47) and to guide optical fibers into the optical fiber alignment assembly 704. As such, the actual alignment of the optical fibers occurs inside of the outer fiber alignment housing 702. In one example, the fiber alignment device 700 can be mounted in a fiber optic adapter 22 of the type shown at FIG. 21.

The outer fiber alignment housing 702 includes first and second housing pieces 706a, 706b that meet at a central interface plane 708. In certain examples, the first and second housing pieces 706a, 706b can be half-pieces. The first and second housing pieces 706a, 706b respectively define opposite first and second ends 710a, 710b of the outer fiber alignment housing 702. The opposite first and second ends 710a, 710b define co-axially aligned first and second fiber insertion openings 712a, 712b that are aligned along a fiber insertion axis 714 that is oriented generally perpendicular relative to the central interface plane 708. The fiber insertion axis can extend through the outer fiber alignment housing 702 between the first and second ends 710a, 710b. The first and second housing pieces 706a, 706b include flange portions 716a, 716b that cooperate to define a central flange 716 of the outer fiber alignment housing 702. Opposing axial end faces 718a, 718b of the flange portions 716a, 716b mate at the central interface plane 708. The axial end faces 718a, 718b of the flange portions 716a, 716b can include male projections 720 that fit within corresponding female receptacles 722.

The first and second housing pieces 706a, 706b also include barrel-portions 724a, 724b that project axially outwardly from the flange portions 716a, 716b along the fiber insertion axis 714. The barrel-portions 724a, 724b include axial end faces 726a, 726b. The fiber insertion openings 712a, 712b are defined through the axial end faces 726a, 726b. The axial end faces 726a, 726b also include transition portions 728a, 728b (e.g., lead-in regions) that surround the fiber insertion openings 712a, 712b. Transition portions 728a, 728b can be configured for respectively guiding or directing optical fibers 730a, 730b into the fiber insertion openings 712a, 712b. In certain examples, the transition portions 728a, 728b can be tapered or angled relative to the fiber insertion axis 714. In certain examples, the transition portions 728a, 728b can be funnel-shaped.

Referring to FIGS. 51-56, the optical fiber alignment assembly 704 includes a guide feature 732 defining a fiber alignment groove 734 (see FIG. 56) and a biasing member 736. The guide feature 732 includes parallel rods 738. The parallel rods 738 cooperate to define the fiber alignment groove 734. In certain examples, the parallel rods 738 can be cylindrical. In certain examples, the parallel rods 738 can have rounded ends. In certain examples, rounded ends can be dome or semi-spherically shaped. In certain examples, the fiber alignment groove 734 can extend between the first and second ends 710a, 710b of the outer fiber alignment housing 702, although alternatives are possible. The fiber alignment groove 734 can extend along the fiber insertion axis 714. In certain examples, rounded ends of the parallel rods 738 can be configured to guide or direct optical fibers 730a, 730b into the fiber alignment groove 734.

The biasing member 736 can be arranged and configured to urge the first and second optical fibers 730a, 730b toward the fiber alignment groove 734. The biasing member 736 can include a metal material or structure which can include a main body 740 defining a top side 742 and a bottom side 744. In certain examples, the biasing member 736 includes a spring clip. The biasing member 736 can include elastic members 746a, 746b (e.g., springs, cantilever spring arms, leaf springs, spring biased balls or spheres, integral springs, metal springs, etc.). In one example, the elastic members 746a, 746b are unitarily formed as one piece with the main body 740 of the biasing member 736.

While plastic alignment structures are effective for many applications, it has been determined for some applications that plastic alignment structures can at times be subject to wear caused by skiving (e.g., cutting, nicking, grazing, scratching, slicing, scraping) of the plastic by the optical fiber during fiber insertion. Skiving may create grooves, recesses, or slots in the plastic alignment structures. That is, overtime there can be increased wear against the plastic alignment structure as optical fibers are inserted into the alignment structure. As a result of the glass fiber skiving the plastic and forming grooves therein, the alignment structure may not accurately force the optical fibers into the correct location in the alignment groove. To address this issue, the elastic members 746a, 746b of the biasing member 736 are made from a metal material. In this way, tips of the optical fibers are not likely to cut into the elastic members 746a, 746b. This in part also helps to eliminate alignment force decreases due to creep at higher temperatures with plastic configurations.

The metal material or structure of the elastic members 746a, 746b and biasing member 736 can help improve durability overtime. The advantageous feature of having a biasing member 736 made with metal material or structure helps to reduce the possibility of the first and second optical fibers 730a, 730b skiving the elastic members 746a. 746b when the first and second optical fibers 730a, 730b are inserted into the optical fiber alignment assembly 704 and in the fiber alignment groove 734.

Figure 57:
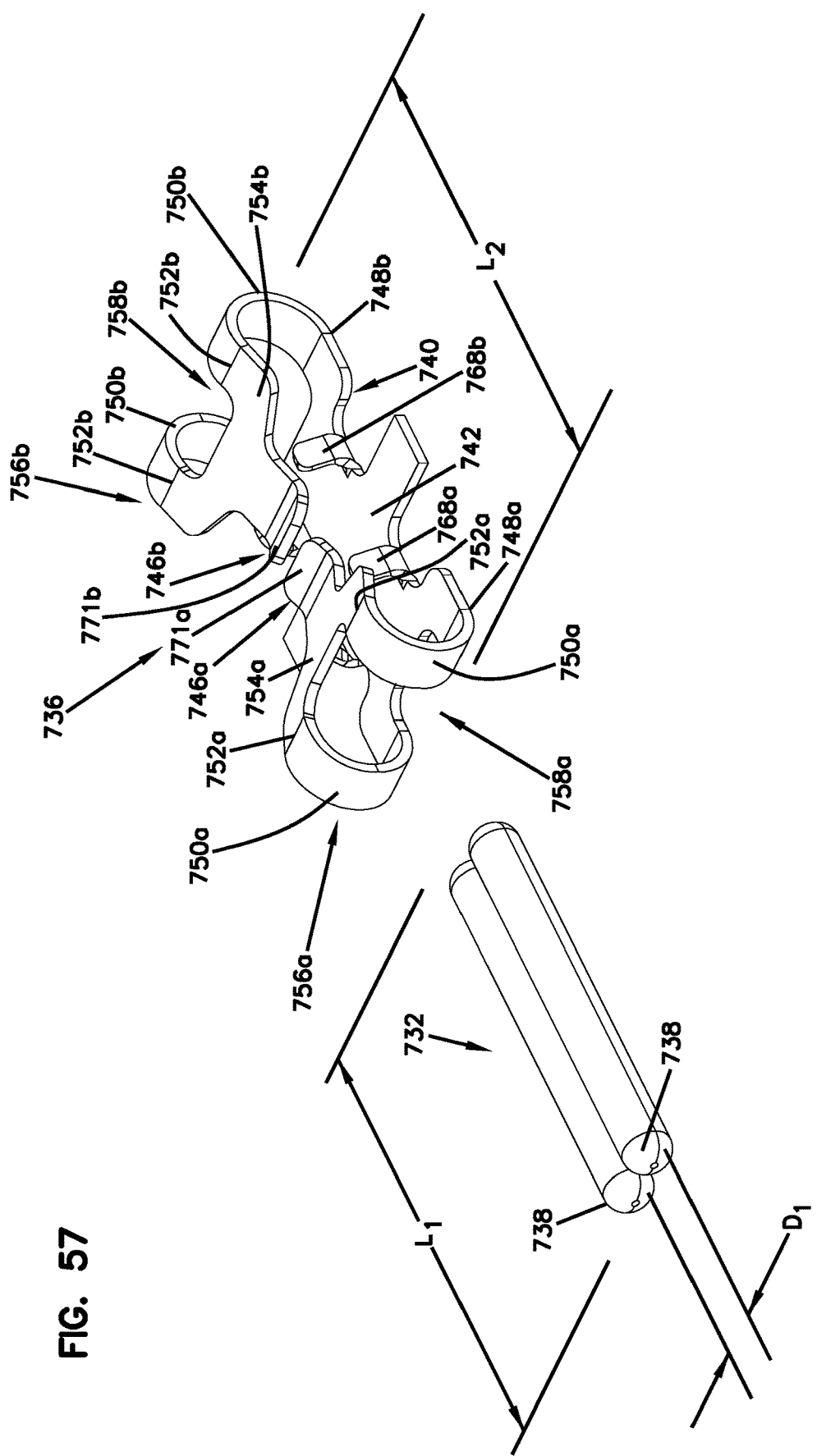
FIG. 57 is an exploded front, top, left side perspective view of the optical fiber alignment assembly of FIG. 54.

Referring to FIG. 57, the elastic members 746a, 746b may be formed generally in the shape of a U, having curved arms 750a, 750b that can make a U-shape wrap-around elastic member, although alternatives are possible. The curved arms 750a, 750b of the elastic members 746a, 746b can include base ends 748a, 748b and top ends 752a, 752b. The base ends 748a, 748b of the curved arms 750a, 750b can be monolithically connected with the main body 740 of the biasing member 736 and the top ends 752a, 752b of the curved arms 750a, 750b can be monolithically connected with a bridge portion 754a, 754b of the elastic members 746a, 746b. That is, the curved arms 750a, 750b can wrap-around from the main body 740 of the biasing member 736 towards the bridge portions 754a, 754b of the elastic members 746a, 746b. The curved arms 750a, 750b can provide a large flexible zone for the elastic members 746a, 746b of the biasing member 736. The biasing member 736 can include a first end 756a and an opposite second end 756b. The first and second ends 756a, 756b respectively define openings 758a, 758b between the curved arms 750a and the curved arms 750b for receiving the parallel rods 738.

Referring to FIGS. 58-63, the main body 740 of the biasing member 736 includes a first side 760 and an opposite, second side 762. The first and second sides 760, 762 extend between the first and second ends 756a, 756b of the biasing member 736. The biasing member 736 includes first and second extensions 764a, 764b that respectively extend from the first and second sides 760, 762 of the main body 740. The first and second extensions 764a, 764b are adapted to mount the biasing member 736 within the outer fiber alignment housing 702. The first and second extensions 764a, 764b can extend from an intermediate location 766 of the main body 740 between the first and second ends 756a, 756b of the biasing member 736. That is, the first and second extensions 764a, 764b are centrally located between the opposite ends 756a, 756b of the biasing member 736.

The biasing member 736 also includes a plurality of tabs 768 (e.g., one or more retainer elements) positioned on the first and second sides 760, 762 of the main body 740 of the biasing member 736 that can be used to secure the parallel rods 738 in position. For example, a first tab 768a and a second tab 768b can be positioned on the first and second sides 760, 762 of the main body 740 of the biasing member 736. While two tabs 768 are provided on each of the first and second sides 760, 762, it will be appreciated that more or fewer than two may be utilized without departing from the present disclosure. The tabs 768 are adapted to hold the parallel rods 738 within the biasing member 736. The tabs 768 can have elastic like characteristics to flex about the parallel rods 738 to secure the parallel rods 738 in place within the biasing member 736. That is, the tabs 768 can be arranged and configured to clamp the parallel rods 738 together. The tabs 768 can be flexible to apply a clamping force which holds the parallel rods 738 together such that the fiber alignment groove 734 can be formed and the optical fibers 730a, 730b can be held and retained within the fiber alignment groove 734 in coaxial alignment with one another. The tabs 768 can flex relative to the parallel rods 738 to position the parallel rods 738 precisely within the biasing member 736. The first and second tabs 768a, 768b can be respectively positioned on opposite sides of the first and second extensions 764a, 764b. That is, the first and second extensions 764, 764b can extend between the first and second tabs 768a, 768b.

Figure 64:
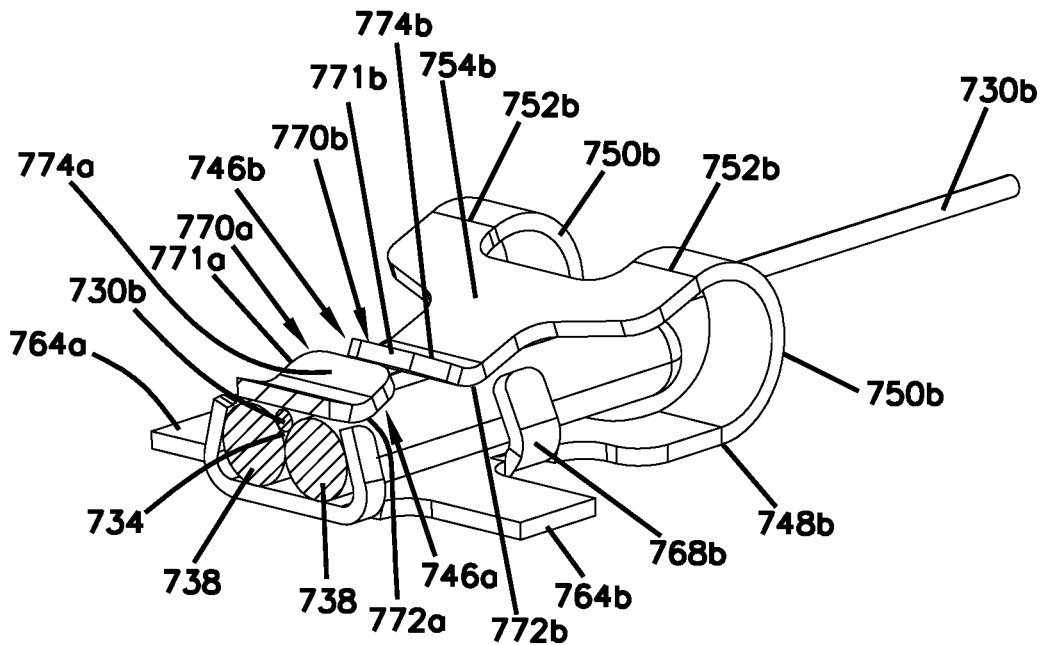
FIG. 64 is a cross-sectional view taken along section line 64-64 of FIG. 54.
Figure 65:
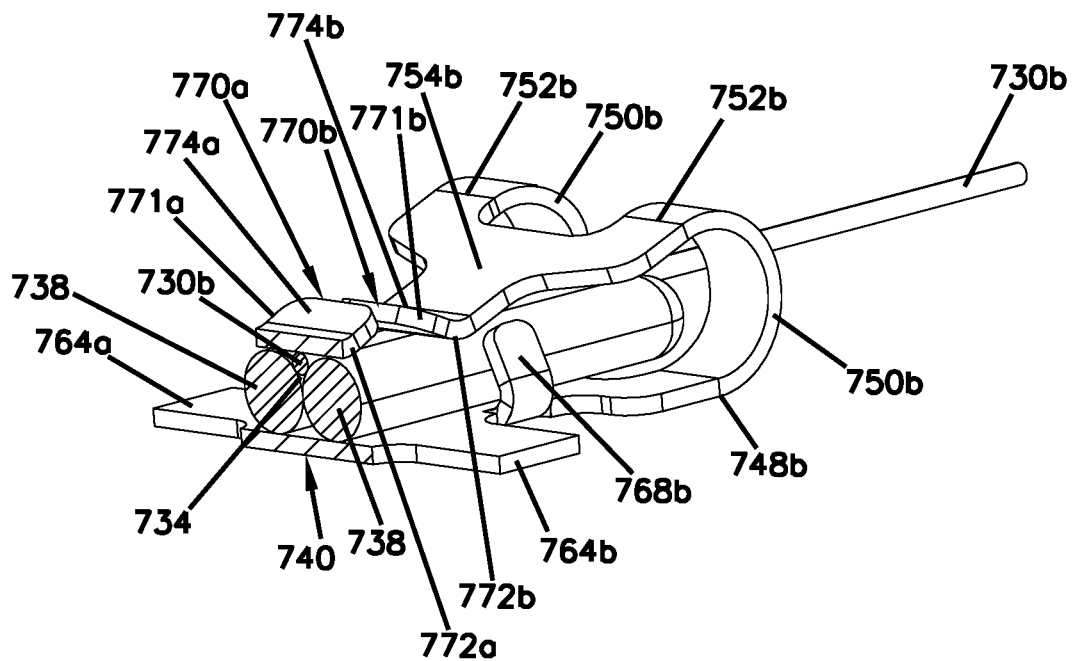
FIG. 65 is a cross-sectional view taken along section line 65-65 of FIG. 54.

Referring to FIGS. 64-65, the elastic members 764a, 764b include free ends 770a, 770b that face in a direction towards one another. The free ends 770a, 770b of the elastic members 746a, 746b can have a preferred configuration that provides the dual function of contacting the optical fibers 730a, 730b inserted within the fiber alignment groove 734, and contacting the parallel rods 738 prior to insertion of the optical fibers 730a, 730b to cause the elastic members 746a, 746b to flex. In certain examples, the elastic members 746a, 746b respectively include tab portions 771a, 771b that project axially from the bride portions 754a, 754b. The tab portions 771a, 771b respectively have free ends 770a, 770b and a contact portion 772a, 772b. The contact portions 772a, 772b can be arranged and configured with a convex surface that faces towards the fiber alignment groove 734. In certain examples, the contact portions 772a, 772b are positioned directly above the fiber alignment groove 734. In certain examples, the contact portions 772a, 772b are the only portions of the elastic members 746a, 746b that contact the optical fibers 730a, 730b when the optical fibers 730a, 730b are within the fiber alignment groove 734. The contact portions 772a, 772b can bear against the optical fibers 730a, 730b to press the optical fibers 730a, 730b to the parallel rods 738 to retain the optical fibers 730a, 730b in the fiber alignment groove 734.

The free ends 770a, 770b project upwardly from the bridge portion 754a, 754b of the elastic members 746a, 746b. The tab portions 771a, 771b include a ramp 774a, 774b that is angled upwardly and axially from the contact portions 772a, 772b. The free ends 770a, 770b can be positioned generally above the intermediate location 766 between the first and second tabs 768a, 768b.

Figure 66:
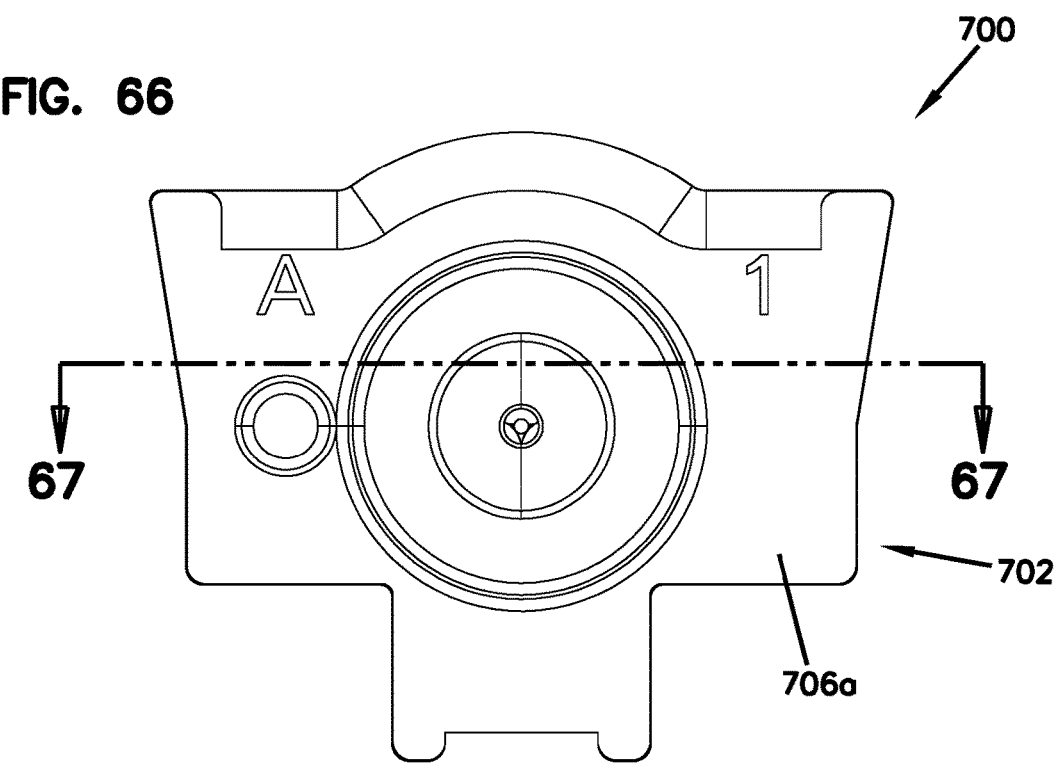
FIG. 66 is a front view of the fiber alignment device of FIG. 43.
Figure 67:
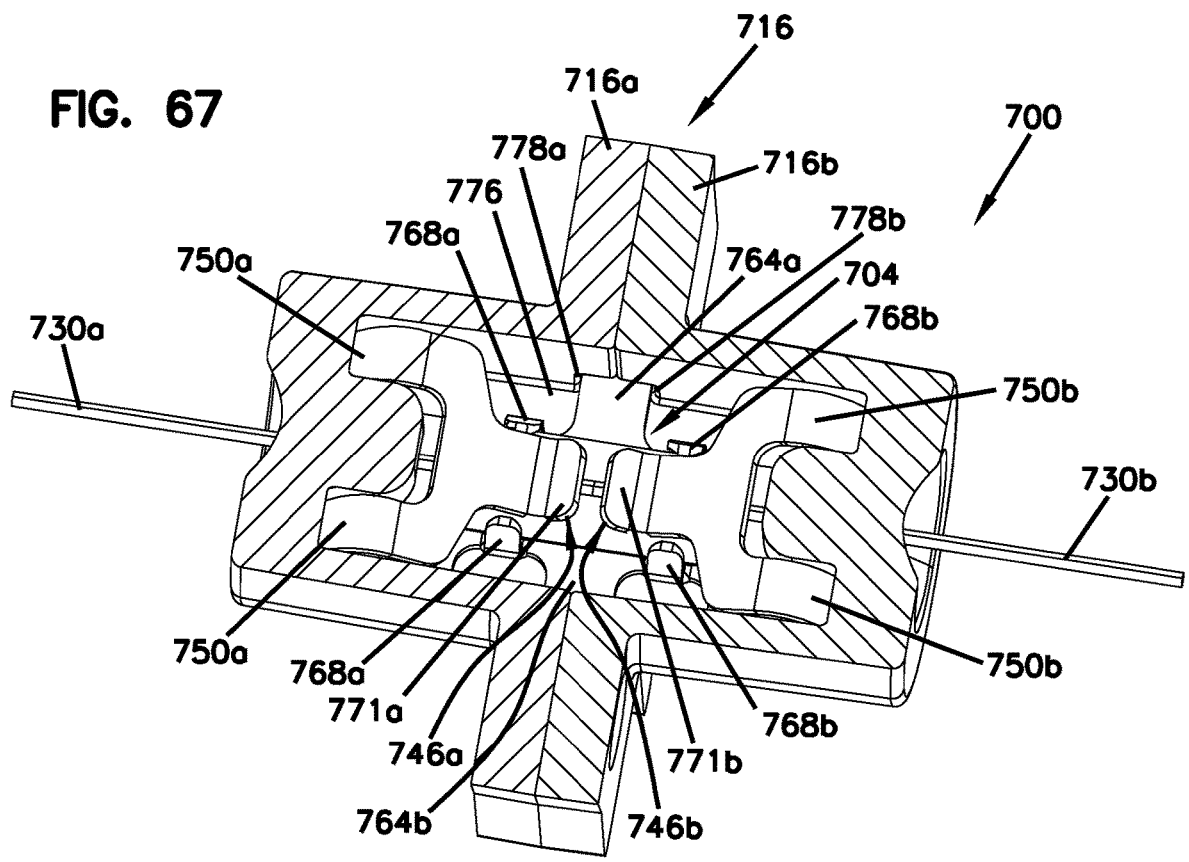
FIG. 67 is a cross-sectional view taken along section line 67-67 of FIG. 66.
Figure 68:
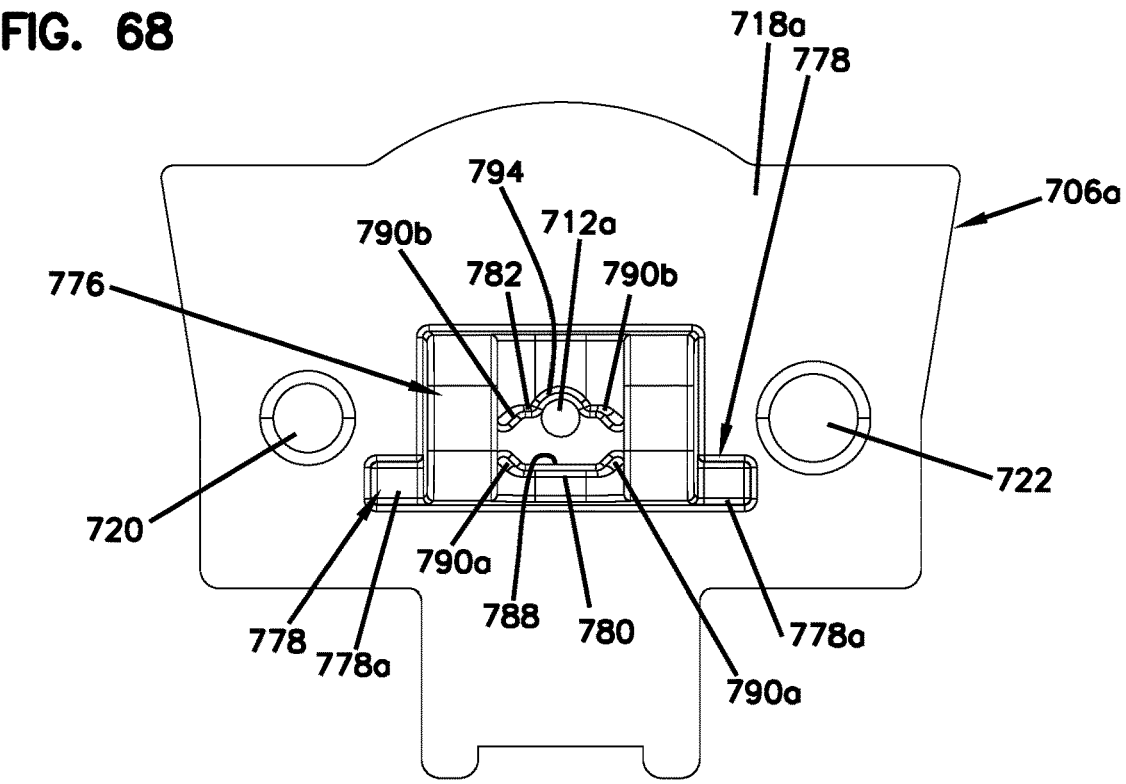
FIG. 68 is an end view of the housing piece of the fiber alignment device of FIG. 47.
Figure 69:
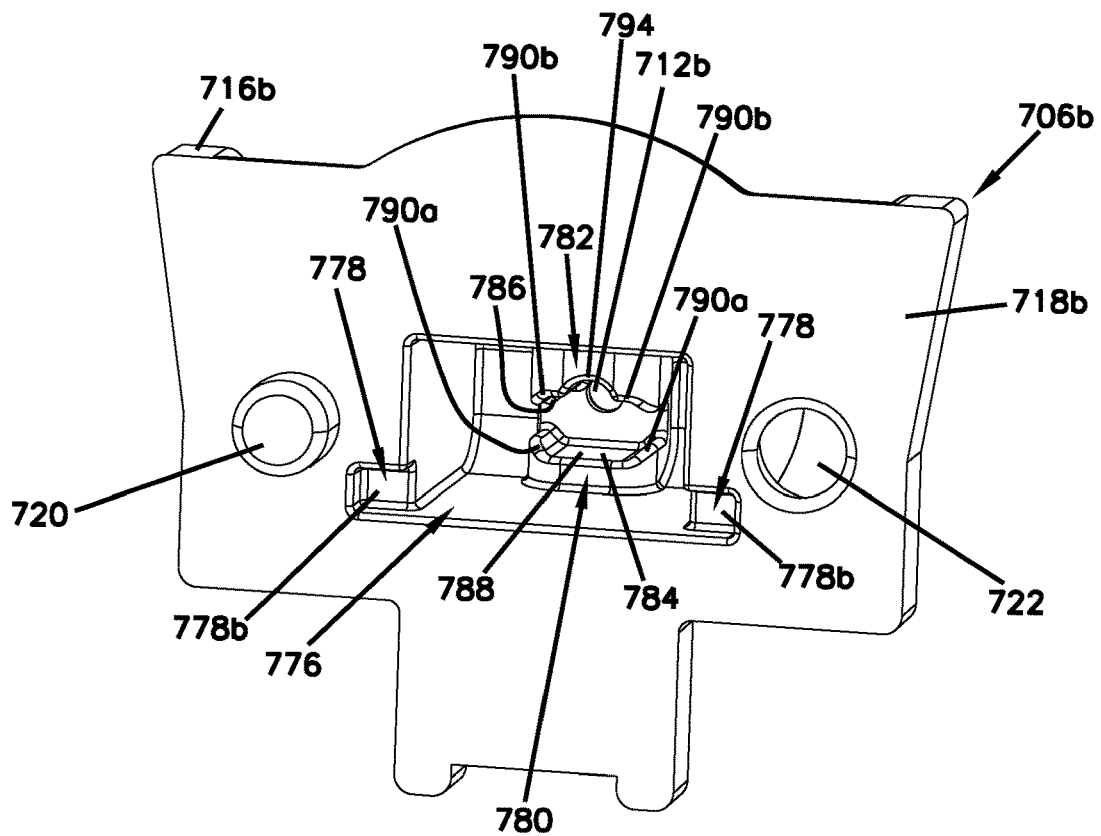
FIG. 69 is a perspective end view of the housing piece of FIG. 68.
Figure 70:
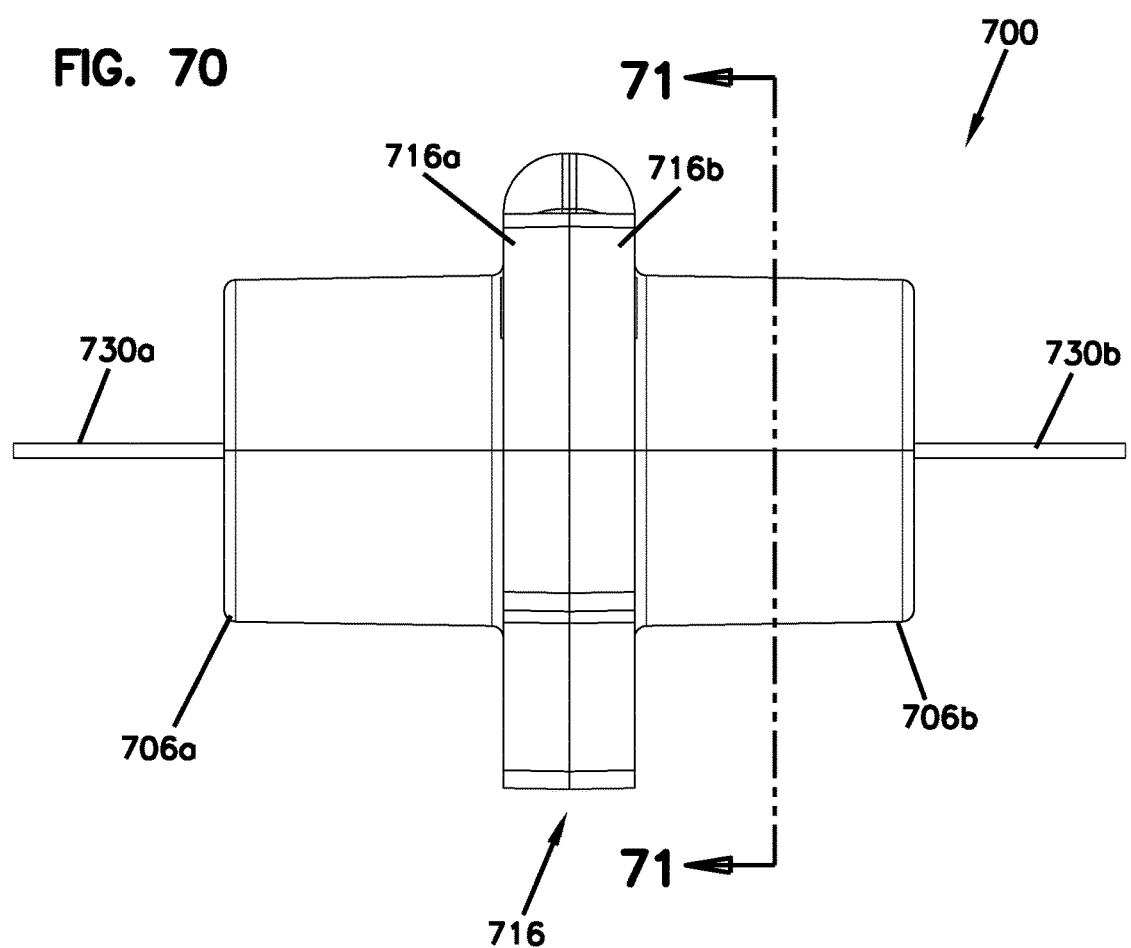
FIG. 70 is a left side view of the fiber alignment device of FIG. 43.

Referring to FIGS. 66-67, a cross-sectional view of the fiber alignment device 700 is depicted to show the optical fiber alignment assembly 704 mounted within the outer fiber alignment housing 702. That is, the outer fiber alignment housing 702 can mount over the biasing member 736 and the parallel rods 738. The outer fiber alignment housing 702 defines an internal chamber 776 or cavity for receiving the optical fiber alignment assembly 704. Additionally, the outer fiber alignment housing 702 includes internal features adapted to engage the biasing member 736 to effectively position or center the biasing member 736 within the outer fiber alignment housing 702. Preferably, the biasing member 736 is centered within the outer fiber alignment housing 702 such that the fiber alignment groove 734 coaxially aligns with the fiber insertion axis 714. In certain examples, the outer fiber alignment housing 702 includes slots 778 (e.g., open regions, recesses, etc.) (see FIGS. 68-69) adapted to respectively receive the first and second extensions 764a, 764b to center the biasing member 736. In certain examples, the slots 778 include a pair of opposing slots 778a defined by the first housing piece 706a and a pair of opposing slots 778b defined by the second housing piece 706b. When the first and second housing pieces 706a, 706b are assembled together, the slots 778a, 778b together receive the first and second extensions 764a, 764b. The slots 778a, 778b and the first and second extensions 764a, 764b cooperate to hold and center the biasing member 736 within the outer fiber alignment housing 702.

Figure 71:
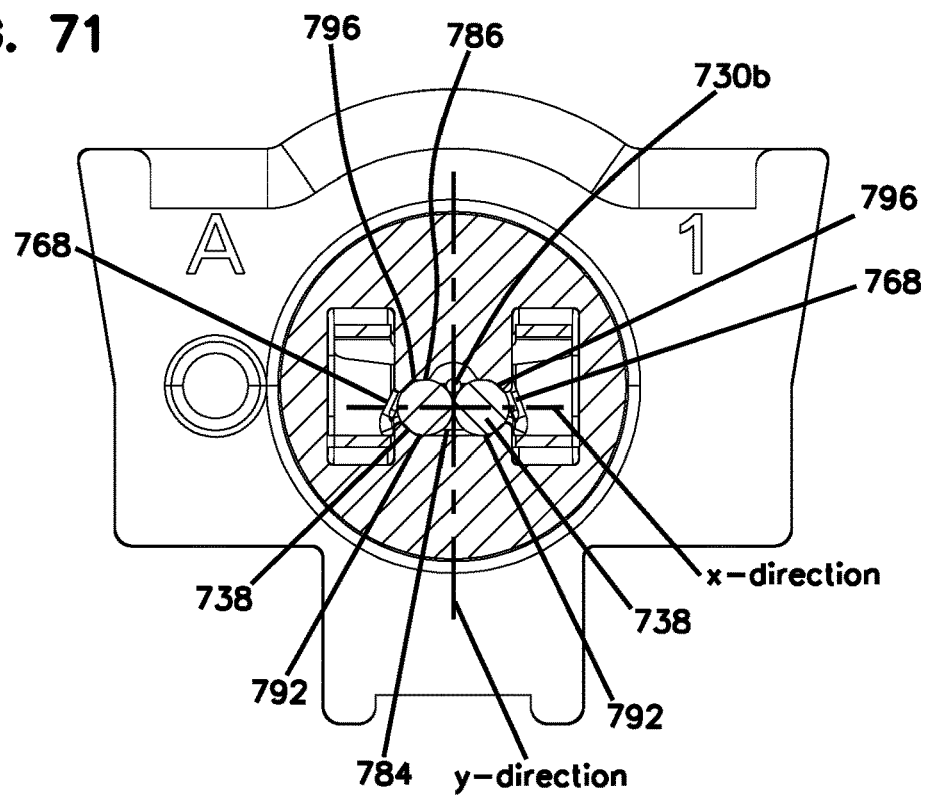
FIG. 71 is a cross-sectional view taken along section line 71-71 of FIG. 70.

The outer fiber alignment housing 702 can also include internal structure for centering and aligning the parallel rods 738 within the outer fiber alignment housing 702 in both x and y directions (See FIG. 71). The internal structure can be located in both the first and second housing pieces 706a, 706b. In certain examples, the internal structure can be a cradle like configuration the can be used to secure the parallel rods 738 in position. The internal structure can include a support member 780 and a retention member 782 between which the parallel rods 738 are secured. The support member 780 and the retention member 782 cooperate together to align the parallel rods 738 in the x and y directions. The support member 780 and the retention member 782 forces, compresses, or otherwise retains/holds the parallel rods 738 in the outer fiber alignment housing 702.

In certain examples, the support member 780 includes a lower positioning surface 784 and the retention member 782 includes an upper positioning surface 786. The lower positioning surface 784 of the support member 780 includes a base 788 that is generally flat and two opposing generally curved end portions 790a that taper outwardly from opposite sides of the base 788. The curved end portions 790a are tapered to facilitate positioning and aligning of the parallel rods 738 in the outer fiber alignment housing 702. The base 788 and curved end portions 790a generally engage a bottom side 792 (see FIG. 71) of the parallel rods 738. The curved end portions 790a can snugly fit the contours of the parallel rods 738. The base 788 and the curved end portions 790a together form a pocket like configuration such that the parallel rods 738 fit within the pocket and cooperate to define the fiber alignment groove 734. In other examples, end portions 790 can be angled relative to the lower positioning surface 784 and can include planar portions.

In certain examples, the upper positioning surface 786 of the retention member 782 includes a rounded center portion 794 (see FIG. 68) and two generally curved end portions 790b that taper outwardly from opposite sides of the rounded center 794. The rounded center portion 794 and the curved end portions 790b generally engage a top side 796

(see FIG. 71) of the parallel rods 738. The rounded center portion 794 and the curved end portions 790b can snugly fit the contours of the parallel rods 738. The rounded center portion 794 and the curved end portions 790b can together form another pocket like configuration such that the parallel rods 738 fit within the pocket and cooperate to define the fiber alignment groove 734. The upper positioning surface 786 cooperates with the lower positioning surface 784 to compress and hold/retain the parallel rods 738 in alignment within the outer fiber alignment housing 702 in both the x and y directions. In other examples, end portions 790b can angle downwardly from the center portion 794 and optionally can include planar portions.

When the outer fiber alignment housing 702 is assembled, the fiber alignment groove 734 preferably generally aligns with the fiber insertion axis 714 in a coaxial orientation. The contact portions 772a, 772b of the elastic members 746a, 746b can be positioned close enough to the fiber alignment groove 734 to apply sufficient pressure to the first and second optical fibers 730a, 730b received within the fiber alignment groove 734 such that the first and second optical fibers 730a, 730b are held and retained within the fiber alignment groove 734 in coaxial alignment with one another. The contact portions 772a, 772b will push on the first and second optical fibers 730a, 730b to press the first and second optical fibers 730a, 730b into the fiber alignment groove 734. Upon insertion of the first and second optical fibers 730a, 730b, the first and second optical fibers 730a, 730b will lift the contact portions 772a, 772b away from the parallel rods 738. In certain examples, the contact portions 772a, 772b can have about a 10 micron clearance above the parallel rods 738 after the first and second optical fibers 730a, 730b are inserted. That is, upon insertion, the first and second optical fibers 730a, 730b may lift the contact portions 772a, 772b approximately 10 microns which can help improve insertion of the optical fibers. Index matching gel may be applied in the center of the parallel rods 738.

In certain examples, a diameter D (see FIG. 57) of the parallel rods 738 can be between about 0.35 mm to about 5.0 mm, and the optical fibers can have a diameter of about 125 microns, although alternatives are possible. In certain examples, the parallel rods 738 may have a diameter D that is about 0.47 mm. The parallel rods 738 can have a length $L_1$ that is shorter than a length $L_2$ of the biasing member 736, such that there is less stubbing of the optical fibers 730a, 730b upon insertion. That is, the slope of the fiber entrance is less steep (see FIG. 57) due to the shortness of the parallel rods 738 compared with the biasing member 736. In certain examples, a length $L_1$ of the parallel rods 738 is at least one-third of a length $L_2$ of the biasing member 736. In certain examples, a length $L_1$ of the parallel rods 738 is at least half of a length $L_2$ of the biasing member 736. In certain examples, a length $L_1$ of the parallel rods 738 is no more than 92% of a length $L_2$ of the biasing member 736.

Various modifications and alterations of this disclosure will become apparent to those skilled in the art without departing from the scope and spirit of this disclosure, and it should be understood that the scope of this disclosure is not to be unduly limited to the illustrated examples set forth herein.

What is claimed is:

1. A fiber alignment device comprising:
   a guide feature defining a fiber alignment groove; and
   a fiber engagement component defining a reference surface arrangement and elastic cantilever arms for pressing optical fibers into the fiber alignment groove, first portions of the guide feature engaging the reference surface arrangement, and second portions of the guide feature engaging the cantilever arms to flex the cantilever arms to a staged position;
   wherein the guide feature includes two parallel rods that cooperate to define the fiber alignment groove; and
   wherein the elastic cantilever arms include free end portions having wings that engage the second portions of the guide feature, the second portions being provided on the rods, and the free end portions of the cantilever arms also including tabs that align with the fiber alignment groove, wherein the wings project laterally outwardly from opposite sides of the tabs.

2. The fiber alignment device of claim 1, wherein the fiber engagement component includes a main body, and wherein the elastic cantilever arms have base ends that are unitary with the main body.

3. The fiber alignment device of claim 2, wherein the wings extend from the free end portions of the cantilever arms to the base ends.

4. The fiber alignment device of claim 2, wherein each wing extends from the respective free end portion over less than half of a length of the respective cantilever arm.

5. The fiber alignment device of claim 2, wherein the main body defines an elongate pocket for receiving the rods, and wherein the reference surface arrangement is provided within the elongate pocket.

6. The fiber alignment device of claim 5, wherein the reference surface arrangement includes surfaces defined by the main body that engage the first portions of the guide feature, and wherein the first portions of the guide feature are located adjacent ends of the rods.

7. The fiber alignment device of claim 6, wherein the elongate pocket has an open side.

8. The fiber alignment device of claim 1, further comprising a housing that mounts over the fiber engagement component and the two parallel rods, the housing including an internal structure that presses the two parallel rods against the reference surface arrangement.

9. The fiber alignment device of claim 8, wherein the internal structure includes one or more tee-beams having flange portions that engage the rods.

10. The fiber alignment device of claim 9, wherein the flange portions engage the rods adjacent ends of the rods.

11. The fiber alignment device of claim 1, wherein the fiber alignment device is monolithically formed from polyetheretherketone (PEEK).

12. A fiber alignment device comprising:
   a fiber alignment housing having opposite ends defining co-axially aligned fiber insertion openings that are aligned along a fiber insertion axis;
   a fiber alignment subassembly that mounts within the fiber alignment housing, the fiber alignment subassembly including first and second parallel rods that cooperate to define a fiber alignment groove, the fiber alignment subassembly also including a fiber engagement component including a top side and a bottom side, the bottom side defining an elongate pocket in which the first and second parallel rods are received, the fiber engagement component including elastic cantilever arms positioned above the first and second parallel rods for pressing optical fibers into the fiber alignment groove, the fiber alignment housing including upper and lower subassembly positioning surfaces, the fiber engagement component being compressed between the upper subassembly positioning surfaces and the first and second rods, the first and second rods being compressed between the lower subassembly positioning surfaces and the fiber engagement component, the fiber engagement component and the first and second rods being compressed together between the upper and lower subassembly positioning surfaces.

13. A fiber alignment device comprising:

a guide feature defining a fiber alignment groove; and elastic cantilever arms having lengths that extend along the fiber alignment groove, the cantilever arms including free end portions including tabs that align with the fiber alignment groove and that extend toward the fiber alignment groove, the free end portions also including wings that contact the guide feature to establish a spacing between the tabs and the fiber alignment groove, wherein the wings project laterally outwardly from opposite sides of the tabs.

14. A fiber alignment device comprising:

a fiber alignment subassembly including rods defining a fiber alignment groove and flexible cantilever arms for pressing optical fibers into the fiber alignment groove; and a housing defining an interior that receives the fiber alignment subassembly, the housing including one or more internal tee-beams for pressing the rods within the interior of the housing, the housing including first and second housing pieces that meet at a central interface plane.

15. A fiber alignment device comprising:

a guide feature defining a fiber alignment groove;

a fiber engagement component defining a reference surface arrangement and elastic cantilever arms for pressing optical fibers into the fiber alignment groove, first portions of the guide feature engaging the reference surface arrangement, and second portions of the guide feature engaging the cantilever arms to flex the cantilever arms to a staged position, wherein the guide feature includes two parallel rods that cooperate to define the fiber alignment groove; and a housing that mounts over the fiber engagement component and the two parallel rods, the housing including an internal structure that presses the two parallel rods against the reference surface arrangement.

* * * * *